(12) United States Patent
Merkel

(10) Patent No.: US 7,421,391 B1
(45) Date of Patent: Sep. 2, 2008

(54) SYSTEM AND METHOD FOR VOICE-OVER ASSET MANAGEMENT, SEARCH AND PRESENTATION

(75) Inventor: Robert C. Merkel, Brookfield, WI (US)

(73) Assignee: ZamTech LLC, Brookfield, WI (US)

( * ) Notice: Subject to any disclaimer, the term of this patent is extended or adjusted under 35 U.S.C. 154(b) by 836 days.

(21) Appl. No.: 10/935,548

(22) Filed: Sep. 7, 2004

Related U.S. Application Data

(60) Provisional application No. 60/501,001, filed on Sep. 8, 2003, provisional application No. 60/549,292, filed on Mar. 2, 2004.

(51) Int. Cl.
  *G10L 21/06* (2006.01)
(52) U.S. Cl. ...................................... 704/270
(58) Field of Classification Search .................. 704/270
  See application file for complete search history.

(56) References Cited

U.S. PATENT DOCUMENTS

| | | | |
|---|---|---|---|
| 5,915,001 | A | 6/1999 | Uppaluru |
| 6,122,176 | A | 9/2000 | Clements |
| 6,317,710 | B1 | 11/2001 | Huang et al. |
| 6,345,252 | B1 | 2/2002 | Beigi et al. |
| 6,405,166 | B1 | 6/2002 | Huang et al. |
| 6,813,605 | B2 | 11/2004 | Nakamura et al. |
| 2002/0022959 | A1 | 2/2002 | Nakamura et al. |

OTHER PUBLICATIONS

No Author Given: "CPV Communications" Webmaster website: www.cpvcom.com, Apr. 1, 2003, p. 1/2 (Welcome), p. 1 (Voice Database), p. 1 (Search), p. 1/2 (Results).
No Author Given: "Voice Models"; Website; www.voicemodels.com, Apr. 14, 2003, p. 1.
No Author Given: "Just Moo—The Voiceover data base"; Website; www.justmoo.com, Apr. 13, 2003, p. 1 (Search), p. 1 (Results).
No Author Given: "ProductionBank"; Website; www.voiceregistry.com, Apr. 14, 2003, p. 1 (Search), p. 1 (Results).
No Author Given: "Free Voice Over Casting"; Website; www.voicehunter.com, Apr. 14, 2003, pp. 1-2 (Search), pp. 1-3 (Help), pp. 1-2 (Results).
No Author Given: "voicebank.net"; Website; www.voicebank.com, Apr. 14, 2003, pp. 1-2.

*Primary Examiner*—Susan McFadden
(74) *Attorney, Agent, or Firm*—Reinhart Boerner Van Deuren S.C.

(57) ABSTRACT

A system and method for searching and selecting a specific read of a talent. A reel can be separated or marked to indicate individual reads. The reads are defined using read profiles. A producer and/or agent can perform searches and auditions on the search system on a read level by using the unique read profiles. The search for reads can be performed using sample voices or voices provided by a user. The auditions can be executed in real-time and can be integrated with telephony technology. Agent branded technology are included to provide a vehicle for the agent to be a part of the producer-talent relationship. A Uniform Resource Locator with a pathname containing an alias suffix is provided to direct the business contacts to a Webpage containing biographical and contact information and sample reads of the talent.

42 Claims, 61 Drawing Sheets

Demo Reel - Read Delineation

35 Seconds, Talent Demo Reel vocal trait 280

Tone
Well Rounded ☐1 ☐2 ☐3 ☐4 Serrated ☐5

Texture
Velvet ☐1 ☐2 ☐3 ☐4 Burlap ☐5

Crinkle
None ☐1 ☐2 ☐3 ☐4 Lots ☐5

Aspiration
Clipped ☐1 ☐2 ☐3 ☐4 Breathy ☐5

Dynamics
Deadpan ☐1 ☐2 ☐3 ☐4 Full ☐5

GUI – Read Type search

READ TYPE ⌄

DEMOGRAPHIC ⌄

| GENDER | UNION | MATURITY |
|---|---|---|
| ■ Male | ☐ SAG | ☐ Infant |
| ☐ Female | ☐ AFTRA | ☐ Kindergarten |
| ☐ Creature | ☐ AEA | ☐ Grade School |
| | ☐ Financial Core | ☐ Teen |
| | | ☐ College |
| | | ☐ Young Adult |
| | | ☐ Adult |
| | | ☐ Mature Adult |
| | | ☐ Senior |

DELIVERY ⌄

PERSONA ⌄

INFLECTION ⌄

SPECIFICS ⌄

↻ RESET results

⊕ PLAY 3439 READS

▽ READ TYPE:
  • Commercial

▽ GENDER
  • Male

}—1032

GUI – Demographic

Figure 17 search

READ TYPE >

DEMOGRAPHIC >

DELIVERY

| | | 1 | 2 | 3 | 4 | 5 | |
|---|---|---|---|---|---|---|---|
| PITCH | Very Low | ☐ | ☐ | ■ | ☐ | ☐ | Very High |
| PACE | Very Slow | ☐ | ☐ | ■ | ☐ | ☐ | Very Fast |
| ENERGY | Comatose | ☐ | ☐ | ☐ | ☐ | ☐ | Coffeinated |
| URGENCY | Relaxed | ☐ | ☐ | ☐ | ■ | ☐ | Compelling |
| INTIMACY | All Business | ☐ | ☐ | ☐ | ☐ | ☐ | Very Private |
| | | 1 | 2 | 3 | 4 | 5 | |

PERSONA >

INFLECTION >

SPECIFICS >

RESET results

○ PLAY 173 READS

⟩ READ TYPE
   • Commercial
⟩ GENDER
   • Male
   • PITCH:2,3
   • URGENCY:4

} 1034

GUI – Delivery

GUI – Persona

Figure 21

GUI – Read Player

XML Search Document

```
<?xml version="1.0" encoding="ISO-8859-1" ?>
<VZVoices xmlns:vzv="http://www.voicezam.com/Voices" agent="">          1100
     1200
<Tab id="read_type" text="Read Type" modified="0">          1102
 1204   1206   1208
   <CheckBox id="commercial" dbid="2" text="Commercial" value="0" />          1104
       1210   1212   1214   1216
   <CheckBox id="character" dbid="1" text="Character" value="0" />
   <CheckBox id="multimedia" dbid="5" text="Multimedia" value="0" />
   <CheckBox id="documentary" dbid="24" text="Documentary" value="0" />
   <CheckBox id="promo" dbid="11" text="Promo" value="0" />
   <CheckBox id="trailer" dbid="17" text="Trailer" value="0" />
   <CheckBox id="political" dbid="9" text="Political" value="0" />
   <CheckBox id="animation" dbid="22" text="Animation/Games" value="0" />
   <CheckBox id="audio_book" dbid="15" text="Audio Book" value="0" />
   <CheckBox id="narration" dbid="6" text="Narration" value="0" />
   <CheckBox id="training" dbid="4" text="Training" value="0" />
   <CheckBox id="pos_kiosk" dbid="10" text="Pos/Kiosk" value="0" />
   <CheckBox id="voice_response" dbid="16" text="Voice Response" value="0" />
</Tab>
```

Figure 23a

XML Search Document (cont.)

```xml
<Tab id="demographic" text="DEMOGRAPHIC" modified="0">
  <Section id="gender" dbid="ReadProfile.GenderID" text="GENDER" value="0">  ~1106
                1218      1220        1222       1224
    <CheckBox id="male" text="Male" binaryValue="1" />
    <CheckBox id="female" text="Female" binaryValue="2" />
    <CheckBox id="creature" text="Creature" binaryValue="4" />
  </Section>
  <Section id="union" dbid="Account.UnionMembership" text="UNION" value="0">
    <CheckBox id="sag" text="SAG" binaryValue="1" />
    <CheckBox id="aftra" text="AFTRA" binaryValue="2" />
    <CheckBox id="aea" text="AEA" binaryValue="4" />
    <CheckBox id="financial_core" text="Financial Core" binaryValue="8" />
  </Section>
  <Section id="maturity" dbid="ReadProfile.Maturity" text="MATURITY" value="0">
    <CheckBox id="infant" text="Infant" binaryValue="1" />
    <CheckBox id="kindergarten" text="Kindergarten" binaryValue="2" />
    <CheckBox id="grade_school" text="Grade School" binaryValue="4" />
    <CheckBox id="teen" text="Teen" binaryValue="8" />
    <CheckBox id="college" text="College" binaryValue="16" />
    <CheckBox id="young_adult" text="Young Adult" binaryValue="32" />
    <CheckBox id="adult" text="Adult" binaryValue="64" />
    <CheckBox id="mature_adult" text="Mature Adult" binaryValue="128" />
    <CheckBox id="senior" text="Senior" binaryValue="256" />
  </Section>
</Tab>
```

Figure 23b

XML Search Document (cont.)

```
<Tab id="delivery" text="DELIVERY" modified="0">
    <Binary5 id="pitch" dbid="PITCH" low_text="Very Low" high_text="Very High"
             1226      1228     1230   1232              1234
        low_example_URL="www.voicezam.com/media/examples/pitch_low"
                  1236
        high_example_URL="www.voicezam.com/media/examples/pitch_high" value="0" /> ~1108
                  1238                                                1240
    <Binary5 id="pace" dbid="Pace" text="PACE" low_text="Very Slow" high_text="Very Fast"
        low_example_URL="www.voicezam.com/media/examples/pace_low"
        high_example_URL="www.voicezam.com/media/examples/pace_high" value="0" />
    <Binary5 id="energy" dbid="EnergyLevel" text="ENERGY" low_text="Comatose" high_text="Caffeinated"
        low_example_URL="www.voicezam.com/media/examples/energy_low"
        high_example_URL="www.voicezam.com/media/examples/energy_high"
        value="0" />
    <Binary5 id="urgency" dbid="Pattern10" text="URGENCY" low_text="Relaxed" high_text="Compelling"
        low_example_URL="www.voicezam.com/media/examples/urgency_low"
        high_example_URL="www.voicezam.com/media/examples/urgency_high"
        value="0" />
    <Binary5 id="intimacy" dbid="Pattern9" text="INTIMACY" low_text="All Business"
        high_text="Very Private"
        low_example_URL="www.voicezam.com/media/examples/intimacy_low"
        high_example_URL="www.voicezam.com/media/examples/intimacy_high"
        value="0" />
</Tab>
```

Figure 23c

XML Search Document (cont.)

```xml
<Tab id="persona" text="PERSONA" modified="0">
    <Binary5 id="expertise" dbid="Pattern6" text="EXPERTISE" low_text="Novice" high_text="Authority"
        low_example_URL="www.voicezam.com/media/examples/expertise_low"
        high_example_URL="www.voicezam.com/media/examples/expertise_high"
        value="0" />
    <Binary5 id="sophistication" dbid="Pattern2" text="SOPHISTICATION" low_text="Home Spun"
        high_text="High Brow"
        low_example_URL="www.voicezam.com/media/examples/sophistication_low"
        high_example_URL="www.voicezam.com/media/examples/sophistication_high"
        value="0" />
    <Binary5 id="attitude" dbid="Pattern7" text="ATTITUDE" low_text="From-Your-Heart"
        high_text="In-Your-Face"
        low_example_URL="www.voicezam.com/media/examples/attitude_low"
        high_example_URL="www.voicezam.com/media/examples/attitude_high"
        value="0" />
    <Binary5 id="awareness" dbid="Pattern8" text="AWARENESS" low_text="In-The-Dark"
        high_text="In-The-Know"
        low_example_URL="www.voicezam.com/media/examples/awareness_low"
        high_example_URL="www.voicezam.com/media/examples/awareness_high"
        value="0" />
</Tab>
```

Figure 23d

XML Search Document (cont.)

```xml
<Tab id="inflection" text="INFLECTION" modified="0">
    <Binary5 id="resonance" dbid="Pattern11" text="RESONANCE" low_text="Well Rounded"
        high_text="Serrated"
        low_example_URL="www.voicezam.com/media/examples/resonance_low"
        high_example_URL="www.voicezam.com/media/examples/resonance_high"
        value="0" />
    <Binary5 id="crinkle" dbid="Pattern3" text="CRINKLE" low_text="None" high_text="Lots"
        low_example_URL="www.voicezam.com/media/examples/crinkle_low"
        high_example_URL="www.voicezam.com/media/examples/crinkle_high" value="0" />
    <Binary5 id="dynamics" dbid="Pattern5" text="DYNAMICS" low_text="Deadpan" high_text="Full"
        low_example_URL="www.voicezam.com/media/examples/dynamics_low"
        high_example_URL="www.voicezam.com/media/examples/dynamics_high"
        value="0" />
    <Binary5 id="texture" dbid="Pattern12" text="TEXTURE" low_text="Velvet" high_text="Burlap"
        low_example_URL="www.voicezam.com/media/examples/texture_low"
        high_example_URL="www.voicezam.com/media/examples/texture_high"
        value="0" />
    <Binary5 id="aspiration" dbid="Pattern4" text="ASPIRATION" low_text="Clipped" high_text="Breathy"
        low_example_URL="www.voicezam.com/media/examples/aspiration_low"
        high_example_URL="www.voicezam.com/media/examples/aspiration_high"
        value="0" />
</Tab>
```

Figure 23e

XML Search Document (cont.)

```
<Tab id="specifics" text="SPECIFICS" modified="0">
    <Text id="instructions"
          1242
    text="Enter search terms in the boxes provide.  Separate multiple terms with commas." />  1110
          1244                                                                      1108
    <EditBox id="characterization" dbid="4" text="Characterization" value="" />
          1246         1248  1250                      1252
    <EditBox id="impersonation" dbid="5" text="Impersonation" value="" />
    <EditBox id="accent" dbid="1" text="Accent" value="" />
</Tab>
<!-- Future -->
<Profile id="profile" profileID="1732" title="The Way We Were" URL="www.voicezam.com/media/mp3/
    KCXJBMTYRS/320_1732.mp3" />
<Tab id="agents" text="AGENTS" modified="0">
    <Agent AgentID="232" name="Voices Voices" city="Chicago" state="IL" value="0" />
    <Agent AgentID="1345" name="Studio Couches" city="Langley" state="VA" value="0" />
    <Agent AgentID="2800" name="Lori Lemke Ltd." city="Milwaukee" state="WI" value="0" />
</Tab>
</VZVoices>
```

Figure 24

XML Read Data Document

```
<?xml version="1.0" encoding="ISO-8859-1"?>
<VZSearchReads xmlns:vzv="http://www.voicezam.com/voices">  ⌒1112
                                           ⌒1254
   <Reads total="3">
           ⌒1256
      <Read id="1" seq="1" talent_id="351" talent_name="Barger, Pete" ProfileID="3718"
              ⌒1258 ⌒1260   ⌒1262            ⌒1264                   ⌒1266
      read_type="Character" read_name="You're just jealous Johnny!"
            ⌒1268                ⌒1270                              ⌒1114
      URL="http://www.voicezam.com/media/mp3/UVIDBRFIHV/351_3718.mp3" />
           ⌒1272
      <Read id="2" seq="2" talent_id="292" talent_name="Kloninger, Jeff" ProfileID="8315"
      read_type="Character" read_name="I'll Be In Touch" URL="http://www.voicezam.com/media/mp3/AMSBBMHLPV/
      292_8315.mp3" />
      <Read id="3" seq="3" talent_id="1151" talent_name="Blanskey, Joe" ProfileID="8385"
      read_type="Character" read_name="Joe Alaskey" URL="http://www.voicezam.com/media/mp3/RADMWGAORS/
      1151_8385.mp3" />
   </Reads>
</VZSearchReads>
```

Figure 25

Playback experience using ATR

Agent – Talent Manager

Figure 37

Producer – Playlist Email

[User Name - Project Name]: Audition Manager

Agents

| # | Agent 704 | City 706 | Requested 708 | Response 710 |
|---|---|---|---|---|
| 1 | Access Talent | New York | 7 | 0 |
| 2 | Linda Jack Talent | Chicago | 12 | 3 |

Talent 716

| # | Submit Date 714 | Audition 718 | Download 720 | Talent Reel 722 | Connect 724 | Delete 726 |
|---|---|---|---|---|---|---|
| 1 | 11/05/XX | Preview | Download | KGTDLULKXS | Connect | Delete |
| 2 | 11/05/XX | Preview | Download | ICHOYWXXFM | Connect | Delete |
| 3 | 11/07/XX | Preview | Download | EWLCDDWVSP | Connect | Delete |
| 4 | <pending> | | | JINNSYJVSQ | Connect | Delete |
| 5 | <pending> | | | KDYHEIMNRS | Connect | Delete |

Audition Link: http://www.voicezam.com/Account/FDJKORTGFN/Projects/LDHVSRETHI/auditions.lst Agent Audition Call
Talent Audition Call
Help

Figure 54

SYSTEM AND METHOD FOR VOICE-OVER ASSET MANAGEMENT, SEARCH AND PRESENTATION

CROSS-REFERENCE TO RELATED APPLICATIONS

This application claims priority and benefit of U.S. Provisional Application Ser. No. 60/501,001, filed Sep. 8, 2003, and U.S. Provisional Application Ser. No. 60/549,292, filed Mar. 2, 2004, both of which are entitled "System and Method for Voice-Over Talent Search", the entire disclosure of both applications are hereby incorporated by reference.

BACKGROUND OF THE INVENTION

Field of the Invention

The present invention relates generally to voice-over talent selection, and more particularly to a system and method for voice-over talent search on a read level.

Whenever a consumer watches a television commercial or listens to a radio advertisement (referred to as a "spot"), the consumer may hear an actor using their voice to compliment or strengthen the advertisement's intended message. These unseen performers are known as Voice-Over Announcers (known in the voice-over industry as a "talent").

In the broadest scenario, an advertising agency ("agency") is hired by a client to produce a spot. An advertiser's copywriter or producer (collectively referred to herein as "producer") writes and develops a spot to specifications directly related to the associated product or service being advertised and target audience of the spot. The agency then attempts to select and hire a talent with vocal abilities that match the performance expectations, which are driven by the spot the producer is producing.

Currently, the process of talent selection is accomplished by the producer simply listening to a plurality of talent demo tapes (herein referred to as "demos") which are typically provided in audio cassette tape or compact disc ("CD"), or other hard copy media format (collectively referred to as "media"). These demos are provided to the agencies by the talent themselves or by a talent agent (the "agent") on the talent's behalf. A talent's demo will typically contain 10 to 20 different vocal performances (known in the voice-over industry as "spots") which have been assembled onto media from either previous voice-over work that the talent has performed, or simply "mocked up" in a recording studio to highlight the various vocal techniques the talent can achieve. It is important to realize that the talent's demo, containing read performances of the talent, is the single, most important marketing tool working for them today. In addition, these reads are presented in a "reel" format which is a compilation of a plurality of reads. The reel is essentially one audio file that when played, continuously recites one read after another until the end of the reel or the "track" on the audio CD or tape.

Based on current practices of the voice-over industry, selecting the right talent for a spot can be a "grinding" process for a producer. For example, the producer begins by selecting demos from an agency's shelf which holds all the demos the agency has received directly from talents or agents of the talents. Typically, these aging tapes or CDs are not dated, categorized or labeled beyond the talent's name and/or agent. This means the producer must select demos using a selection criterion based on both memories of the demo's content and on previous working experience with the associated talent and/or agent. Frequently, a selection is made randomly, in hopes that a new talent's voice will be found which works well with the spot.

After gathering a handful of tapes/CDs, the producer then listens to the performances on the reel on the tapes/CDs, one after another via a cassette or CD player. The review process is a pain-staking effort where, in linear fashion, the producer listens to all the demos, hoping to hear that "one" talent read that will perfectly match the ideal voice imagined by the producer for their spot. This review process can be extremely difficult and frustrating for the producer because the producer has to listen to the whole reel which may include reads which are of no interest to the producer. Furthermore, the producer may lose interest in the talent after listening to only one read on the reel. If the producer is lucky, the producer may find a read within a reel that the producer likes. In most cases, however, the producer must go back to the agency for more demos and the tedious process repeats.

Recently, talent and their agents have published their demos electronically to the Internet, allowing the producer to review the demos via a Web browser. Electronic publication over the Internet makes it more convenient for the talent and the agent in that the talent and the agent are no longer required to publish cassette tapes or CD media to release their demos.

However, Web publishing of demos has only added more complication to the producer's tasks. The selection and review process is nearly the same as previewing tape/CD demos in that all talent demos are presented as Website links, using only the talent's name as reference. This is similar to that of tape shelf storage. The producer must then manually review each demo link individually by selecting it from the Website. This is analogous to linear previewing of the cassette tape or CD. In addition, the demos are presented at the reel level (e.g., worldwide web dot hearvoices dot com showcases voice-over reads in one continuous reel of the talent).

Moreover, there is a further tedium introduced where the producer must locate and visit each talent or agent's Website to review the demos. This would be similar to having one tape shelf for each and every independent talent's demo and agent's demo set. Finally, after the demo links are selected, the producer must wait for the browser or media player to connect, buffer and play the audio material before previewing may begin.

Online presentation is further complicated by the dilemma that when a new talent spot is available for publication on the website, it must be first mixed "into" the demo reel. The demo reels are uploaded to the talent or agent's website. For example, cpvcpm(dot)com, voicehunter(dot)com, voiceregistry(dot)com, and voicebank(dot)com all present only reel demos. These web services lack the capabilities to present and search reads. Furthermore, these services require either .mp3 or Real Media playback or downloading. Finally, these services dilute the agent's market because agents are removed from the representation of talents. This essentially breaks the relationship with the agent's clients and gives up all the goodwill that an agent may have built up over the years.

As alternative to the websites described above, the producer can call the local talent agent and describe to the agent what type of voice and read the producer is trying to acquire. Although an agent may be skilled at knowing their talent's voice skills and placing the talent effectively, this process is imperfect and flawed (in relation to the best interest of the producer) in that only the talent represented by their respective agent may be evaluated and offered. Also, there is the possibility that the producer may become reliant on a particular agent's talent(s), leading to an agency unknowingly developing an "Audio ID" in the marketplace, as will be described below.

More often than not, the producer will simply give up on finding their ideal voice. The best alternative for the producer is to hire a "reliable" talent the producer has used in the past. The rationale in re-using the talent is that in having worked with this known talent before, the producer thinks he/she can "bend" the talent to meet the qualifications which the producer has imagined. This concession carries with it the danger of compromising the creative progression, which in turn may dilute the final product quality of agencies and/or the spot.

Reusing the same talent for multiple, unrelated spots introduces the condition where an advertising agency develops an Audio Identification ("audio ID") within its marketplace. Audio ID is where an advertising agency's broadcast material begins to take on similar audio characteristics from client to client. This may occur in both the voice-over presentation layer and also in the musical production layer. If significant, it can be completely counter-active to an agency's endeavor to stay "fresh" and unique for each of their clients.

As can be seen, there is a fundamental mismatch between a producer's approach in selecting voice-over talent material and the manner in which it is presented by either the agent or the individual talent or both. When a producer begins the search process, what the producer is really attempting to do is to locate a specific "voice" or read, similar to the one the producer imagined when the producer read their spot/script. In essence, the producer is attempting to locate a very specific talent read, not the talent itself or the talent's reels (compilations of the talent's reads), as currently being practiced in the industry. However, the talent's product is always presented in the reel format (whether in hard audio or online media), with no plausible method to allow a producer to query into it to locate the exact read they seek further spot. The technology platform and reel presentation formats work against the read selection process. Furthermore, the mismatch is additionally compounded by the fact that thousands of demo reels exist, separating the producer from their "ideal" read even further.

Succinctly put, the current manner of voice-over talent selection is a tedious and frustrating process which is destructive to the means and creative momentum required in producing unique, qualified, and persuasive advertising agency spots. Furthermore, there is no online solution that significantly improves the voiceover search and presentation process, which do not also force a change on the agent's role within the voiceover industry. Thus, there remains a need for a voice-over talent selection process which stores a plurality of talent reads (not reel), searches the read database quickly, and efficiently facilitates previewing. There also remains a need to create new business process or technology where the agent is involved in the producer-to-talent relationship.

It is accordingly the primary objective of the present invention that it provide a system and method for reducing and potentially eliminating the non-creative effect of linear presentation and selection of voice-over talents. It is a related objective that the present invention infuses creative energy and inspirational momentum into the selection process. It is further an objective of the present invention to allow for selection of the talent at a read level.

It is yet a further objective of the present invention to provide a solution for exacting and matching the producer's requirements by defining a read profile. It is a related objective that the present invention enables the producer to query and locate read(s) which fits the profile the producer is seeking. It is another related objective that the present invention enables the producer to enter read profile criteria and submit the criteria to a search engine. It is further objective of the present invention to provide a method and system for refining and narrowing the search results.

It is another objective of the present invention to provide a search engine for extracting and compiling a result set which includes all read profiles that match the entered search criteria. It is a related objective to allow the producer to narrow the search scope by modifying the search criteria. It is a further objective to allow the producer to search for reads based on sample reads.

It is still further an objective of the present invention to provide a method and system of promoting voice-over talents which revolutionizes the industry and preserves the agent's role in the produce-talent relationship. It is a related objective of the present invention to provide agent branded technologies to maintain and strengthen the agent's role. It is a related objective of the present invention to provide a method for distributing voice-over talent business cards with an alias Web address to agents and/or producers. It is another related objective that the business cards direct the agents and/or producers to an Internet site containing the reads of talents. It is a further objective that the present invention provides a method which enables talents and/or agents to dynamically promote reads without issuing new hard copy or online media.

The system of the present invention must also be of construction which is both durable and long lasting, and it should also require little or no maintenance to be provided by the user throughout its operating lifetime. The system should allow the user to update information if desired. In order to enhance the market appeal of the system and method of the present invention, it should also be of inexpensive implementation to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, an innovative and Web-based tool is provided for use by talents, talent agents, and producers to improve promotion, exposure, distribution, selection and review of voice-over talents. The present invention provides high speed internet-based voiceover asset management, search and presentation tools designed to assist and enhance the business of voiceover industry professionals. The present invention enhances the current industry standard process by allowing producers to contact agents directly to select, contact, and hire voice-over talents at the read level.

The present invention provides the option of separating a reel into individual reads or marking the reel to define individual reads. Moreover, the present invention provides a system and method for searching and selecting a talent's specific read (not simply review the talent's demo reel). To facilitate the searching process, the present invention defines a new entity within the voice-over industry called the read profile. Using the unique read profiles, a producer and/or agent performs searches and auditions on the search system of the present invention on a read level (not a reel level). The searching process is further enhanced with search refinement features provided by the present invention that allow the user to narrow the search results with the addition, subtraction, or change in the read specifications.

The present invention improves on the current practice of the voice-over industry by allowing producers to submit their auditions to the search system of the present invention (or the agent). Preferably, audition submissions occur after the producer has performed a preliminary search using the search system of the present invention, or after the producer has reviewed the agent's playlist, which is compiled based on the producer's specifications. Furthermore, a producer can submit a project (e.g., a script) to the search system to facilitate voice-over talent auditions. The project will be automatically sent to a selected group of talents or all talents available via e-mail, cell phone text e-mail or PDA. The talents may then immediately review the audition and using their phone, "read" the script into the search system, using telephony technology. The reads are then previewed and/or selected (or noted) by the producer.

The present invention further enables the producer to be immersed in the read searching process by allowing the use of (sample) voices with its voice-over recognition and matching feature to enable the producer and/or agent to accurately match the voice-over of talents with a sample voice (provided by the producer/agent or using samples provided by the search system of the present invention). In its basic form, the present invention uses a "comparator" to check the target voice-over which is produced, recorded and/or uploaded by the producer (or agent) against the digital voice-over of talents stored in the database of the present invention. The present invention can also use digital signal processing ("DSP") techniques to improve the accuracy and reliability of the voice-over recognition and matching process.

More specifically, the present invention uses two methods for voice recognition and matching, namely "template matching" and "feature analysis." With respect to template matching, the present invention contains the input templates (reads of talents), and attempts to match talent templates with the actual input using simple conditional statements. This template matching technique allows for a "match this" type previewing feature using the search system of the present invention. For example, a producer speaks the audition (the read or a portion of the read) in (as close) a rendition of what type of voice (style) the producer is looking for. The present invention then finds matching read(s) to the voice. With this feature, the producer can "speak out" the type of reads the producer is attempting to find (or use a sample provided by the present invention) and the search system matches the pitch, tempo, strain, etc. of the sample voice/read.

The feature analysis aspect of the voice recognition and matching feature of the present invention includes "sound like this" searching. Instead of trying to find an exact or near-exact match between the actual voice input and a previously stored voice template, this method first processes the voice input using "Fourier transforms" or "linear predictive coding" ("LPC"), then attempts to find characteristic similarities between the inputs and the actual digitized voice input stored in the database of the present invention. For example, when a voice-over user is previewing reads in a "preview player" of the present invention and the user finds a read/voice which the user likes and would like to hear more of (more like it). The user can request the search system to find matching voices to a selected read. Alternatively, the "sound like this" searching can be performed by matching the selected read's profile with other reads with a similar profile.

The present invention also allows for seamless read playback. The seamless read playback feature of the present invention essentially plays reads in a real time fashion. The seamless read playback feature allows the computer of the user to respond in way that the user senses as sufficiently immediate (real time) using a caching method. The real time caching method of the seamless read playback feature is implemented with the assistance of two parallel processes which together provide seamless playback results. The two parallel processes are a background process and a foreground process, each contributing to the main process to facilitate seamless read playbacks.

The background process successively "plays" each audio files, preferably .mp3 files, in muted playback until the process detects that the audio file has been fully downloaded (cached) in its entirety to the hard drive of the local machine. The background process then suspends muted playback and continues on to the next audio file until all audio files have been silently played (cached). The parallel foreground process audibly plays each audio file in succession in their entirety. Because the background process has already passed through and thus cached the current foreground process file being played, the foreground process detects the audio file on the local machine's temporary Internet file cache and plays from the temporary Internet file instead of requesting an online download, thus producing real-time playback.

The present invention additionally, in one aspect, leverages the use of the Internet to replace the outdated process of delivering demo on a CD by providing a method for the talent to direct a potential employer to the Internet, particularly a Website or an ASP script file, to review the demo of the talent. For example, a talent applies for an account with the present invention. Then, the talent uploads reads to the account and obtains a Uniform Resource Locator ("URL") for the demo. Next, the talent and/or agent prints the URL on a business card and distributes the business card instead of a hard-copy CD of their demo reel. The business card provides the URL with a pathname containing an alias suffix for introducing a talent to business contacts and for directing the business contacts to a Webpage where dynamical, biographical, general, and read sample information of the talent is presented.

Even with all the revolutionary features and services provided by the present invention, the present invention does not "shut out" the agent. But rather, the present invention enhances the agent's position within the voiceover industry with agent branded technologies. The agent branded features of the present invention distinguish the present invention's technology from other product variants (e.g., voicebank(dot)com) and leverage the goodwill of the agent. Agent branded technologies of the present invention includes an agent site-talent player ("ASTP"), an agent site-talent redirect ("ATR"), an agent read playlist, and audition submission.

Thus, in part, the present invention provides a method for voice-over talent searching. The method includes arranging the audio demos of talents into individual reads in which the demos are contained in at least one reel that contains a plurality of reads. With reads separated, the present invention profiles the individually separated audio reads to classify the audio reads for storage and query retrieval. Next, the method involves combining the separated audio reads with their corresponding profile data to create read profiles in which each of the read profiles contain a first and a second set of data, including a first set of data containing an audio read file and a second set of data containing profiling data associated with the audio read file. The read profiles are stored in a database which contains read profiles from a plurality of talents.

In addition, the method includes allowing a user to enter search parameters for retrieving reads with read profiles which substantially matches the entered search parameters; matching the entered search parameters with the read profiles; displaying matched reads to enable the user to audition the matched reads, in which the matched reads are auditioned in substantially real-time; caching matched reads to allow for substantially continuous playback of the matched reads;

allowing the user to select at least one preferred read during the previewing process to allow the user to request talent information associated with the preferred read; and revealing talent information associated with the preferred read to the user.

In an embellishment, the method further includes enabling the user to input a sample voice as a search parameter, in which the sample voice is used as a template for matching reads stored in the database to the sample voice using at least one digital signal processing technique; enabling the user to search for reads stored in the database which resemble a particular voice or read; allowing talents to audition for reads via telephony technology; and determining the number of connects available to the user before revealing talent information to the user, in which the number of connects defines to the number of talent information that can be revealed to the user.

In a further embellishment, the present invention provides a system for facilitating voice-over talent searching which includes: a reel separator for separating or marking an audio demo reel containing a plurality of reads of a talent into individual reads; a visual interface for allowing a user to profile the individually separated/marked audio reads to classify the audio reads for storage and query retrieval; a database for storing the individually separated/marked audio reads with their corresponding profile data; a search engine for allowing the user to enter search parameters for retrieving reads with read profiles which substantially matches the entered search parameters; a display for displaying matched reads to enable the user to audition the matched reads, in which the matched reads are auditioned in substantially real-time; and a caching program to cache matched reads to allow for substantially continuous and real-time playback of the matched reads.

It may therefore be seen that the present invention teaches a system and method for reducing and potentially eliminating the non-creative effect of linear presentation and selection of voice-over talents. The present invention infuses creative energy and inspirational momentum into the selection process by allowing for selection of the talent at a read level. The present invention further preserves and promotes the agent's role within the voiceover industry.

Furthermore, the present invention provides a solution for exacting and matching the producer's requirements by defining a read profile. The present invention enables the producer to query and locate the reads which fits the profile the producer is seeking. In addition, the present invention enables the producer to enter read profile criteria and submit the criteria to a search engine. The present invention further allows the producer to search for reads based on sample reads.

Yet further, the present invention provides a search engine for extracting and compiling a result set which includes all read profiles that match the entered search criteria. The present invention also allows the producer to narrow the search scope by modifying the search criteria within the returned query set of data.

Additionally, the present invention provides a method of promoting voice-over talents that revolutionizes the industry. The method involves distributing voice-over talent business cards to agents and/or producers. The business cards direct the agents and/or producers to an Internet URL containing the reads of talents. The method enables talents and/or agents to dynamically promote reads of talents without issuing new hard copy media.

The system of the present invention is of a construction which is both durable and long lasting, and which will require little or no maintenance to be provided by the user throughout its operating lifetime. The system of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 9 illustrates additional read profiling categories and demonstrates how each category is given a 1 to 5 value similar to FIG. 8;

FIG. 14 is a design layout diagram of the ZAMCARD of the present invention with a biographical box view;

FIG. 17 illustrates a design layout of the GUI of FIG. 16 with the demographic tab selected;

FIG. 18 illustrates a design layout of the GUI of FIG. 16 with the delivery tab selected;

Figure 19:
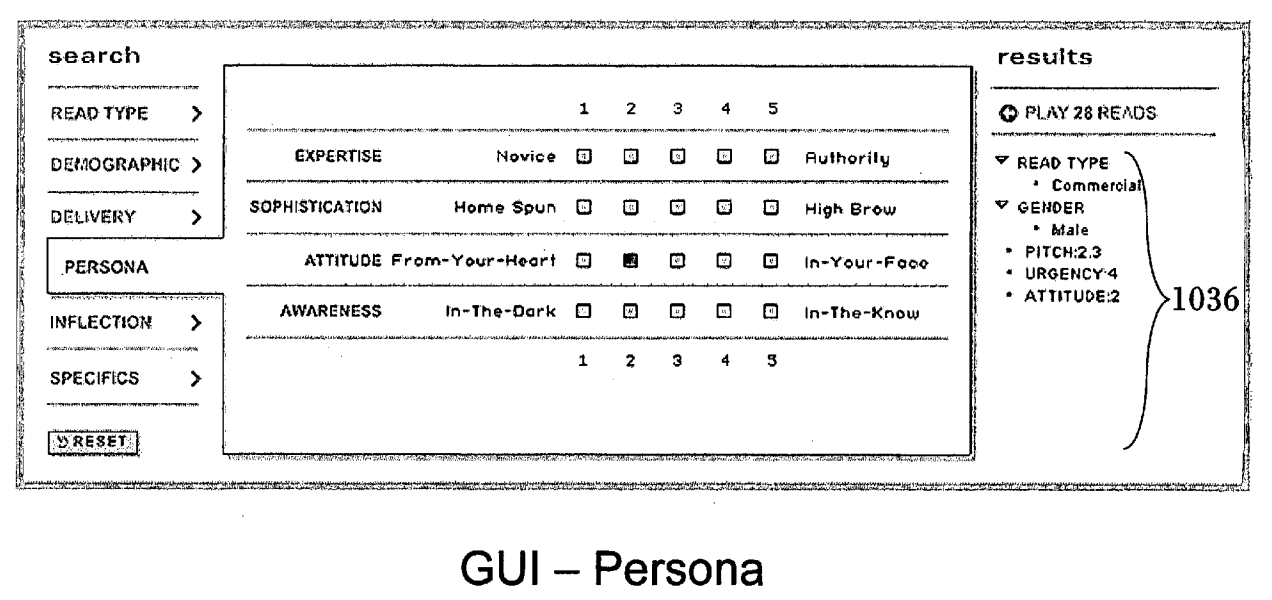

FIG. 19 illustrates a design layout of the GUI of FIG. 16 with the persona tab selected;

Figure 21:
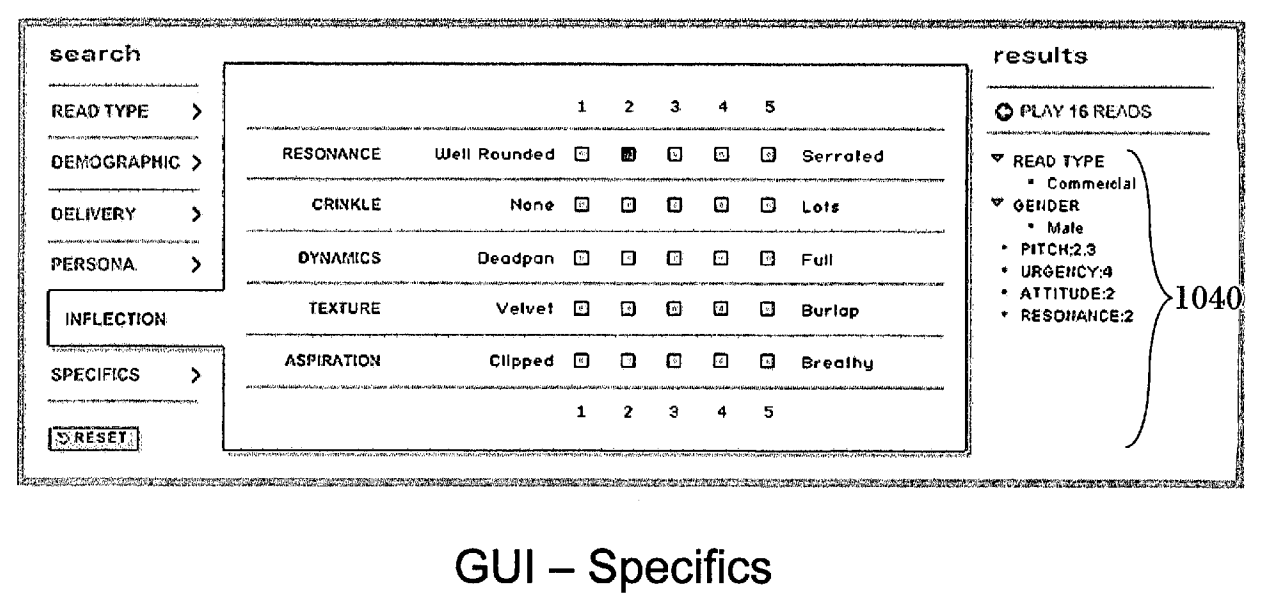

FIG. 21 illustrates a design layout of the GUI of FIG. 16 with the specifics tab selected;

FIGS. 23a-23e and 24 show sample source code of the XML search document used in the search refinement process of FIG. 15;

FIG. 25 shows sample source code of the XML read document used in the search refinement process of FIG. 15;

FIG. 37 illustrates a user interface used in creating the playlist email for the producer for the process of FIG. 35;

FIG. 54 illustrates a design layout of the producer's audition manager of the present invention;

DETAILED DESCRIPTION OF THE PREFERRED EMBODIMENT

The preferred embodiment provides a voice-over talent search system and method for searching and selecting a specific read of a talent. The voice-over talent search system of the present invention enables read-specific searches by defining read profiles. Using the unique read profiles, a producer and/or agent perform searches and auditions on the search system of the present invention on a read level (not a reel level). Matching reads to searchable criteria on a read level ensures greater accuracy of search results (especially using the voice matching feature of the present invention) and reduces the audition time for the producer and/or agent. The audition time and/or latency of the read playback are also reduced using the caching method of the present invention to facilitate real-time read playback. In addition, talents can submit and review audition requests using telephony technology from remote locations and use an alias URL for promoting their performances without having to issue bulky tapes or CDs. Agents can continue to take an active role in representing talents with the branding features of the present invention.

Overview of the Voice-Over Talent Search System

Figure 1:
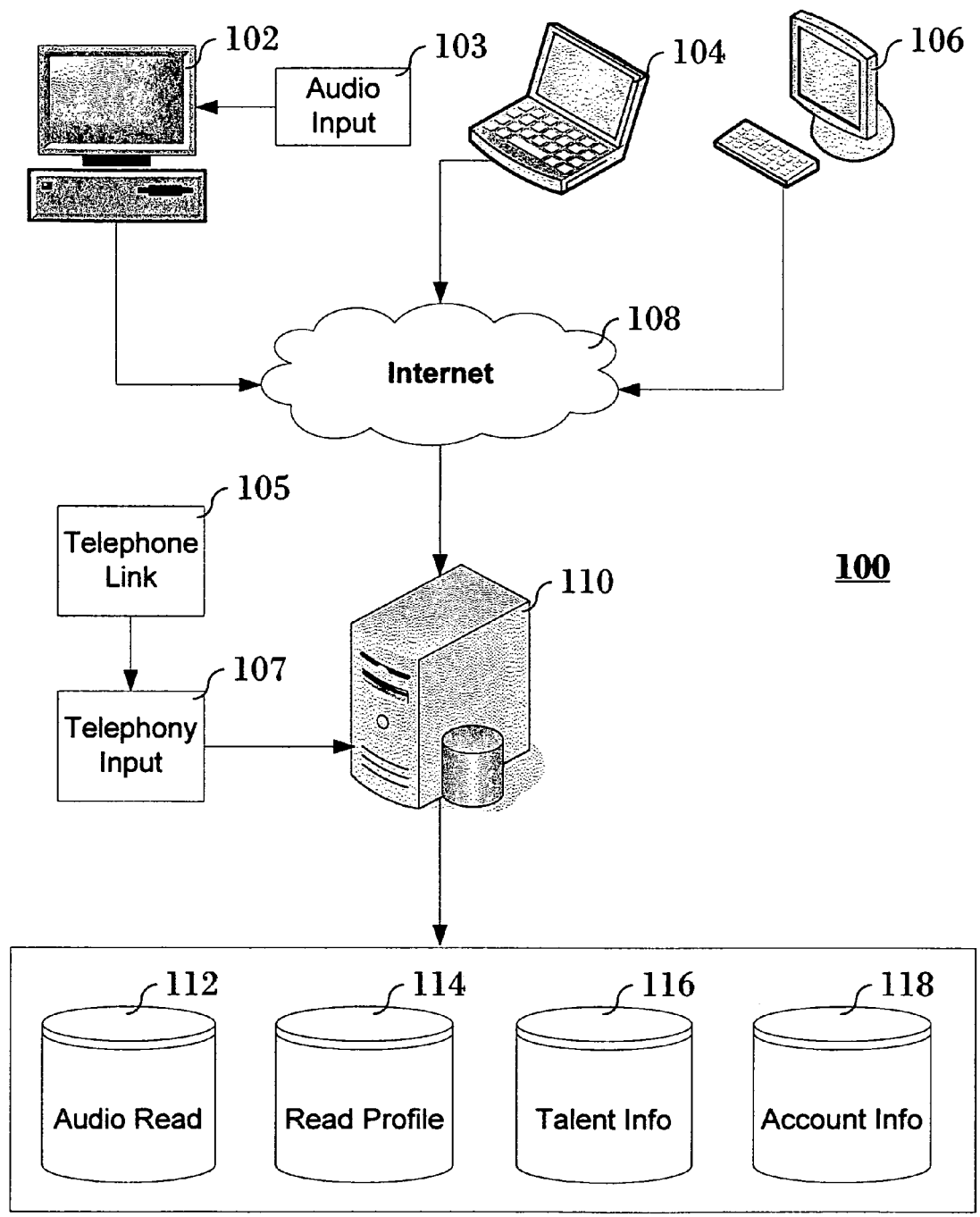
FIG. 1 is an illustration of a network structure diagram to realize the principles of the present invention.

Referring first to FIG. 1, a simplified network infrastructure to realize a voice-over talent search system 100 is shown. The composition of the search system 100 includes a plurality of talent terminals 102, agent terminals 104, and producer terminals 106. These terminals 102, 104 and 106 are, for example, personal computers connectable to the Internet 108. Each of these terminals can include an audio analog or digital input device, such as audio analog or digital input device 103 shown associated with terminal 102. A server 110, which contains the business rule software for the search system 100, is also connectable to the Internet 108 and provides terminals 102, 104 and 106 access to the search system 100 via a Web browser operating on terminals 102, 104 and 106. The server 110 is connected to a plurality of databases, including an audio read database 112, a read profile database 114, a talent information database 116 and an account information database 118. These databases (112, 114, 116 and 118) provide data to the search system 100. In addition, in some instances, it may be desirable to supply talent or search information to the server 110 using a telephone communication channel including a telephone link 105 and a telephony card 107.

Using the network infrastructure shown in FIG. 1, a talent can upload read audio files and create read profiles via the talent terminal 102. Likewise, an agent can upload read audio files, create read profiles and search the databases 112, 114, 116 and 118 via the agent terminal 104. Similarly, a producer can also request queries from the server 110 and interact with the server 110 via the producer terminal 106.

Although the network infrastructure of FIG. 1 is shown using the Internet 108, one skilled in the art recognizes that the search system 100 of the present invention can be realized on any network (preferably TCIP packet communications based network), including an Intranet, a local-area-network ("LAN"), a metropolitan area network ("MAN") and/or a wide-area-network ("WAN").

Figure 2:
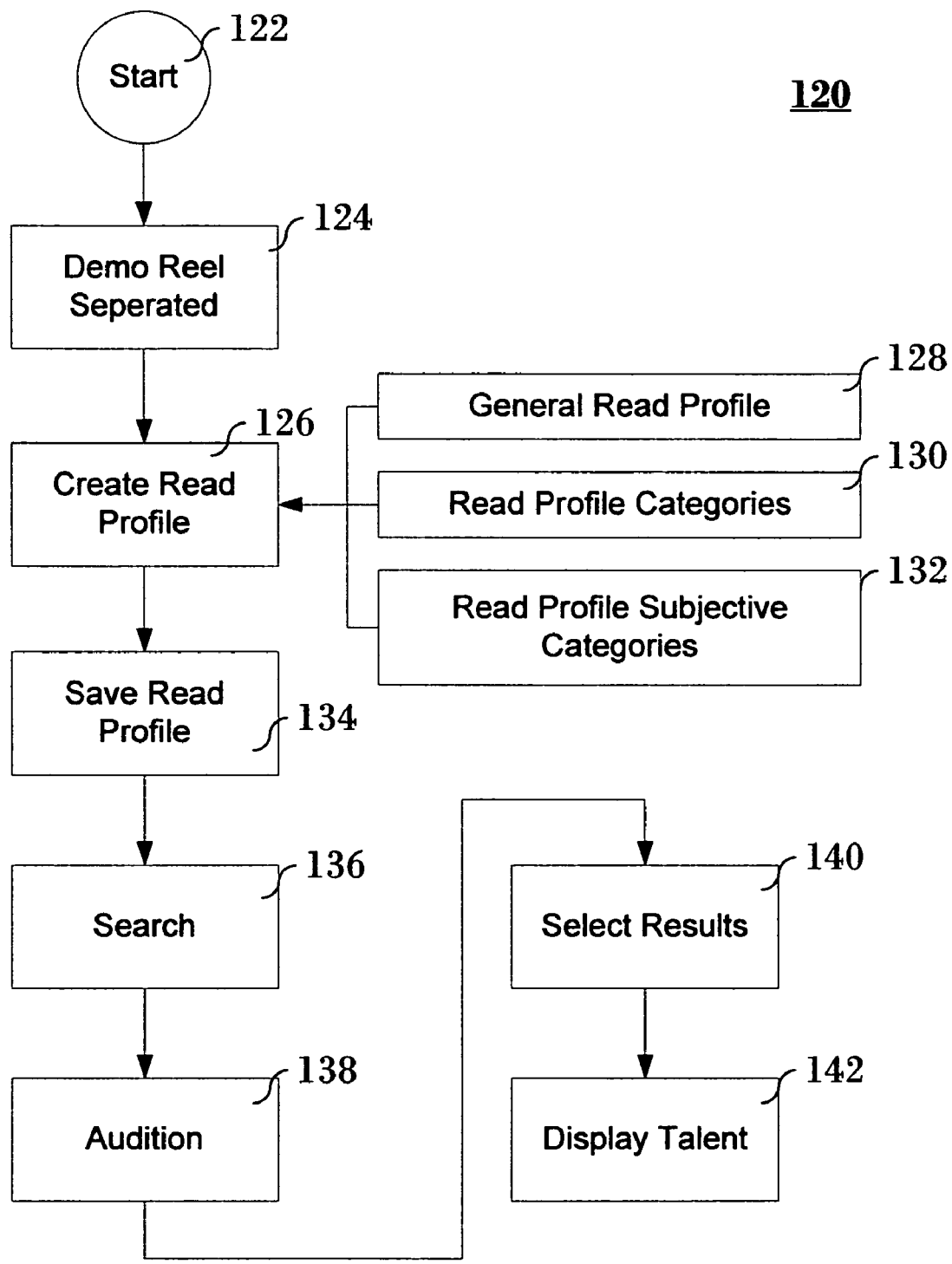
FIG. 2 is a flowchart showing the general process of searching for a voice-over talent on a read level.

Referring next to FIG. 2, the workings of the present invention is outlined via an illustration of a simplified flowchart 120 of the process of the present invention. The process begins at a start step 122. Next, the process proceeds to a separate demo reel step 124 in which the demo reel of a talent is separated into individual reads by the search system 100. The separate demo reel step 124 is followed by a create read profile step 126 in which the creation of the read profile includes, for example, a general read profile step 128, a read profile categories step 130 and a read profile subjective categories step 132.

As will be described further below, the general read profile step 128 allows a user or personnel of the search system 100 to classify the individual reads using search parameters which will enable a searcher (e.g., producer and/or agent) to accurately search for reads which match the general read profile data entered by the searcher. Similarly, the read profile categories step 130 seeks to further refine the classification of the reads to facilitate searching. Optionally, the read profile subjective categories step 132 allows the talent (or others authorized to profile the reads of that talent) to include subjective terms into the read profile.

Preferably, the create read profile step 126 creates a combination of two permanently connected sets of data. The first set of data for the read profile is a binary, audio file which, when played, renders a single, audio read of a talent. The second set of data is the associated profiling data to define and classify the audio read for storage and query retrieval.

Returning to the create read profile step 126, after the reads are profiled, the read profiles are saved in a database (e.g., the read profile database 114) at a save read profile step 134. The talent and/or agent may load as many read profiles as desired, where each read profile represents a unique talent read performance. Once loaded, the read profile is attached or associated to the account of the talent or agent. The uploaded read profile then becomes a searchable entity along with all other loaded, talent read profiles within the search system 100.

With the demo reel separated into individual reads and the reads profiled, a producer can search on the search system 100 of the present invention at a producer search step 136. For example, from a search page, the producer is presented with the ability to enter read profile criteria and submit the criteria to the search system 100. The search system 100 then extracts a result set which includes read profiles that match the entered criteria. If the result set is too large, the producer can narrow the search scope by modifying the search criteria and then rerunning and/or resubmitting the query.

The voice-over talent search system 100 matches the criteria to the read profile using the entered search data and/or other techniques (e.g., digital signal processing) which will be described below. The result set is presented to the producer as a list of playable audio URL links. Each link represents the audio portion (i.e., read) of a read profile which matched the search parameters. The list may contain a plurality of reads from a plurality of talents. It is important to emphasize that the producer is simply working with reads instead of talents or demo reels.

From the result/list of matches, the producer may select and request preview playback from the selected match at a producer auditions selected match step 138. The list can be rapidly previewed (in real-time) by the producer to perform final read selection. Each time the producer selects a link, the audio portion of the selected read is played (previewed). At any time, the producer can remove reads that do not correspond to the ideal voice the producer desires. The previewing process of the producer auditions selected match step 138 continues until a final single read or a list of reads, which best represents the producer's imagined ideal, remains.

If so desired, at a request talent information step 140, the producer can request information about a particular talent or talents based on the audition. For example, the producer selects a link and requests that the search system 100 presents the associated contact information of the talent. The voice-over talent search system 100 then displays, sends and/or forwards the talent information to the producer at a talent display step 142. The producer will use talent information to contact and hire the selected talent either directly or through the talent's agent.

Once a talent is selected, the producer can negotiate a price, hire the talent and/or select a professional recording studio in which to produce the voice-over read for the producer's advertisement spot. Preferably, the producer and talent can meet at a local studio. Alternatively, the "session" can be performed via "phone patch" in which the producer monitors and directs the talent from a remote location and directs the talent through, for example, a phone line. The phone line is patched into the studio's recording mixer where the talent is able to take direction through their headphones. The patch also allows the reverse in which the producer is able to listen to the voiceover during playback.

Additionally, the availability of the Internet, dropping broadband pricing and increased quality of inexpensive, semi-professional audio production tools can provide a talent with access to virtually any producer in the world without the use of a professional recording studio. For example, a talent can setup a home-based production studio and from there, work with any producer via a phone patch. Alternatively, the talent and producer may work together to produce the final "Spot" via an ISDN link, providing the producer near-perfect recording studio audio quality in real-time.

The talent can read the spot (from a professional studio, home-based studio or using telephony technology), work with the producer and edit the read as desired. Once a final read is created, the talent can immediately render the read to fit the producer's selected audio media format (e.g., .wav, .aiff or .mp3 file format, etc.) and send the read via e-mail to the producer or directly to the production studio for final online production of the spot. In this way, neither the talent nor the producer has incorporated a recording studio's costs to produce the voiceover portion of the spot.

Profiling and Searching on a Read Level

Figure 3:
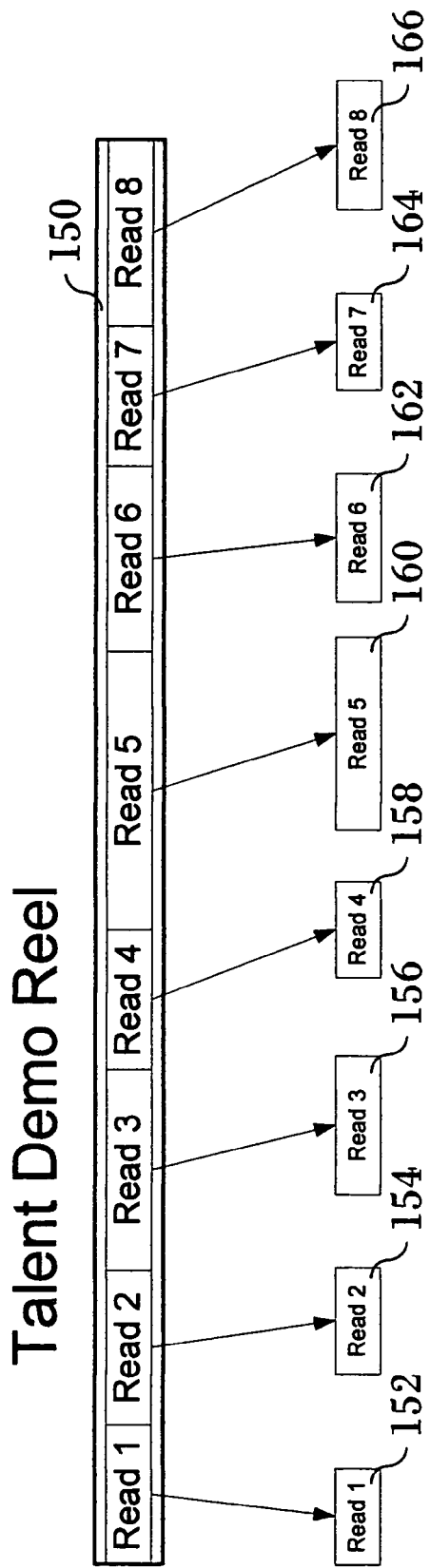
FIG. 3 shows how a talent demo reel is separated to produce individual (preferably binary audio) reads to facilitate the searching process of FIG. 2.

Referring to FIG. 3, which shows a composition of the typical reel 150 of a talent, the reel 150 exemplifies the prior art's use of the reel 150 to showcase reads of a talent in one continuous audio string. As shown, reads 1-8 are combined into one audio string/file, the reel 150. The prior art uses the reel 150 to, for example, demo eight different demo reads of the talent, continuously one after another. For instance, the reel 150 can be a commercial reel in which the reel 150 demonstrates eight different commercial reads of the talent in a single, continuous audio string. One or all of the eight reads may have varying pitches, paces and/or qualities that do not apply to the producer's intended voicing of their spot, but using the current practices of the prior art, the producer must listen to all eight reads on the reel 150. The frustration and burden carried by the producer and/or agent is further amplified when considering a plurality of talents with a plurality of reels, each with their own plurality of reads.

To overcome the disadvantages of presenting reads in a reel format, the present invention separates the reel 150 into eight individual reads (read 152, read 154, read 156, read 158, read 160, read 162, read 164 and read 166). Separating the reel 150 into individual reads (152, 154, 156, 158, 160, 162, 164 and 166) facilitates the presentation of the talent at a read level (not a reel level) where the search system 100 can accurately match the producer/agent's search criteria to an individual read profile (not an unsearchable reel).

In some cases, talents may choose to and/or can submit and upload their reads individually to the search system 100 of the present invention. In other cases, the present invention can automatically detect and separate reads from a reel using, for example, sound filters which detect the beginning and ending of a read. Alternatively, a user can manually separate the reads from a reel into individual reads using software and/or recording/audio tools known in the art.

In other cases, however, it is sometimes impractical to break out and create separate audio media files for each read within a talent's demo reel. For example, when a talent has a pre-established demo reel, located on either the talent's own website or their agent's website, the talent or agent may be unable or unwilling to alter the methods and practices of presenting their demo reel. In response, the present invention accounts for these barriers by optionally eliminating the absolute requirement of creating separate read audio media files for the parent read profile by using a read delineation feature.

Figure 4:
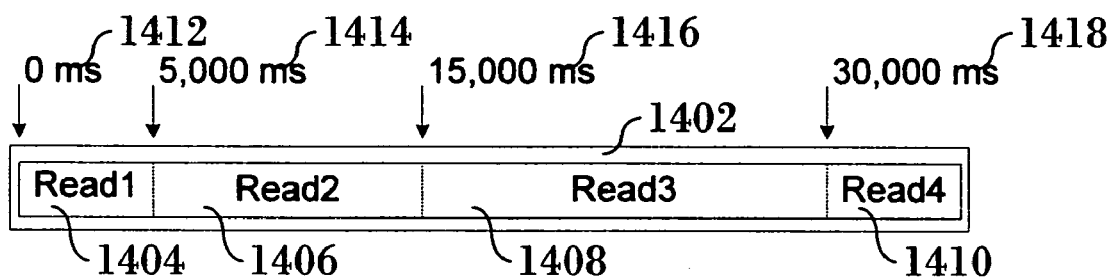
FIG. 4 illustrates a 35-seconds reel with four reads that have been delineated or marked into individual reads.

Referring to FIG. 4, a 35-seconds talent demo reel 1402 with four reads 1404, 1406, 1408, 1410 is shown with the read delineation feature of the present invention applied. The read delineation feature of the present invention allows the talent or agent to create a read profile which references time positions within the talent's preexisting original demo reel audio media, instead of a separate read audio media file, as described above. As shown, the read delineation feature is accomplished by denoting the start 1412, 1414, 1416, 1418 and stop audio playback time positions of each read within the original (parent) demo reel, rather than creating a separate audio media file for each desired read and then referencing it. In this way, instead of recreating each read as a separate audio media file and then loading them individually into the read player, the player needs to only load the single demo reel and then play the individual reads within the reel by referencing the defined start/stop time positions defined in the read profile. With read delineation, the read profile does not contain a copy of the audio Read media extracted from the original (parent) audio media reel. Instead, it contains pointer values to the start 1412, 1414, 1416, 1418 and stop time positions within the original (parent) audio media reel, effectively defining the starting point and length of the read audio.

Referring still to FIG. 4, read delineation within an audio demo is accomplished by defining the read "In" 1412, 1414, 1416, 1418 and "Out" points within the demo, preferably as absolute millisecond of time values from the beginning of the demo media. The 35-seconds reel shown in FIG. 4 contains four reads: 5 seconds, 10 seconds, 15 seconds and 5 seconds in length, respectively. As shown in Table I, the In and Out points are defined as:

TABLE I

| Read Number | In Point (ms) | Out Point (ms) |
|---|---|---|
| Read 1 | 0 | 4,999 |
| Read 2 | 5,000 | 14,999 |
| Read 3 | 15,000 | 29,999 |
| Read 4 | 30,000 | 34,999 |

In the preferred embodiment, when a read profile is defined, the user is provided with methods to: view the complete demo reel and each individual read In/Out points in graphical representation; playback/preview the complete original demo reel audio; playback/preview all individual reads as defined by the read sequential order; playback/preview any individual read as denoted by In/Out points; mark and define In and Out points based on read positions within the demo reel using graphical, audio editing type tools where a section of the audio may be graphically "painted" and denoted as a read; mark and define In and Out points based on read positions within the demo reel using simple entries of In/Out milliseconds positions into provide edit boxes; graphically move the In/Out points on the graphical representation of the demo reel audio; and dynamically move the In/Out points on the graphical representation of the demo reel audio by clicking and up/down graphical control. The control will dynamically increment/decrement the In/Out value and the graphical representation will reflect the value changes.

The present invention also provides the option to (re)sequence playback of individually defined read sections into any desired playback order. Referring to FIG. 4, the user may set the audio playback sequence to Read 3 1416, Read 1 1412, Read 4 1418, and Read 2 1414.

As apparent to one skilled in the art, one of the advantages of the read delineation feature of the present invention is that no modifications are necessary to the original (parent) demo reel. In addition, although sections of the audio file are played out of sequence, the playback is completely seamless to the listener since the audio player is simply rendering audio portions of the original (parent) demo reel linearly in real-time.

Figure 5:
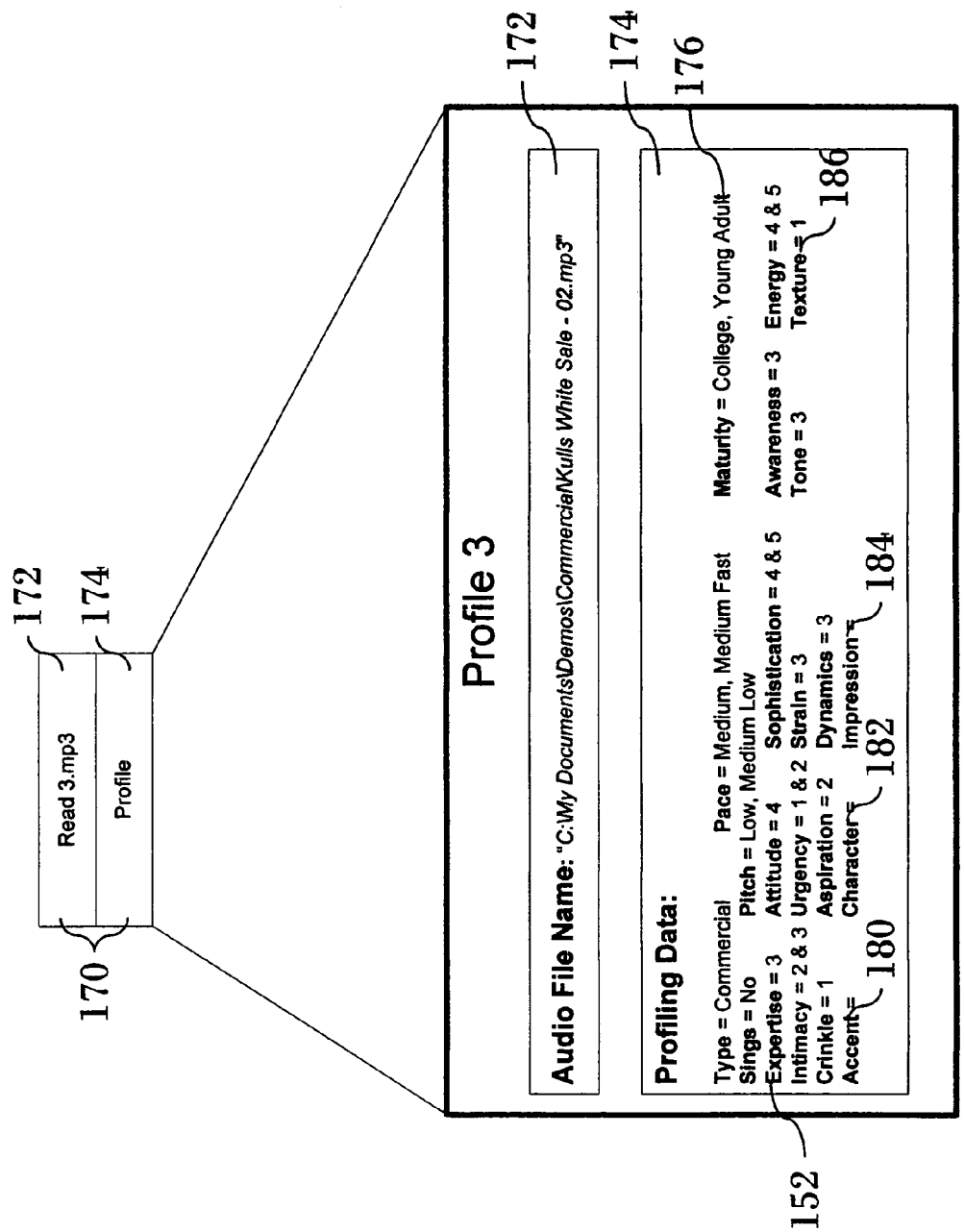
FIG. 5 is a diagram illustrating how each read audio file is joined with its search profile data to create a read profile to facilitate the searching process of FIG. 2.

Referring now to FIG. 5, there is shown a data view of the combined profile, in particular, audio read 3 file (172) is combined with the search profile data 174 to create a read profile 170. The profiling data 174 includes general profiling data and read profile categories, and subjective read profile categories. For example, as shown, the profiling data 174 for read 3 (172) designated a general profile data for maturity level at the college level (176) and a 3 value for the expertise category (178). In addition, the profiling data 174 includes subjective categories, such as accent 180, character 182, impression 184 and texture 186.

Figure 6:
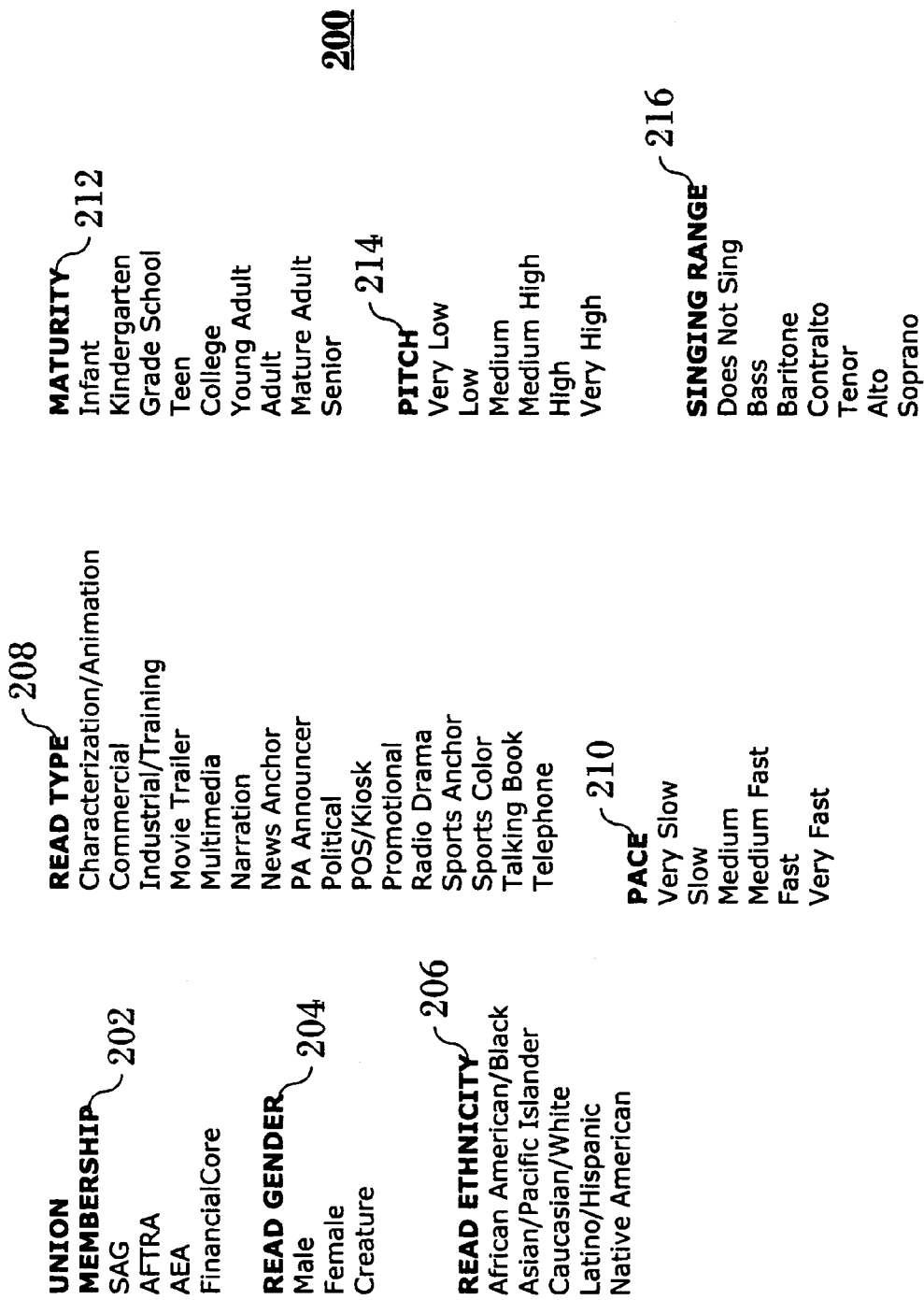
FIG. 6 provides samples of the general read profiling data which can be used to create the read profile.

More specifically, FIGS. 6 through 10 further elaborate on the general profile data, the categories and subjective categories, respectively, in greater detail. In particular, FIG. 6 shows the general profile data 200 to include a union membership group 202. Preferably, the union membership group 202 includes the Screen Actors Guild ("SAG"), the American Federation of Television and Radio Artists ("AFTRA") and the Actors' Equity Association ("AEA"). The general profile data 200 also includes a read gender group 204 which classifies the reader (or voice portrayed in the read) as a male, female or creature reader. The general profile data 200 further refines the profile of the talent using a read ethnicity group 206 which groups the reader (or voice portrayed in the read) into an African American/Black, Asian/Pacific Islander, Caucasian/White, Latino/Hispanic or Native American background and more. In another related group, a maturity group 212, the general profile data 200 identifies the read (or voice portrayed in the read) as infant, kindergarten, grade school, teen, college, young adult, adult, mature adult or senior like.

Another profiling data provided by the general profile data 200 is a read type group 208 which categorizes reads into a read type, including characterization/animation, commercial, DJ, instructional/training, movie trailer, multimedia narration, news anchor, PA announcer, political, POS/Kiosk, promotional, radio drama, sports anchor, sports color, talking book and telephone. Other group classifications provided by the general profile data 200 include a pace group 210, a pitch group 214 and a singing range group 216. The pace group 210 classifies the pace of the read as very slow, slow, medium, medium fast, fast or very fast. The pitch group 214 groups the pitch of the read as very low, low, medium, medium high, high and/or very high pitch. The singing range group 216 profiles the read and/or talent as does not sing, bass, baritone, contralto, tenor, alto or soprano.

Figure 7:
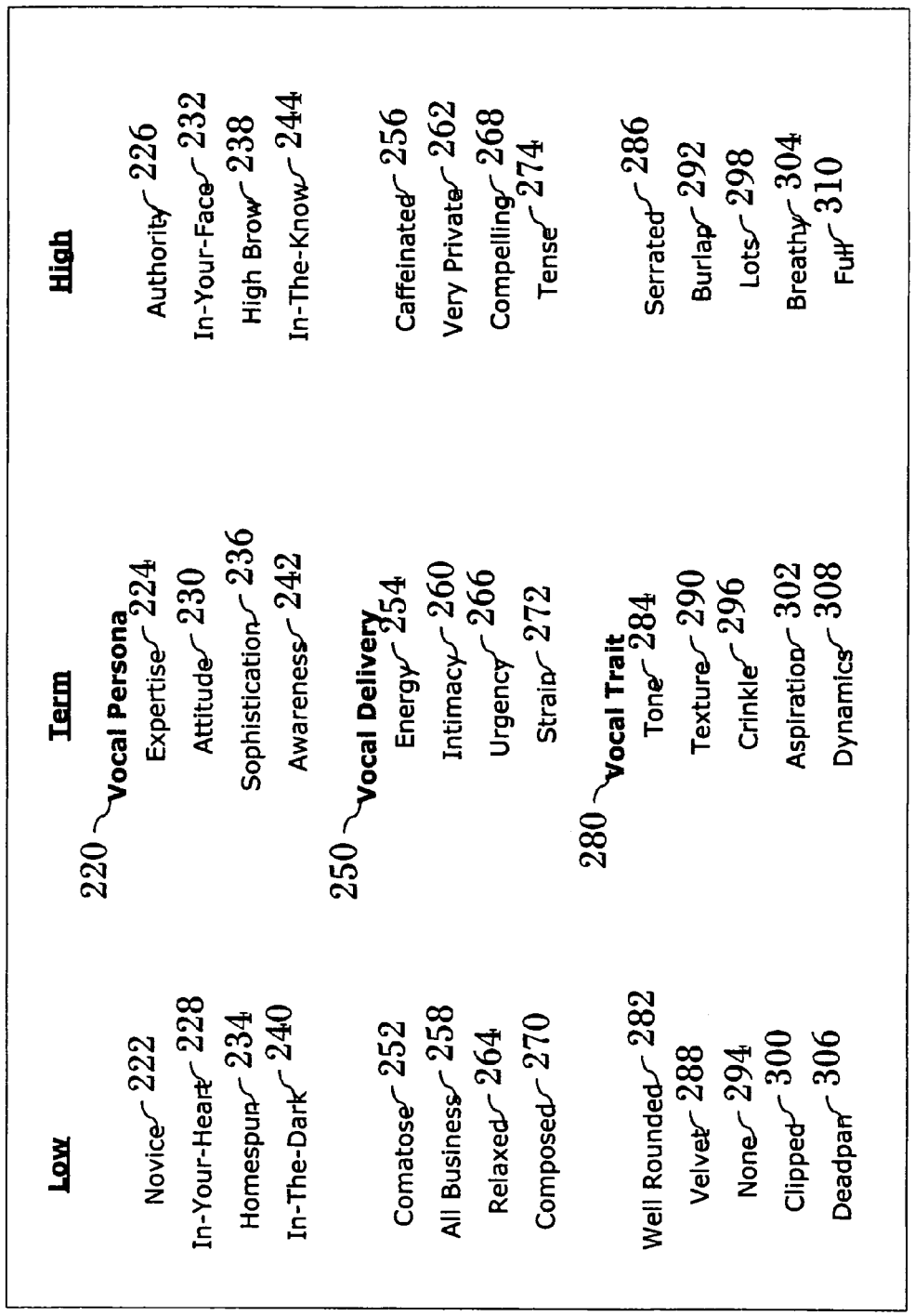
FIG. 7 is a sample list of the specific read profiling categories and terms, including the low end and high end range terminology corresponding to a profiling term.
Figure 8:
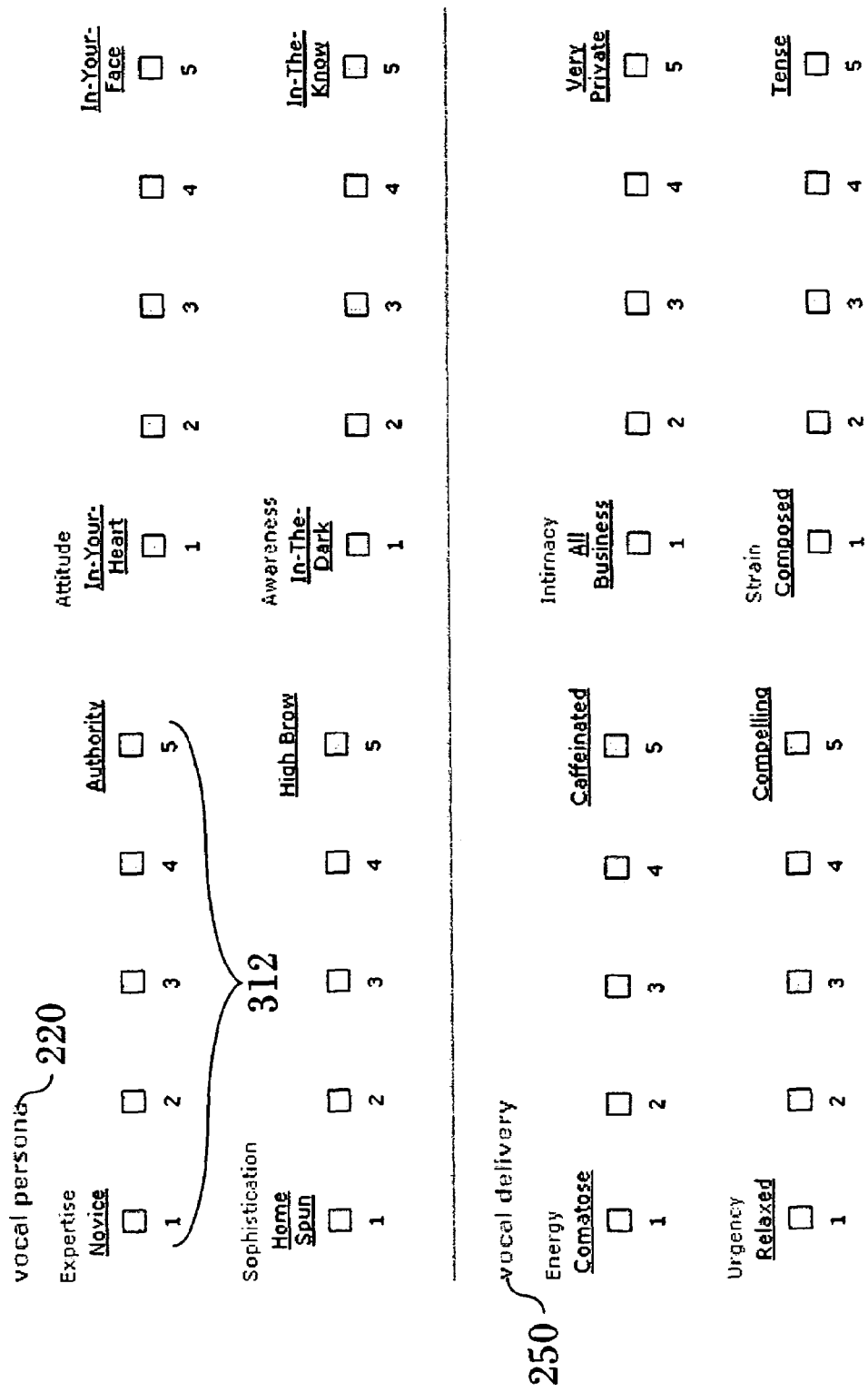
FIG. 8 illustrates read profiling categories and demonstrates how each category is given a 1 to 5 value to rate each category.

FIGS. 7 through 9 show three main groups of vocal categories that the search system 100 uses to further organize the individual reads of the talent. In particular, FIG. 7 shows that the three main groups are a vocal persona 220, a vocal delivery 250 and a vocal trait 280. The vocal persona 220 group provides descriptive words which describe how the talent projected the personality of the read. For example, the vocal persona 220 category includes descriptive evaluation of the vocal persona of the talent in such persona type as an expertise 224, an attitude 230, a sophistication 236 and an awareness 242. Each of these persona types is further assigned a low end and a high end label to help guide the user in evaluating individual reads of the talent. For example, the expertise 224 persona type has a novice 222 label to designate the low end and a authority 226 label to designate the high end. The attitude 230 persona type designates the low end using an from-your-heart 228 label and the high end using an in-your-face 232 label. The sophistication 236 persona type rates the low end as a homespun 234 and the high end as a high brow 238. The awareness 242 persona type designates the low end label as a in-the-dark 240 and the high end label as a in-the-know 244.

Referring still to FIG. 7, the vocal delivery 250 group seeks to profile and measure the delivery of a read using an energy 254, an intimacy 260, urgency 266 and a strain 272 metric system. The standard labels used in evaluating reads, in terms of delivery, for the low and high end of the energy 250 are a comatose 252 and a caffeinated 256, respectively. The intimacy 260 is given an all business 258 label for the low end and a very private 262 for the high end. A relaxed 264 and a compelling 268 are considered low and high end, respectively, for the urgency 266 delivery type. The strain 272 delivery type is measured using a composed 270 as the low end designation and a tense 274 as the high end designation.

The vocal trait 280 group profiles reads using descriptive words which describe the distinguishing feature of the vocal trait of a read, including a tone 284, a texture 290, a crinkle 296, an aspiration 302 and a dynamics 308. For example, the tone 284 has a well rounded 282 label to designate the low end and a serrated 286 label to designate the high end. The texture 290 labels the low end using a velvet 288 label and the high end using a burlap 292 label. The crinkle 296 determines whether there are lots 298 or none 294 of crackling sound in the vocal of the talent for a particular read. The aspiration 302 determines the breathy-ness or airy-ness of the vocal delivery for a particular read, whether it is clipped 300 or breathy 304. The dynamics 308 designates the low end label as a deadpan 306 and the high end label as a full 310.

Turning now to FIGS. 8 and 9, the vocal persona 220, the vocal delivery 250 and the vocal trait 280 classifications are further refined using a numbering scheme to rate the vocal persona, delivery and trait of reads. As shown in FIGS. 8 and 9, the vocal categories are given a one to five value (generally designated as 312) corresponding to a low and high end value, respectively.

Rather than relying on a strict low or high end rating, the present invention provides a rating system using numbers to help guide the user in evaluation and/or classifying reads. The rating system of the present invention using numbers ensures that reads are evaluated and classified accurately for the search system 100. In an embellishment, the present invention provides an audio sample of, at least, the (extreme) low end and the high end rating to help guide the user in classifying the audio read.

Figure 10:
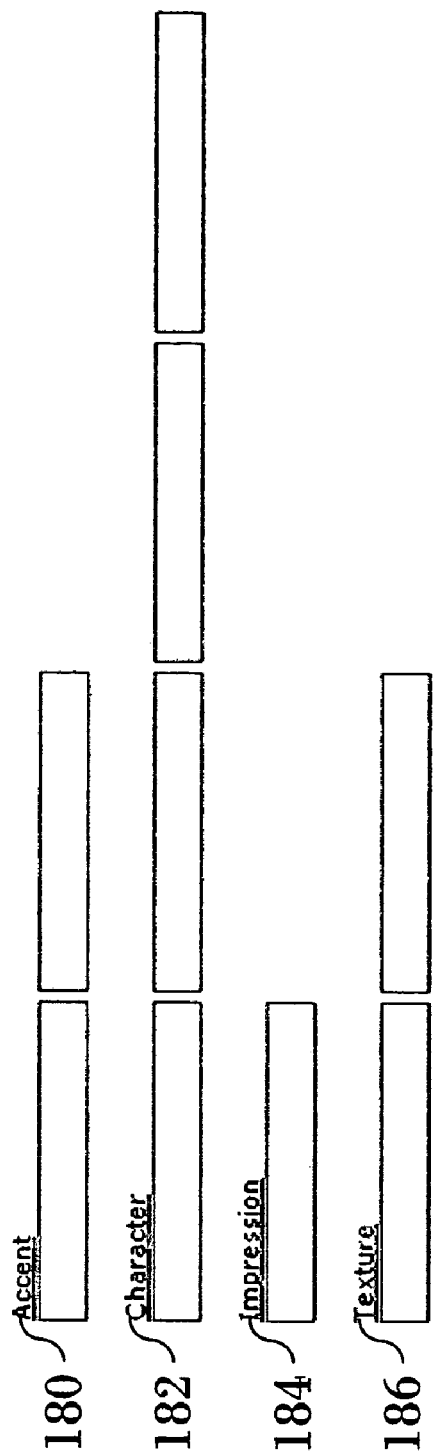
FIG. 10 shows samples of the read profiling subjective categories.

Referring next to FIG. 10, which shows the subjective categories of the read profiling process, as previously mentioned, the subjective categories include the accent 180, the character 182, the impression 184 and the texture 186. The accent 180 provides means for the talent and/or agent to self-evaluate how the read and/or individual words in the read are pronounced or stressed (e.g., English, East Indian, etc.). The character 182 provides means for the talent and/or agent to self evaluate how the talent recreated the personality or "part" for the read (e.g., bartender, office manager, flight attendant). The impression 184 provides means for the talent and/or agent to self-evaluate how the talent imitated (in caricature) a noted personality and/or portrayed a characteristic, trait or feature from the read (e.g., Cagney, Stewart, Serling, and Hitchcock). The texture 186 provides means for the talent and/or agent to describe the basic scheme or structure of the read (e.g., sexy, nasal, smokey, gravel).

Figure 11:
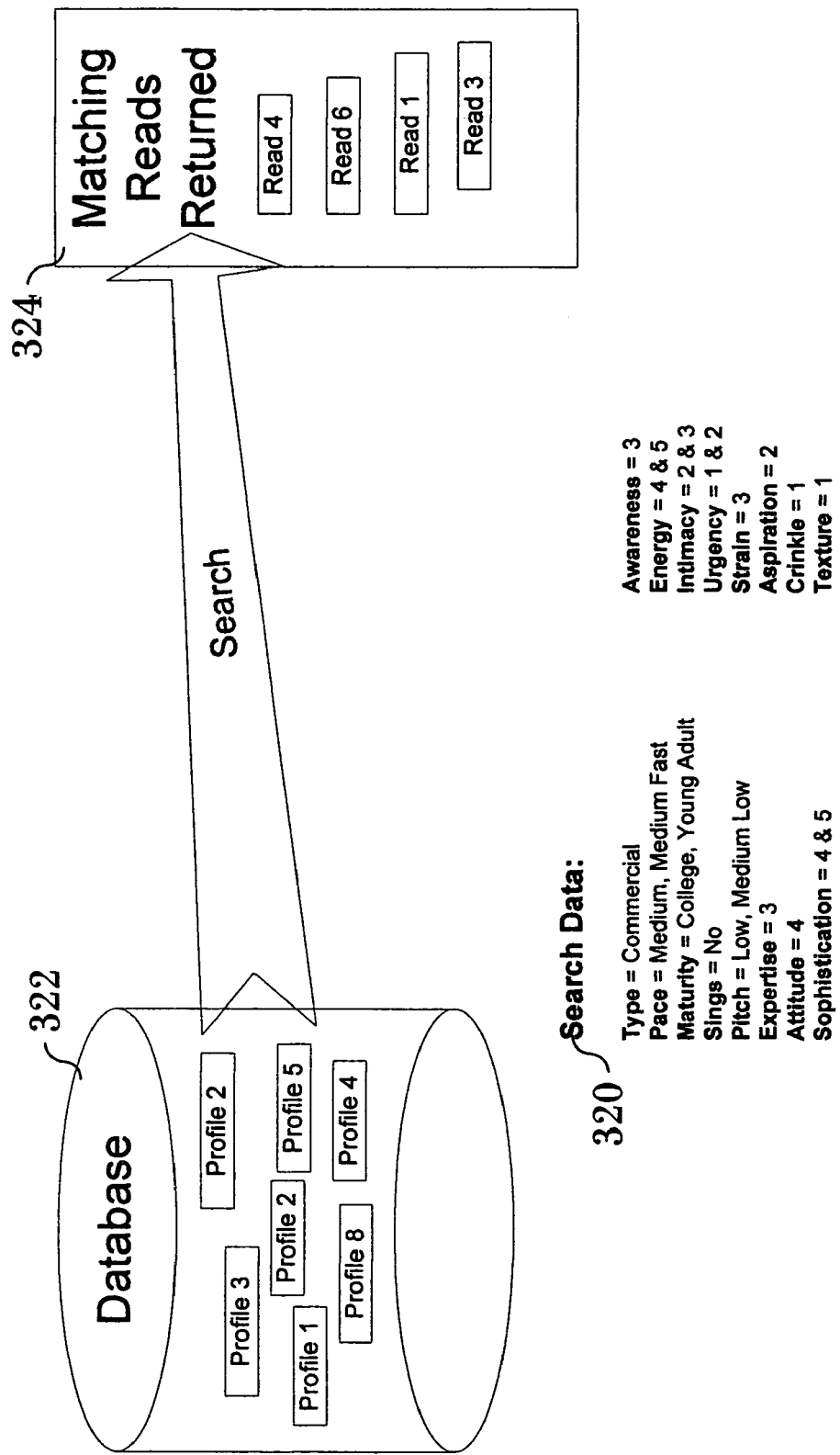
FIG. 11 illustrates the step of a user searching for a voice-over talent using unique voice-over read characteristics and parameters to identify a specific read which substantially matches the parameters provided by the user.

FIG. 11 illustrates the step of searching the read database using the unique read profile data developed by the present invention. As shown, the user (e.g., a producer or agent) can enter a plurality of search data/criteria 320. Using this specification, the search system 100 queries and retrieves matches from reads stored in, for example, a database 322. The matched reads are returned and presented to the user in, for example, a list 324 from which the user can review, audition, and select a talent(s).

Figure 12:
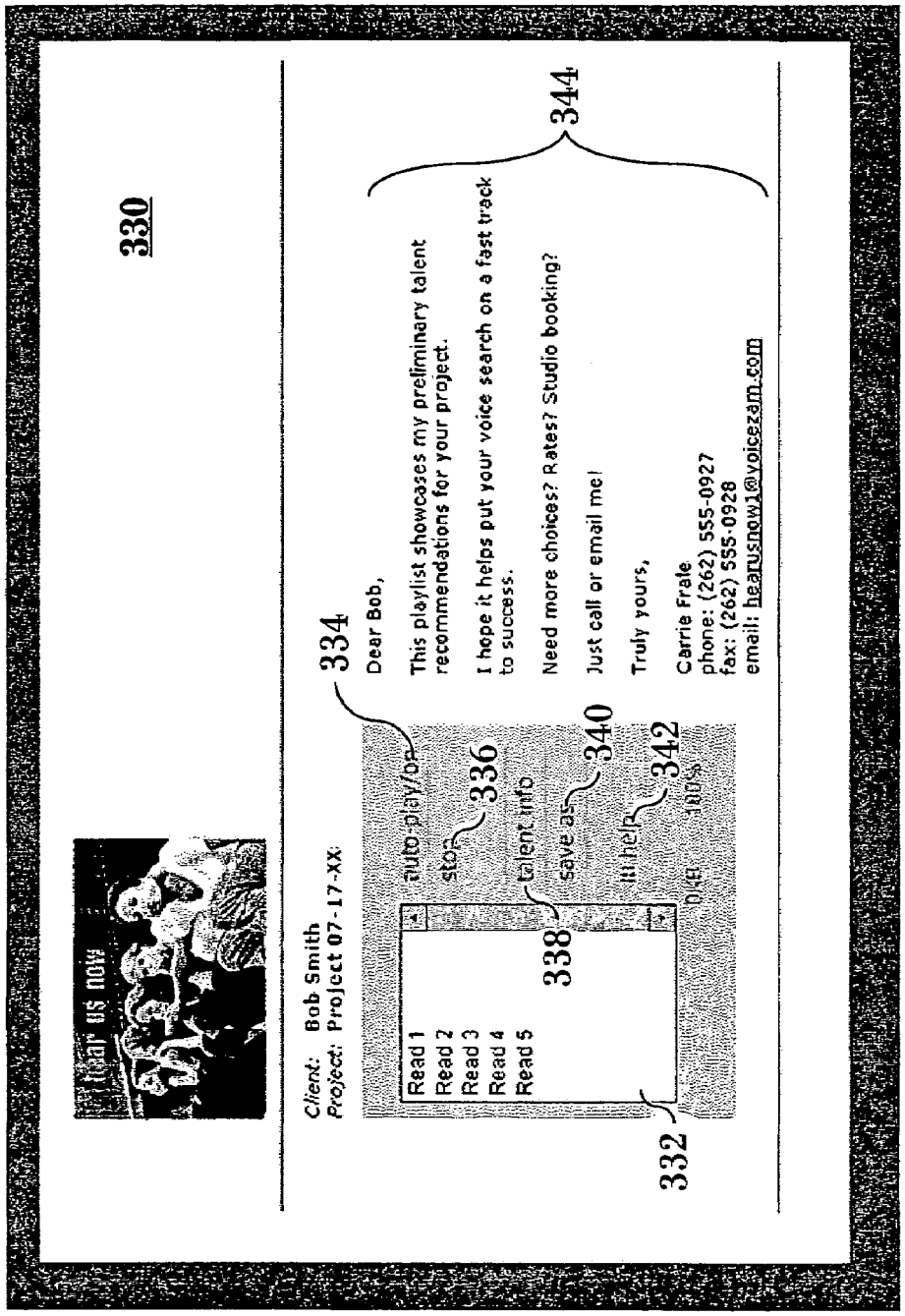
FIG. 12 illustrates a presentation screen in which the search system of the present invention selects, matches, and presents matched reads to the user.

Referring next to FIG. 12, which illustrates a presentation screen 330, the user can view/listen to match reads after a search is submitted. The matched reads for the user to audition are displayed in a read box 332. The reads listed in the read box 332 can be from a single talent or from a plurality of talents, depending on the search result based on the search data entered by the user. Links to reads 1 though 5 are displayed in the read box 332 with the options of an auto-play/on 334, a stop 336, a talent info 338, a save as 340 and a help 342 option. With the auto-play/on 334 option, the user can quickly audition the reads displayed in the read box 332 in a continuous, real-time fashion, as will be described below. Alternatively, the user can review each read individually by selecting the desired read in the read box 332. The stop 336 option halts the playback of the selected read or the continuous playback of all the reads shown in the read box 332. The talent info 338 allows the user to acquire talent information associated with a selected read. The save as 340 option enables the user to save the search result, allowing the user to return at a later time to, for example, continue previewing the reads in the read box 332. The help 342 option is provided by the search system 100 of the present invention to assist user that may have questions relating to the search system 100 and/or the operation of the presentation screen 330.

Optionally, the presentation screen 330 further includes a message 344. In one example, the message 344 is selected from a plurality of pre-formatted templates containing alternative messages that the user (e.g., an agent) can select from to send to a recipient (e.g., a producer). In another example, the message 344 is a unique message composed by the user. Alternatively, the present invention can provide templates of messages from which the user can select from and edit to tailor to the specific needs and/or message of the user.

Figure 13:
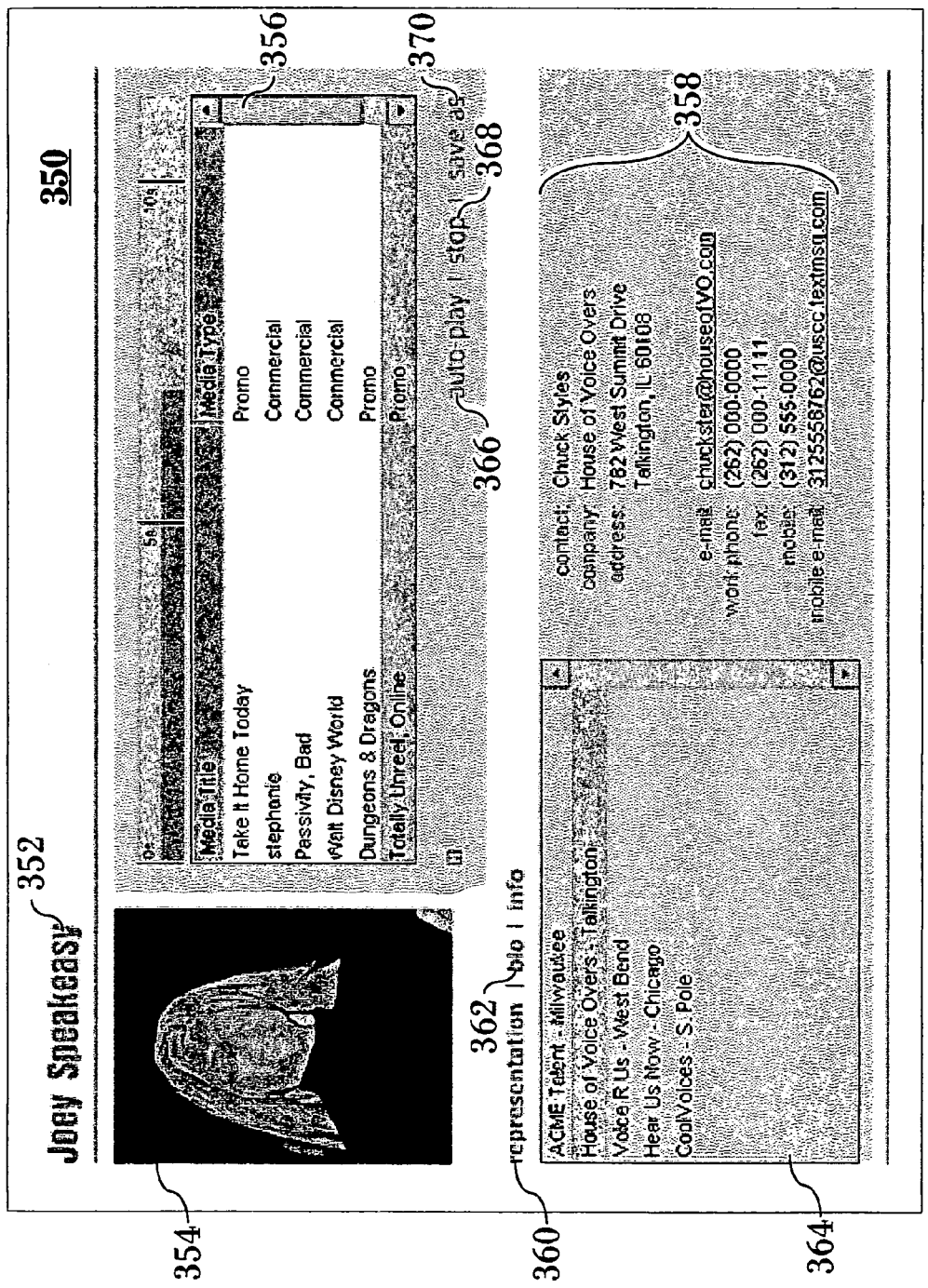
FIG. 13 is a design layout diagram of the ZAMCARD of the present invention.
Figure 14:
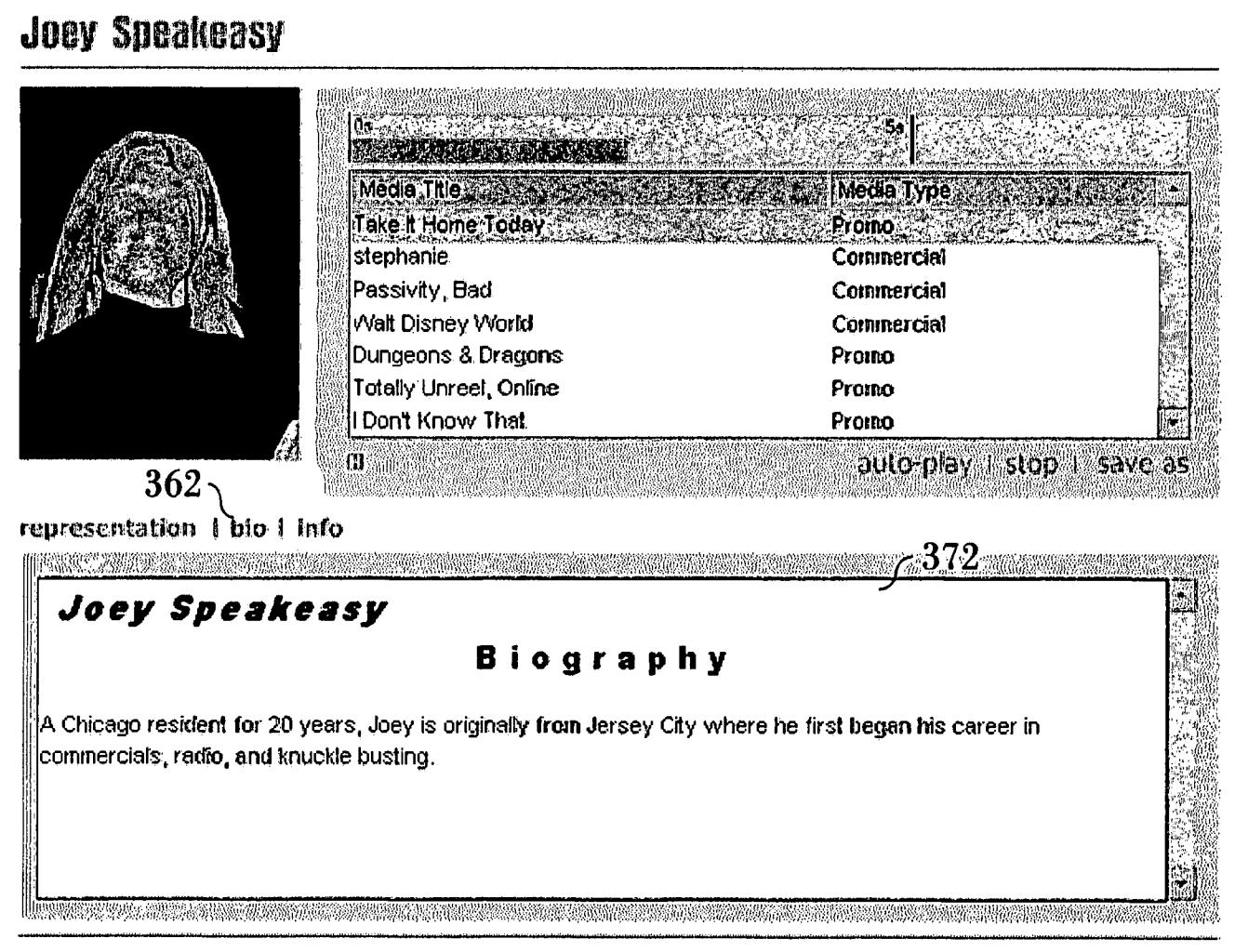

Referring now to FIGS. 13 and 14, which display a sample talent information page 350 selected from, for example, a list of reads by a user (e.g., the user requests the talent information) after an audition. The talent information page 350 includes the name of the talent 352, a (optional) picture of the talent 354 and a selected agent contact information 358. A read box 356 is provided to allow the user to play back read performances of the selected talent. The read box 356 is accompanied by an auto-play 366 option to allow the user to toggle between auto-play or single playback of the reads listed in the read box 356. At anytime, a stop 368 option can be activated to stop the playback of a read(s). The read box 356 is also accompanied by a save as 370 option, allowing the user to save read(s) to a local storage medium (e.g., hard drive or disk).

The talent information page 350 further provides representation and biographical information about the talent via a representation 360 and a bio 362. A list of agents representing the talent is displayed in an agent box 364. Information regarding a particular agent selected from the agent box 364 is displayed at 358. Biographical information about the talent can be selected via the bio 362 option. If the bio 362 option is selected, a biographical information box 372 appears, as shown in FIG. 14, showing the biographical information of the talent.

Read-Level Search Refinement

In the preferred embodiment, the present invention includes a read-level search refinement feature (hereinafter referred to as "VOICEPROBE") which provides a rapid system and method for searching thousands of reads with a high degree of voice criteria detail. The user interface is designed to allow the user to start searches from a very general search criteria level and then refine the search down to very specific voiceover detailed criteria. Each time a new criteria is added or modified, VOICEPROBE indicates to the user exactly how many reads will apply if they immediately begin playback.

Preferably, VOICEPROBE uses internal bitwise data structures and SQL comparisons to quickly match reads data to the exact specifications of the user criteria selections from the VOICEPROBE graphical user interface ("GUI"). VOICEPROBE communicates to and acquires playback media and data from a read database server via a dedicated Web Service ("WS"). The communications interface is an XML document, as will be described below. Upon launch, VOICEPROBE queries the WS for the default XML document. VOICEPROBE then uses the XML document as an internal data structure while the user performs search criteria selections. When the user has completed selections and requests related read playback, VOICEPROBE simply passes the modified XML document to the WS which parses the XML data, constructs and executes a SQL Query against the read profile database and then returns the related (matched)media (.mp3 files) and data (talent name, read name, read category, etc.)

Figure 15:
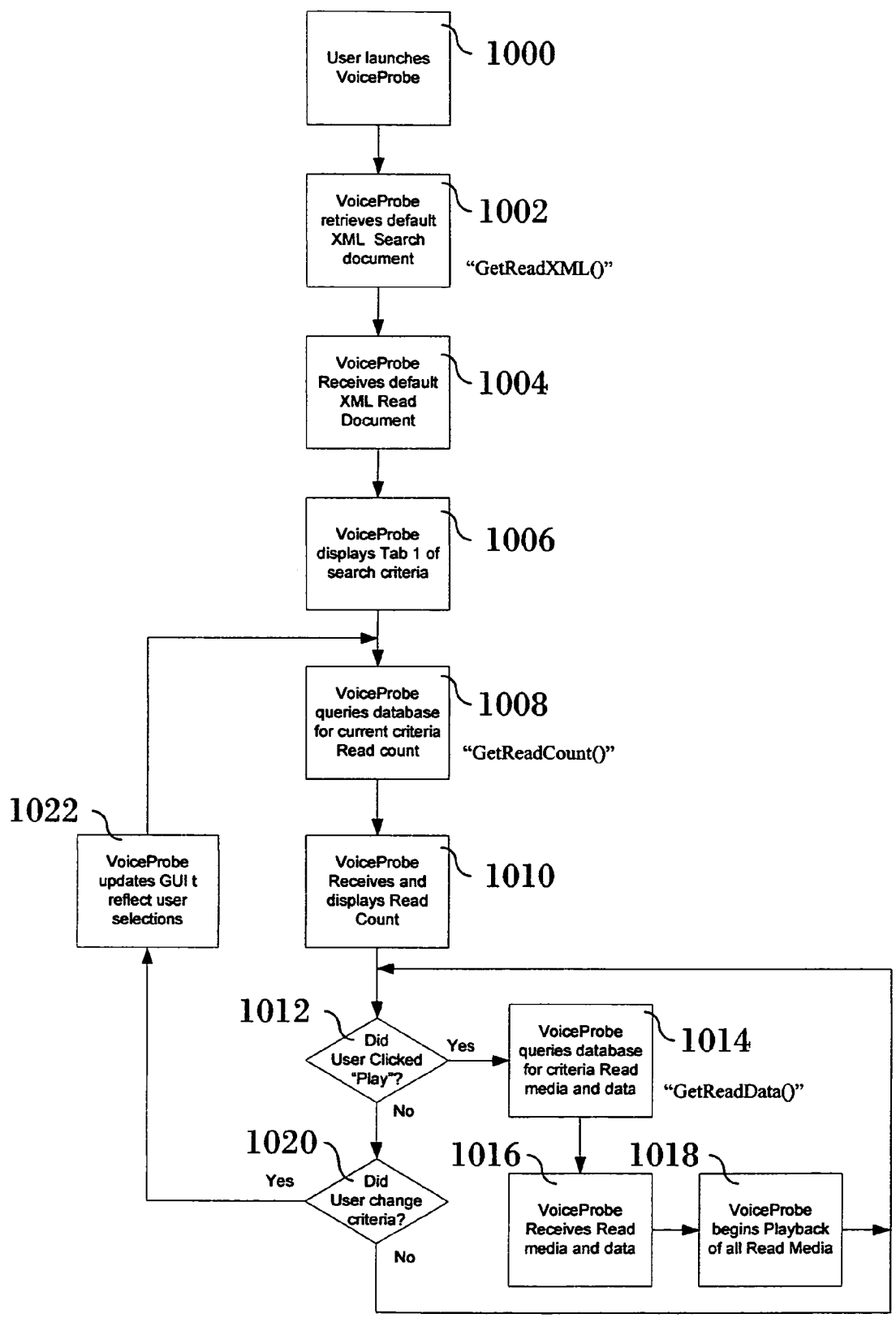
FIG. 15 is a flowchart of the search refinement feature.
Figure 16:
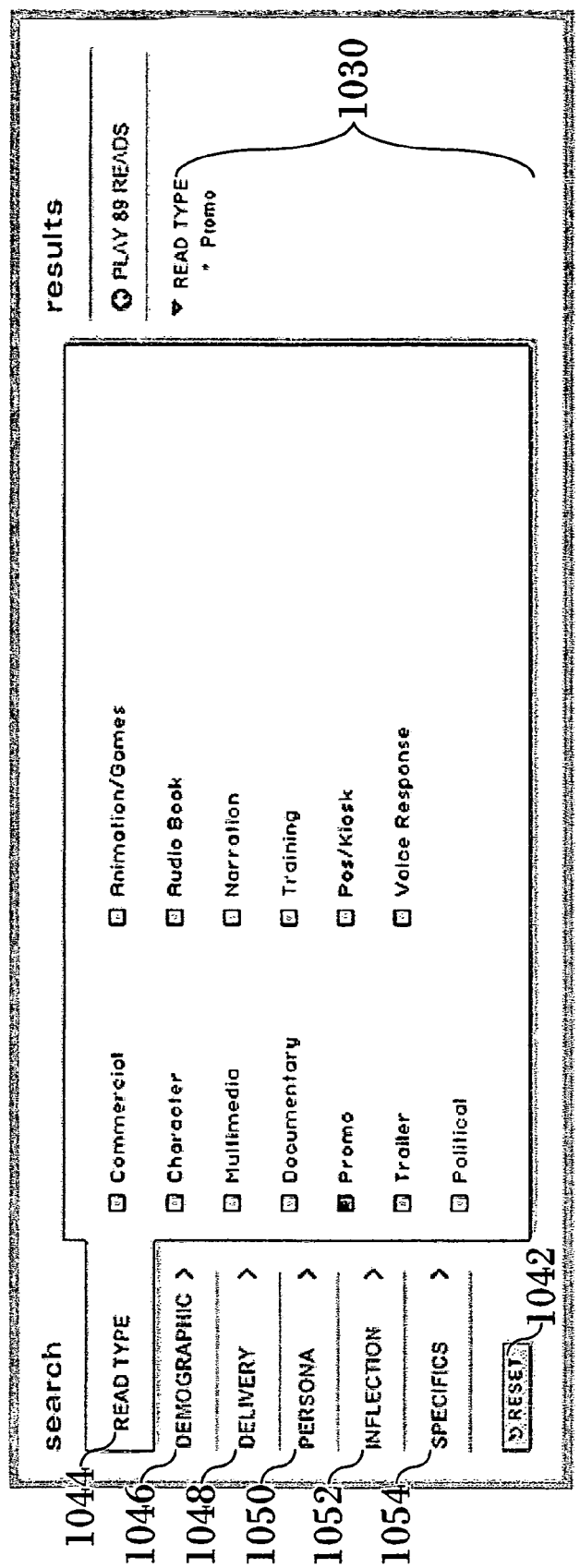
FIG. 16 illustrates a design layout of the graphical user interface ("GUI") used in read search refinement with the read tab selected.
Figure 20:
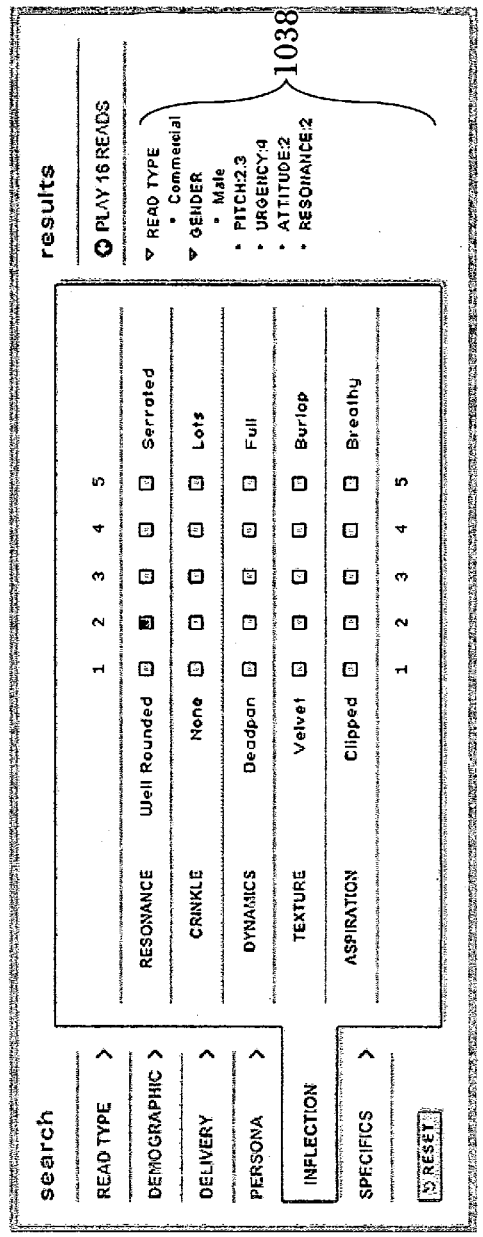
FIG. 20 illustrates a design layout of the GUI of FIG. 16 with the inflection tab selected.

Referring now to FIG. 15, a flowchart is shown to illustrate the steps involved in search refinement using VOICEPROBE. Specifically, the VOICEPROBE methodology begins when the user launches VOICEPROBE at a user launches VOICEPROBE step 1000. The user is then presented with a browser based GUI ("GUI") where, using applicable and standard controls, the user can define a read profile query. The GUI, which provides the interface for the read-level search refinement service, is supported by a data exchange interface which provides an efficient method by which the GUI can request read data from the read database server. This exchange is accomplished by use of an XML document containing data structures relevant to supporting read search criteria conveyed through the WS.

Next, the process proceeds to a VOICEPROBE retrieves default XML search document step 1002 where a default XML search document is retrieved from the WS. Then corresponding XML read documents are received via a VOICEPROBE receives default XML read document step 1004. The process next proceeds to a VOICEPROBE displays tab 1 of search criteria step 1006. During step 1006, the user can define the search profile and criteria. Based on the search criteria, VOICEPROBE will return a read count of the search result via a VOICEPROBE queries database for current criteria read count step 1008. VOICEPROBE will then displays the read count via a VOICEPROBE receives and displays read count step 1010.

After the read count is displayed, the process then proceeds to a user clicked play decision step 1012 to determine whether the user has selected any one of the read returned from the search for playback. If yes, the process moves to a VOICEPROBE queries database for criteria read media and data step 1014 where VOICEPROBE gets the read data from the WS. Once read data is received via a VOICEPROBE receives read media and data step 1016, the process moves to playback the read via a VOICEPROBE begins playback of all read media step 1018. In the preferred embodiment, the user can "jump" around to any read displayed and VOICEPROBE will begin the playback on the selected read.

Returning now to the user clicked play step 1012, if, on the other hand, the user did not select playback of a read, the process proceeds to a user change criteria decision step 1020 which determines whether the user has changed the search criteria. If no, the process loops back to the user click play step 1012 and waits for a user input or action. If yes, the GUI makes a query to the read database which returns the exact number of reads matching the criteria via a VOICEPROBE update GUI to reflect user selections step 1022 and the VOICEPROBE queries database for current criteria read count step 1008. As previous noted, the GUI will in turn display read count number, showing the user the exact number of reads which will be played when the user selects the playback page. Once the user is satisfied with the selection criteria and number of reads to be returned, the user can select the playback page. The GUI immediately makes a request from the WS for all applicable read media and data. Once received, it displays and begins playing back each read in succession as returned by the read database. At anytime, the user may immediately change the search criteria which will in turn change the count number of reads to be played back. The user may again preview the related Reads and so on. This process continues until the user has discovered the talent and read which best suites their requirements.

If the user wishes to save the current selection criteria set, the GUI provides a method to save the selection set (search criteria) under a name useful and applicable to the user. At a later time, the user can reload this saved set of criteria by entering the previously saved name.

Turning now to a discussion of the backend process and support for the methodology and process outlined in FIG. 15 above, when the GUI is first launched, the GUI makes a query from the WS method ("GetReadXML( )" for the default XML search criteria document. The WS returns the document containing default search criteria constructs and values. The GUI loads the XML document and uses it as an internal data structure for maintaining state when the user makes various search criteria selections via the user interface. When the user changes the GUI, a backend process submits the XML document in its current state (with criteria changes) to a "GetReadCount( )" method on the read database server via the WS. The read database server processes the XML document, generates and executes an appropriate SQL Query on the database, which in turn yields a single integer count of applicable reads for the search criteria. The read database server returns the resultant integer value via the WS. The background GUI process receives this data and updates the displayed "Count"

on the GUI. This process continues until the user has satisfactorily achieved a desired read count and search criteria set.

When the user wishes to perform playback of all applicable reads related to the search criteria, the user can click the "play" button on the GUI. The GUI will perform a query to the read database server via the WS.

To acquire all read data applicable to the selected search criteria, a backend process submits the XML document in its current state (with criteria changes) to a "GetReadData( )" method on the read database server via the WS. The read database server processes the XML document, generates and executes an appropriate SQL Query on the read database which in turn yields all applicable reads for the search criteria. The read data is constructed into a return XML document for processing by the GUI. The read database server returns this XML document to the GUI via the WS. Included in the returned XML document is the related talent name, read media file URL and read type (commercial, character, promo, etc).

Once the read data is received via the WS, the GUI redirects itself to the playback page, displays the read data and immediately begins playback of the first read and then each following read in succession. At anytime the user may reselect and modify any search criteria elements which reactivates the "Count" update process. The user may then again plays the reads as described above.

In an enhancement, VOICEPROBE, the backend WS, related XML documents and associated methods are designed to support third-party access by other companies wishing to present Voiceover data in their own players.

Referring now to FIGS. 16-22, illustrations of how the search criteria can be dynamically changed, as described in FIG. 15, are shown. More particularly, FIGS. 16-22 show the layout of the XML document driven GUI. Preferably, the GUI is written as a Macromedia Flash presentation. As previously discussed, when the GUI first launches, the GUI acquires the default XML search document. The GUI then parses the XML search document and uses the associated data to render all its graphic control elements as dictated by the XML structure. That is, the tabs, checkboxes edit controls, associated labels etc. are laid out (as shown in FIGS. 16-21) on each page in the text and order which the XML document lists them. The user uses the graphic controls to make Voiceover search criteria selections. As the user makes or updates search criteria selections, the "play" read count is immediately updated to display the exact number of reads associated to the selected criteria. In addition, the search criteria section located on the right side of the GUI updates (generally designated as 1030-1040 for FIGS. 16-21, respectively), indicating, in a quick visual display, which search criteria controls have been modified on their parent tab.

In the preferred embodiment, tabs 1044-1054 show modification to the search criteria by changing the color of the small arrow located on the tab. More specifically, the read type tab 1044 (FIG. 16) allows the user to select any or all read types that the user desires to preview. The demographic tab 1046 (FIG. 17) allows the user to select the talent and read demographics the user wishes to preview. The delivery tab 1048, the persona tab 1050, and the inflection tab 1052 (FIGS. 18, 19, and 20, respectively) allow the user may select a delivery style, persona style, and inflection style, respectively, within a range of differing categories. The specifics tab 1054 (FIG. 21) allows the user to enter specific terminology to search for and preview. At anytime, the user may set all criteria back to the default state using a "Reset" button 1042.

Figure 22:
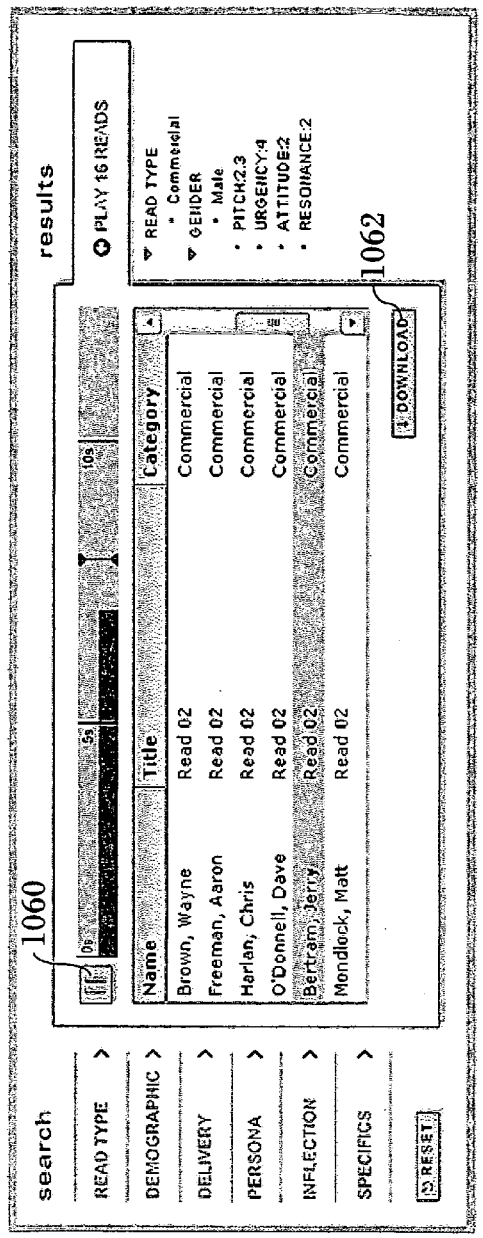
FIG. 22 illustrates a design layout of the GUI of a read player with showing results from a search refinement process of FIG. 15.

FIG. 22 shows that, in one example, the read count was refined to 9 reads and displays the read for playback or download. The media player interface shown in FIG. 22 allows the user to preview all reads related to the user's search criteria. The user can start and stop playback using a start/stop button 1060. The user can also "download" the read media using a "Download" button 1062.

Referring to FIGS. 23a-23e and 24, sample source code of the XML search document is shown. As discussed above, the XML search document is used for many purposes. For example, the XML search document is used by the GUI to determine the graphic interface rendering for search criteria controls and the default values of each search criteria control. The XML search document is also used by the GUI as an internal data structure to hold values as the values change due to user modifications to the search criteria controls. Similarly, the read database server uses the XML search document to dictate the graphic interface rendering for search criteria controls and the default values of each search criteria control. The read database server also uses the XML search document to construct a search criteria SQL SELECT statement.

Turning now to a discussion of the general usage of the XML search document, when the Flash search engine ("FSE") first initializes, it queries a read Web Service ("RWS") method for the default read XML document ("RXD"). The RWS responds by returning the RXD in its initialized and default state: (All elements and associated attributes, values set to default, etc.) The FSE keeps an internal version of the RXD to be used as a dataset for maintaining search criteria state. This avoids the need to map unstructured array data to XML data, making the internal data mapping process much more efficient. While the user changes data on the FSE GUI, the FSE modifies its internal (RXD) data (element value attributes) to match. In addition, as changes are made and the internal RXD is updated, the FSE submits the RXD at appropriate times to a RWS method which returns a value reflecting the number of reads matching the currently submitted RXD. The FSE in turn updates the "Play xxxx" value.

When the user has completed the search criteria setup and selects "Play", the FSE submits the RXD (with the modified value attributes) to another RWS method which returns a XML document with matching read data and associated media URLs. The FSE parses the document and plays the reads as specified. The user may reset or change criteria repeating the above process.

As will be apparent to one skilled in the art, to enable the user to save the search criteria, the XML search document can be transmitted to the WS. When the user wishes to recall the search criteria, the GUI can simply ask for the XML search document back from the WS and setup the player criteria to match. With regard to read profiling, the XML document can be saved with the profile. If the user wishes to re-edit the profile, the GUI can recall the XML search document from the WS and reset the criteria to match.

Referring still to FIGS. 23a-23e and 24, the XML search document contains a number of elements with attributes that describe the details of the XML search document and provides display instructions and data to the GUI. More specifically, the XML search document contains a root element 1100, a tab element 1102, a checkbox element 1104, a section element 1106, a binary5 element 1108, a text element 1110, and an editbox element 1116.

The root element 1100 (FIG. 23a) includes a xmlns:vzv attribute 1200, which is the VoiceZAM namespace. Alternatively, other namespace can be used. The root element 1100 also includes an agent attribute 1202 which is an optional value to constrain the returned reads to a specific talent agent's clients (talent). The tab element 1102 describes the data and some behavior for one of the tabs located on the left of the GUI.

The tab element 1102 (FIG. 23*a*) includes an id attribute 1204 which is used as a tag for data reference within the XML Document Model ("DOM"). The tab element 1102 also includes a text attribute 1206 which is the exact text displayed on the tab. In addition, the tab element 1102 includes a modified attribute 1208 which is used internally by the GUI and indicates whether the contents on the current tab (i.e. the tab element 1104) have changed. The GUI will change a graphic element related to the tab to indicate a modification to the user.

The checkbox element 1104 (FIG. 23*a*) describes the data for one of the checkbox controls on the parent tab pane. An id attribute 1210, contained within the checkbox element 1104, is used as a tag for data reference within the DOM. A dbid attribute 1212 is used to reference the related database column in the read profile table. A text attribute 1214 provides the exact text displayed for the control. A value attribute 1216 indicates the current value of the element.

The section element 1106 (FIG. 23*b*) describes the data and some behavior of a group of controls located on the parent tab pane. An id attribute 1218 is used as a tag for data reference within the DOM. A dbid attribute 1220 is used to reference the related database column in the read profile table. A text attribute 1222 provides the exact text displayed for the section. A value attribute 1224 indicates the current combined binary value of the child elements.

The binary5 element 1108 (FIG. 23*c*) describes the data and some behavior of a specialize group of checkboxes located on the parent tab pane. An id attribute 1226 is used as a tag for data reference within the DOM. A dbid attribute 1228 is used to reference the related database column in the read profile table. A text attribute 1230 provides the exact text displayed for the control. A low_text attribute 1232 provides the exact text displayed on the left side of the Binary5 control. A high_text attribute 1234 provides the exact text displayed on the right side of the Binary5 control. A low_example attribute 1236 provides the URL referenced on the hyperlink for low_text. A high_example 1238 attribute is the URL referenced on the hyperlink for high_text. A value attribute 1240 indicates the current combined binary value of the child elements. It should be noted that the binary value is determined by adding the binary weights of each checkbox when they are true. "True" (checked) equals 1, while "False" (unselected) equals 0 (e.g., where Checkbox 2, 4 and 5 are checked, the binary value is 22).

The text element 1110 (FIG. 24) describes the data and some behavior of a block of text located on the parent tab pane. An id attribute 1242 is used as a tag for data reference within the DOM. A text attribute 1244 provides the text to be displayed The editbox element 1116 (FIG. 24) describes the data and some behavior of an edit box located on the parent tab pane. An id attribute 1246 is used as a tag for data reference within the DOM. A dbid attribute 1248 is used to reference the related database column in the read profile table. A text attribute 1250 provides the exact text displayed for the control. A value attribute 1252 indicates the current value of the element.

Referring now to FIG. 25, which shows sample source code of the XML read data document, the XML read data document is generally organized with attributes similar to the XML search document. The XML read data document includes a root element 1112 a read element 1114. The root element 1112 includes a xmlns:vzv attribute 1254 which is the VoiceZAM namespace. An agent attribute (not shown) can also be included as an optional value to constrain the returned reads to a specific talent agent's clients (talent).

The read element 1114 describes the parent element for all reads returned from the search. A total attribute 1256 is the number of child read elements. An id attribute 1258 is used internally as reference. A seq attribute 1260 is used to position the sequence of the read during playback. A talent_id attribute 1262 identifies the read talent table record of the talent which owns the read. A talent_name attribute 1264 identifies the literal talent name which owns the read. A profile_id attribute 1266 identifies the read profile record ID of the read. A readtype_id attribute 1268 identifies the read type table record ID of the read. A read_name attribute 1270 identifies the literal read title of the read. A URL attribute 1272 identifies the associated URL link to the read media.

Seamless Read Playback

To further facilitate the auditioning or previewing of reads, the present invention provides a seamless read playback feature which essentially plays reads in a continuous, real-time fashion. The seamless read playback feature allows the computer of the user to respond in a way that the user senses as sufficiently immediate—real time. To do this, the seamless read playback feature provides a caching/cache method whereby a separate and distinct list of, preferably, .mp3 files may be sequentially played back in, preferably, Macromedia's Flash plug-in without experiencing delays between read playback due to online, file downloading. Thus, the real time feature describes a human rather than a machine sense of time in that the user is able to sequentially listen to the next read at a sufficient immediate time.

The caching method of the present invention operates in a similar manner as cache which is a place to store something temporarily. In brief, cache stores files from a Webpage in a cache subdirectory under the directory of the browser to allow for quicker viewing of the Webpage when the user return to the Webpage that they have recently viewed.

In addition to allowing for quick viewing of webpages, the present invention applies caching to allow for quick, continuous playback of audio files. In the broadband environment, the downloading and caching of .mp3 audio file data is faster than the serial playback of the same audio rendered data. In addition to .mp3 files, caching methodology used by the present invention can also be applied to Flash .swf audio files. Succinctly, the real time caching method of the seamless read playback feature is implemented with the assistance of two parallel processes, a background caching process and a foreground playback process, which together provides seamless playback results.

Figure 26:
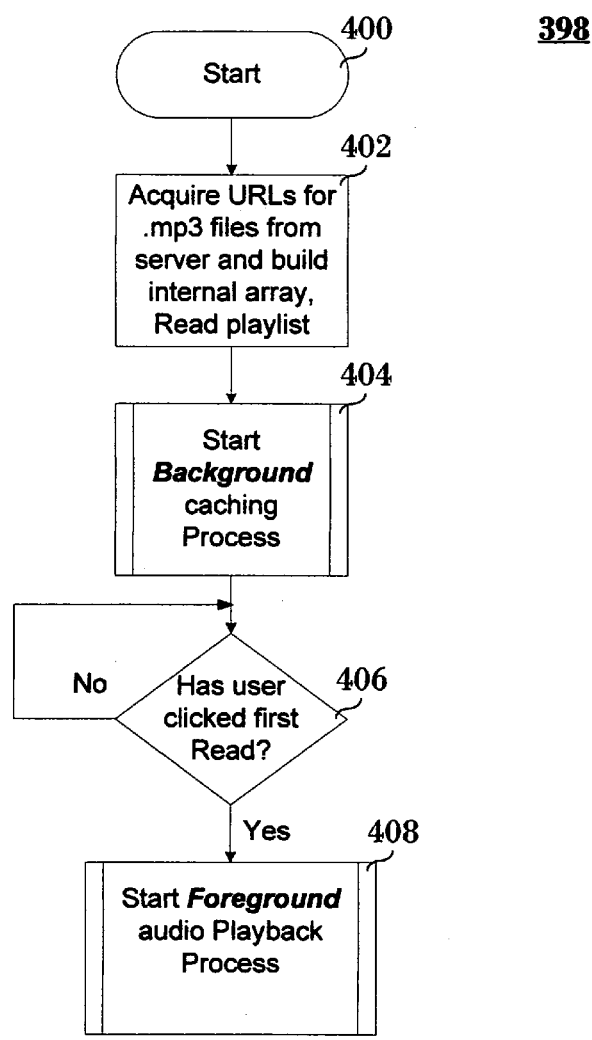
FIG. 26 is a flowchart showing the main process of the seamless playback feature of the present invention.
Figure 27:
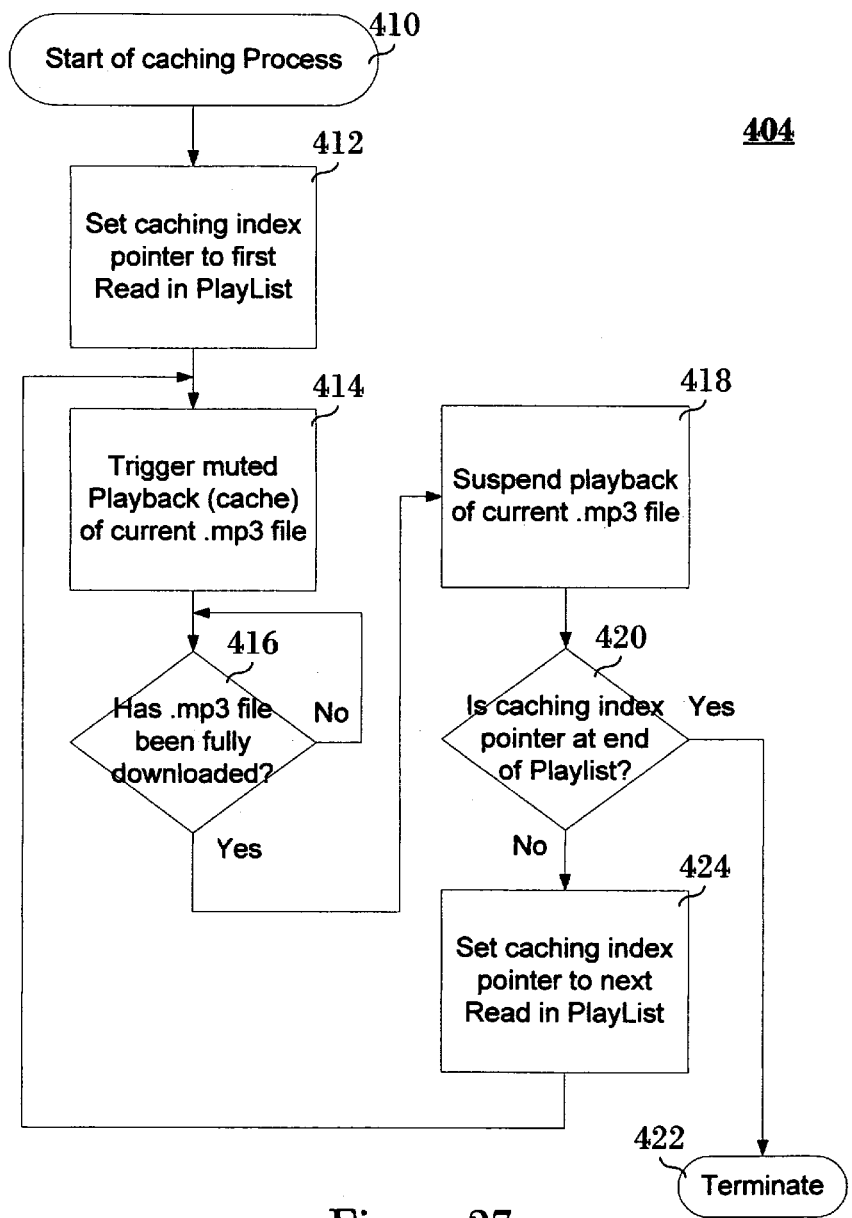
FIG. 27 is a flowchart showing the background caching process of the seamless playback feature of the present invention.
Figure 28:
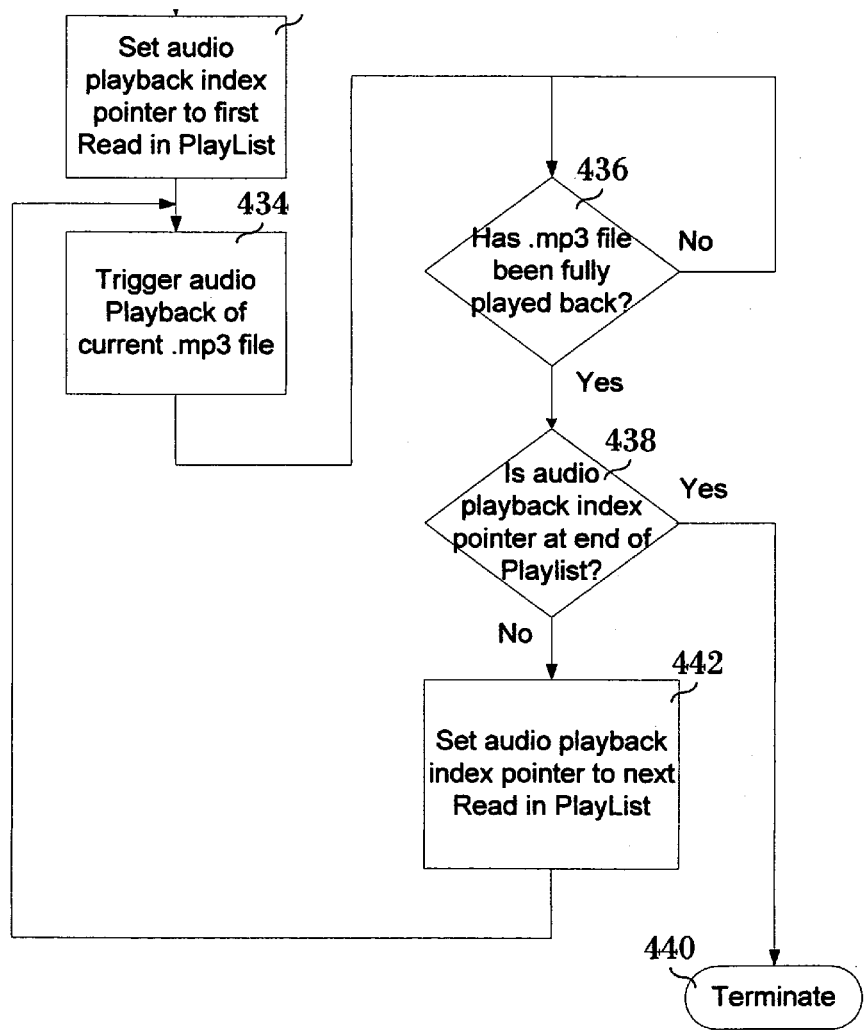
FIG. 28 is a flowchart showing the foreground playback process of the seamless playback feature of the present invention.

The concept of the seamless read playback feature of the present invention is outlined in three flowcharts shown in FIGS. 26, 27 and 28. Referring first to FIG. 26, the seamless read playback feature starts with a main process 398 at a start step 400. The main process 398 then proceeds to an acquire URL step 402 in which the main process 398 acquires URLs for .mp3 files from the server and begins to build internal array, which is essentially the playlist of the acquired reads (e.g., matched reads from the searching process discussed above). Next, the main process 398 proceeds to a background caching step 404 which is outlined in FIG. 27.

While the search system 100 is locally caching in the background at the background caching step 404, the search system 100 determines if the user has selected a first read at a select first read decision step 406. If the user has not selected the first read at the select first read decision step 406, the search system 100 continues to "cache" other reads in the background at the background caching step 404. If, on the other hand, the user selects a first read at the select first read decision step 406, the main process proceeds to a start foreground audio step 408 which is outlined in FIG. 28.

Referring next to FIG. 27, which details the background caching process of the background caching step 404 of the main process 398, the background process successively "plays" each .mp3 files in muted playback until the background process detects that the file has been fully downloaded (cached) in its entirety to a local hard drive of the user's computer. The background process then suspends muted playback and continues on to the next file until all files have been silently played (cached).

More specifically, the background caching process begins at a start caching process step 410. The background process then proceeds to a set caching index step 412 which sets the caching index pointer to the first read in the playlist acquired in the acquire URL step 402 of the main process. Next, the process proceeds to a trigger muted playback step 414 which mutes the playback (i.e., cache) of the current .mp3 file. The background process next proceeds to a download decision step 416 which determines whether the .mp3 file has been downloaded. If the download decision step 416 determines that the download is incomplete, the background process remains in the download step 416 until downloading of the .mp3 file is fully completed. If, on the other hand, downloading of the .mp3 file is fully completed, the background process proceeds to a suspend playback step 418 which suspends playback of the current .mp3 file. Next, the background process proceeds to a caching index decision step 420 which determines whether the caching index pointer is at the end of the playlist. If the caching index decision step 420 determines that the index pointer is at the end of the playlist, the background process is terminated at a termination step 424. If, on the other hand, the caching index decision step 420 determines there are still more read(s) on the playlist that needs to be cached, the background process proceeds to a set caching index step 424 which set the caching index pointer to the next read in the playlist. From the set caching index step 422, the background process loops back to the trigger muted playback step 414 until the background process is terminated at the termination step 422.

Referring next to FIG. 28, which details the foreground process of the start foreground step 408 of FIG. 26, a parallel foreground process audibly plays each audio read file in succession in its entirety. Because the background process has already passed through and thus cached the current foreground process file being played, the foreground process detects the file on the local computer's temporary Internet file cache and plays from the temporary Internet file instead of requesting an online download, thus avoiding a playback download delay and producing real-time playback.

More specifically, the foreground process begins at a start audio playback step 430. The foreground process then proceeds to a set audio playback pointer step 432 which sets the audio playback index pointer to the first read in the playlist acquired in the acquire URL step 402 of the main process. Next, the foreground process proceeds to a trigger audio playback step 434 which triggers audio playback of the current .mp3 file. Then the foreground process proceeds to a playback decision step 436 which determines whether the .mp3 file has been fully played. If the playback decision step 436 determines that the playback is incomplete, the foreground process remains in the playback step 436 until playback of the .mp3 file is fully completed. If, on the other hand, the playback of the .mp3 file is fully completed, the foreground process proceeds to an audio index decision step 438 which determines whether the audio index pointer is at the end of the playlist. If the audio index decision step 438 determines that the index pointer is at the end of the playlist, the foreground process is terminated at a termination step 440. If, on the other hand, the audio index decision step 438 determines there are still more read(s) on the playlist that need to be played, the foreground process proceeds to a set audio index step 442 which sets the audio index pointer to the next read in the playlist. From the set audio index step 442, the foreground process loops back to the trigger audio playback step 434 until the foreground process is terminated at the termination step 440.

As will be apparent to one skilled in the art, the present invention takes advantage of the combined compression built into .mp3 and .swf data files and a broadband environment to insure that the muted caching playback of the background process stays ahead of the audio playback of the foreground process. This concept essentially allows for real-time seamless read playback.

Although a caching method is described herein to facilitate real time seamless read playback, one skilled in the art recognizes that the seamless read playback may also be implemented using similar methodology, such as a buffer. Similar to a cache, a buffer is a "midpoint holding place." Thus, a buffer can be implemented to support the coordination of separate activities (i.e., reads) as to allow for reads to be continuously played in real time.

Voice-Over Recognition and Matching

In the context of a virtual environment, the users gain the greatest feeling of immersion, or being part of the search system 100, using their voice. The present invention facilitates this by allowing the use of voice with its voice-over recognition and matching feature to enable the user (e.g., the producer and/or agent) to accurately match the voice-over of talents with a sample voice (provided by the producer/agent or by the present invention as "default" samples).

In order to use the searcher's voice (e.g., a producer/agent's voice) (the "targeted" voice) with the present invention, the voice-over or voice is converted to a digital signal, providing means for the present invention to compare the digital signals of the targeted voice-over with the voice-over of talents stored in the database (also a digital signal). In its basic form, the present invention uses a "comparator" to check the target voice-over that is produced, recorded and/or uploaded by the user against the digital voice-over of talents stored in the database (e.g., the audio read database 112 of FIG. 1) of the present invention. The present invention preferably uses digital signal processing ("DSP") techniques to improve the accuracy and reliability of the voice-over recognition and matching process.

More specifically, the present invention uses two methods for voice recognition and matching: "template matching" and "feature analysis." As previously eluded to, with any approach to voice recognition and matching, the first step is for the user to speak a word or phrase into an audio analog or digital input device 103 associated with the searcher's computer 102. The electrical signal from the audio analog or digital input device is digitized by an "analog-to-digital (A/D) converter," and is stored in memory. To determine the "meaning" of this voice input, the search system 100 attempts to match the input with a digitized voice sample, or template. This template matching technique is a close analogy to the traditional command inputs from a keyboard. The search system 100 contains the input template, and attempts to match this template with the actual input using, for example, a simple conditional Boolean statement.

The template matching scheme allows for a "match this" type previewing using the search system 100 of the present invention. For example, the user reads the audition (i.e., script) into the search system 100 using their own voice. The user speaks the audition in as close a rendition of what type of voice they are looking for. The search system 100 then attempts to find matching read(s) to the inputted voice. In this way, the user can "speak out" the type of reads the user is attempting to find and the search system 100 matches the pitch, tempo, strain, etc. of the voice/read.

The feature analysis aspect of the voice recognition and matching feature of the present invention includes "sound like this" searching. Instead of trying to find an exact or near-exact match between the actual voice input and a previously stored voice template/read, the feature analysis method first processes the voice input using "Fourier transforms" or "linear predictive coding (LPC)," then attempts to find characteristic similarities between the expected inputs and the actual digitized voice input. For example, when the user is previewing reads in the preview player (e.g., the read box 356 of FIG. 13) and the user finds a read/voice which the user likes and would like to hear more of (in other words, more like it). The user can request the search system 100 to find matching voice(s) to a selected read. By selecting the specific read and clicking a "sounds like" (or similar) button (not shown), the search system 100 can do a further search of reads which sounds like the selected read. The search system 100 would then append matching reads to the player (e.g., the read box 332 of FIG. 12) and the user can then preview the new reads as well.

Telephony Integration

The voice-over industry uses a convention called auditioning in which a voice-over consumer makes a request (of the voice-over agent) for specific scripts to be read by one or many talents. The deficiency of the current method is time. For example, the current industry practice involves the producers using voicebank(dot)com to submit audition projects to the voicebank(dot)com system. These projects include the actual script to be read by the talent and deadlines. The agent may then intercept these scripts, call their talents to read them and record the talents in a recording studio normally located within the talent agency. The audition audio files are then uploaded to the voicebank(dot)com system (i.e., Website) and posted to the producer's project, where producers will audition the uploaded reads.

As is apparent, there are several problems associated with the current industry practice. First, although there is a stated deadline, producers do not know how long to wait for the incoming auditions. Second, producers often hear the same talent performing the auditions. Third, producers are frequently inundated by hundreds of auditions and will merely select from the top 10 or 20 demos received.

The present invention improves on the current practice of the voice-over industry by allowing producers to submit their auditions to the search system 100 of the present invention. Preferably, the audition call submission occurs after the producer has performed a preliminary search using the search system 100. At the very least, the preliminary search filters "unwanted" talents for the producer and ensures quality reads by requesting reads from talents that the producer thinks may fit the voice envisioned for the spot.

Figure 29:
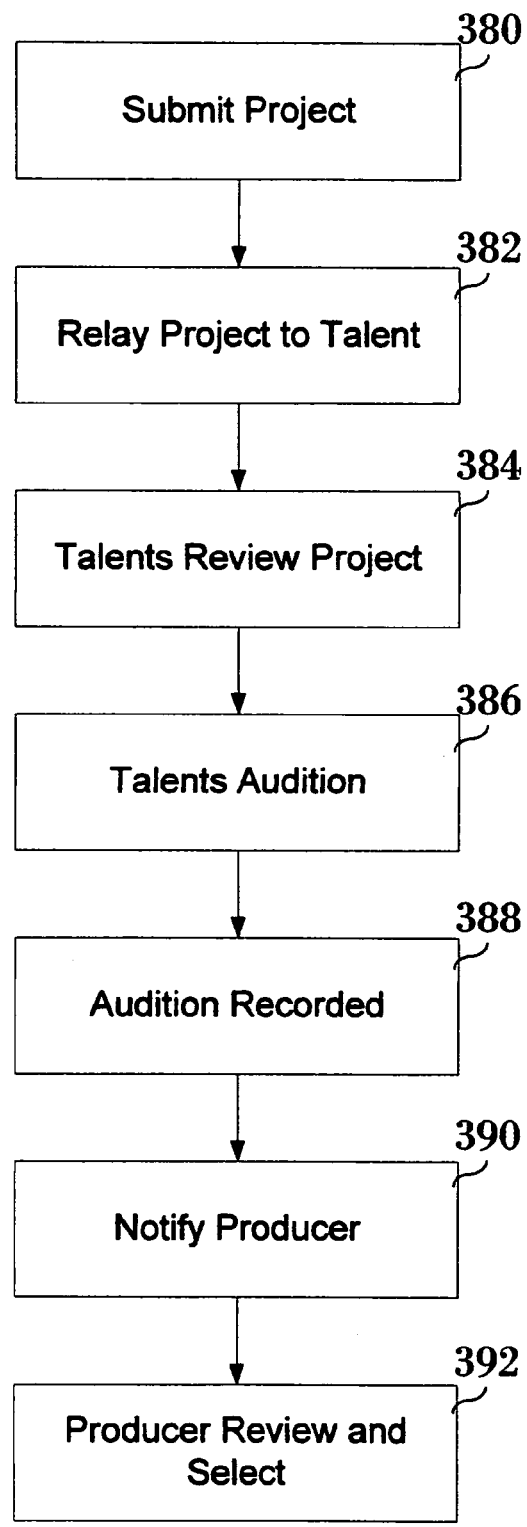
FIG. 29 is a flowchart of the process of using the present invention to facilitate previewing via telephony technology.

Referring now to FIG. 29, there is simplified flowchart of the process of auditioning using telephone technology. Using the search system 100 of the present invention as the basic platform for facilitating voice-over talent auditions, a producer can submit a project (e.g., a script) to the search system 100 at a submit project step 380. Then, the process proceeds to a replay project to talent/agent step 382 in which the project will be automatically sent to a selected group of talents and/or their agents (e.g., a selected group narrowed by the producer during the search process using the search system 100) or all talents available via e-mail, cell phone text e-mail or a personal digital assistant ("PDA"). At a talent review project step 384, the talents/agents can immediately review the audition using, for example, their phones. Then at a talents audition step 386, talents can "read" the script into the search system 100 using, preferably, (Internet) telephony technology. However, talents can also "read" the script into the search system 100 using a telephone communication channel including a telephone link 105 and a telephony card 107 shown in FIG. 1

Once the reads are read at the talents audition step 386 and recorded using Internet telephony technology at an auditions recorded step 388, the producer will receive an e-mail, cell phone text e-mail or phone (telephony) notification that the auditions have been received by the search system 100 at a notify producer step 390. Then, the producer can preview any and all auditions received and select (or note) the read(s) which the producer prefers at a producer review and select step 392.

As is apparent, the telephony system contemplated by the present invention can work independent of, in parallel with or combined with the search system 100 of the present invention to allow the producer to review auditions.

Traditionally, telephony systems are associated with the telephone or a handheld device containing both a speaker or transmitter and a receiver. However, with the advent of the Internet, the present invention contemplates the incorporation of Internet telephony as well. Internet telephony uses the Internet rather than the traditional telephone company infrastructure and rate structure to exchange spoken or other telephone information. One of the advantages of Internet telephony is cost. For example, since access to the Internet is available at local phone connection rates, an international or other long-distance audition will be less expensive than through the traditional audition arrangement.

The ZAMCARD and the Dot Zam Extension

Generally, in today's business world, the utilization of conventional printed business cards is a common acceptable practice for introducing an individual or a company to others. The printed business card generally records fundamental information such as the name, title, address, telephone number, e-mail or Uniform Resource Locator ("URL") of the homepage of the individual or the company. For convenience, the conventional printed business card has a standard size of 9 cm. by 5.5 cm.

In the voice-over industry, talents are using business cards in conjunction with audio compact discs of their reels to market themselves. Talents use business cards containing similar basic contact information, as described above, but rely on the audio CD to sell and market their voices. The audio compact disc can store a huge amount of audio data and has advantages of low price and popularity. However, talents and/or agents cannot conveniently carry the present compact discs, and an improvement is thus needed.

The present invention revolutionizes the practices of the voice-over industry by introducing the concept of a "ZAMCARD" to replace the traditional practice of business card and CD to market talents. First, the present invention uses a ZAMCARD (not a business), cleverly named after the extension (i.e., suffix) given by the URL appearing on the ZAMCARD.

Figure 30:
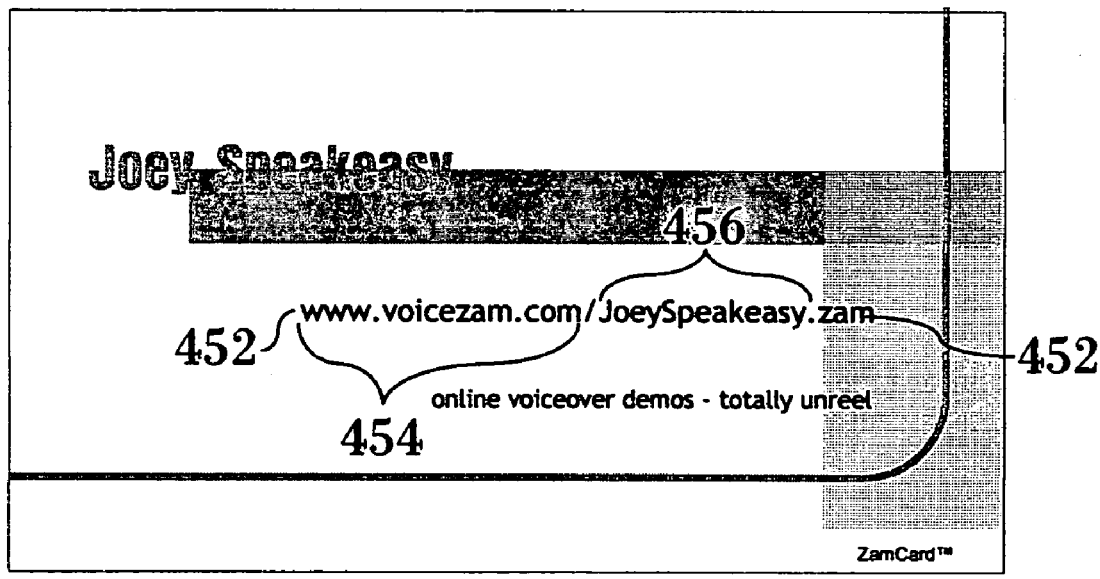
FIG. 30 shows a sample ZAM Business Card for replacing the traditional practice of distributing compact discs of read performances of the talent.

More specifically, referring to FIG. 30, the ZAMCARD 450 of the present invention is a standard size business card printed with an URL 452 containing the Web address of an online demo of reads of the talents. Preferably, the URL contains both the homepage URL and the "zam" extension. For example, the URL 452 includes a domain name 454 that identifies a specific computer/server on the Internet (e.g., the server 110 of FIG. 1), and a pathname 456 which is a hierarchical description of the file location on the server.

In particular, as applied to the Internet (which uses the Hypertext Transfer Protocol, HTTP), the URL 452 describes a Webpage (i.e., domain name 454) to be accessed, presumptively, with an HTTP (Web browser) application that is located on a computer named voicezam(dot)com. The pathname 456 for the specific file in that computer is SherriBerger.zam. As can be seen, the URL 452 shows the domain name 454 of the present invention and the talent name 456 with a .zam suffix 458. The .zam suffix 458 is not really a true suffix for an extension of a file. The .zam suffix 458 is an "alias" (mapped as an .ASP file extension on the targeted web server) denoting the file of the talent on the search system 100 of the present invention. In one example, the present invention is programmed to interpret the .zam suffix 458 as an ASP and/or .NET Webpage in which the present invention directs the user to the homepage of the talents that have subscribed to the search system 100.

The .zam suffix 458 allows the intended recipients and all users of the ZAMCARD 450 to associate with and/or relate to (or think of) the present invention without having to "open" or try to use printed URL. More importantly, the ZAMCARD 450 eliminates the need to carry around or mail compact discs.

Thus, by using the ZAMCARD 450 as a method to promote voice-over talents, the present invention revolutionizes the voice-over industry. The method involves distributing voice-over talent ZAMCARDs 450 to agents and/or producers. The ZAMCARD 450 directs the agents and/or producers to an Internet site containing the reads of talents. The method enables talents and/or agents to dynamically promote reads of talents without issuing new hard copy media (e.g., compact discs). For example, new reads can be uploaded to the search system 100 of the present invention without having to update the ZAMCARD 450 or without having to issue new CDs. In this way, the talent's media assets and information never goes out-of-date.

Although the .zam suffix 458 is used to increased the marketability and association with the present invention, one skilled in the art recognizes that any suffixes can be used as a alias for the "real" file suffix. Any such modifications are within the scope of the present invention.

Agent Branded Technologies

In addition to using the .zam suffix to increase the marketability of the talent and the association with the present invention, the present invention also includes other agent branded technologies. By incorporating agent branded technologies, the present invention is essentially attaching a brand mark or brand name (i.e., the agent) to the system and process of the present invention in order to distinguish the present invention's technology from other product variants (e.g., voicebank(dot)com) and to leverage the goodwill of the agent. Agent branded technologies of the present invention includes an agent site-talent player ("ASTP"), an agent site-talent redirect ("ATR"), an agent read playlist, and audition submission.

The ASTP is configured to be an agent "branded", talent voiceover read player which, when launched, plays all talent reads matching a specific category. The current industry practice proves that most major voiceover talent agents present their clients (voiceover talent) as a simple list of talent names on pages of their website (e.g., voicesunlimited(dot)com male.html). Behind the name is an URL, normally linked to the talent's .mp3, demo file, illustrating a "mix" of the talent's voice performance capabilities. When a site visitor clicks on one of the talent names, a somewhat unpredictable chain of events takes place where a local process attempts to launch an .mp3 audio file player on the visitors local machine. The response is determined by whatever player the visitor has loaded on their local machine and also what and how the local browser mime types have been setup. In some cases, the visitor's machine is unable to adequately respond to the .mp3 file playback. The ASTP resolves this condition by utilizing Flash Macromedia's technology which provides a platform independent solution for multimedia presentation.

For example, when a visitor clicks on a talent name on an agent site enabled with the ASTP of the present invention, the hyperlink launches a Flash player which immediately queries the read database for all reads related to the talent. The ASTP then displays a player, "skinned" in the agent's branding and begins immediate playback of each read related to one or many categories specified in the hyperlink.

Figure 31:
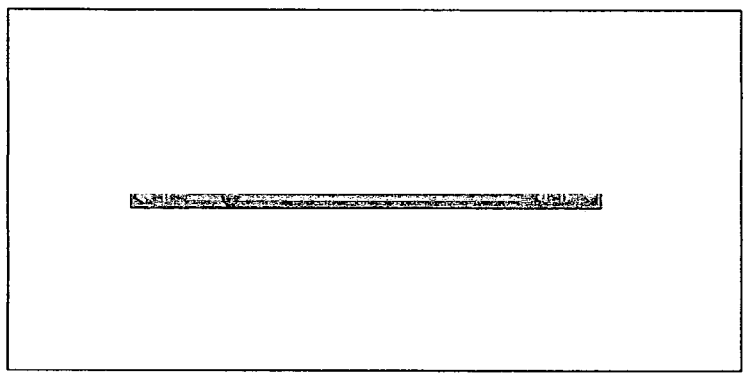
FIG. 31 illustrates a playback experience without the agent branded technology of the present invention.
Figure 32:
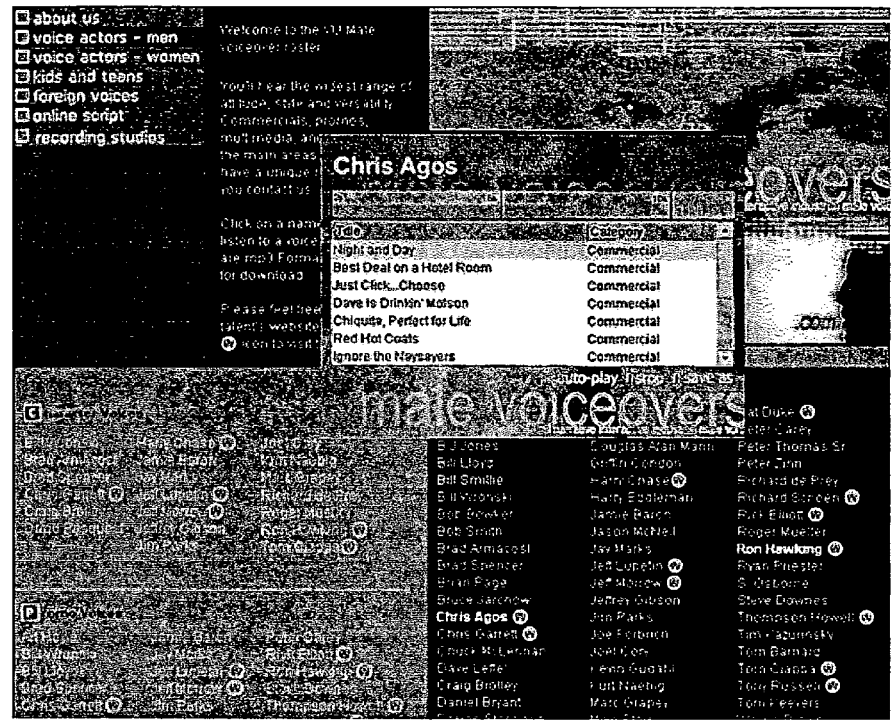
FIG. 32 illustrates a playback experience with the agent branded technology of the present invention.

FIGS. 31 and 32 demonstrate the methodology of the prior art and of the ASTP of the present invention, respectively. FIG. 31 shows that when the user clicks a talent name, the browser redirects the user to a QuickTime player for .pm3 playback. FIG. 31 shows that when the user clicks on a talent name on a site enabled with ASTP, the ASTP launches as a pop-up on the agent's webpage.

The ASTP of the present invention is a specialized player designed to bring focus on the talent and their voice assets. This has extreme value over a standard .mp3 player which is designed to meet all audio playback needs and adds extra features unrelated to the voiceover industry. The ASTP playback presentation is completely customizable by the agent. By passing various parameters on the URL hyperlink, the agent may specify the talent to present, the read media by category(ies) related to the talent to present, the URL address of the player "skin".jpg used to motif the player and the actual player style (light background, dark background) which allows the player to adapt to its text and graphic elements to the background skin.

Figure 33:
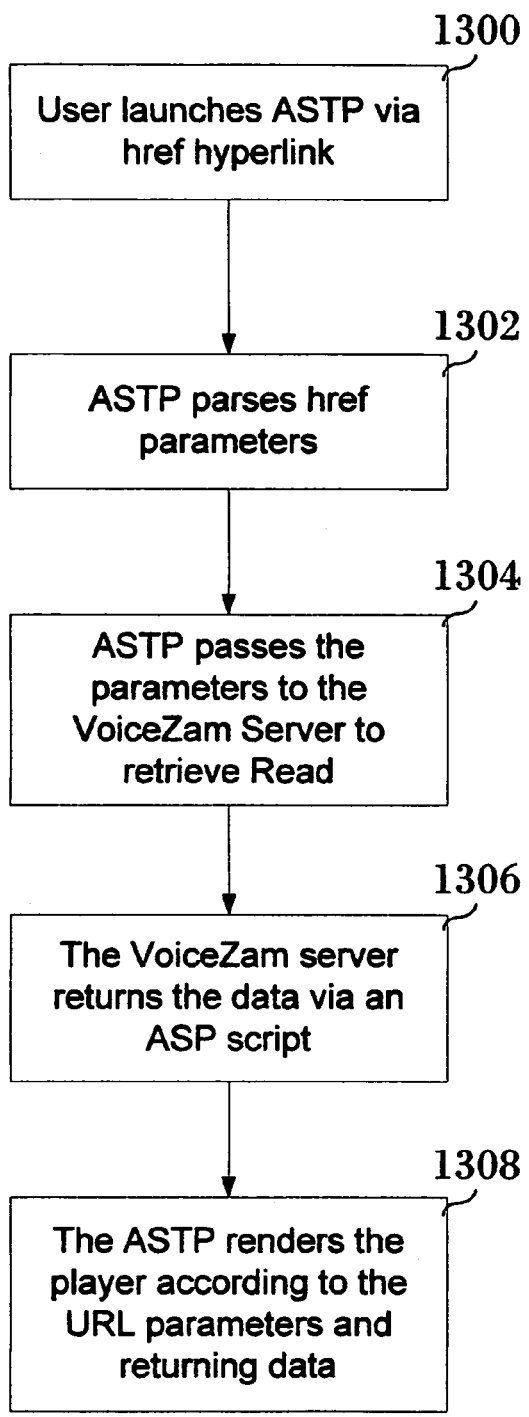
FIG. 33 is a flowchart of the agent branded process of the present invention.

Referring now to FIG. 33, a flowchart of the ASTP process is shown. The process begins at a user launches ASTP via href hyperlink step 1300. More specifically, the ASTP is launched when the user clicks on a href hyperlink that is ASTP enabled. Associated with the href are various parameters which determine the final ASTP player rendering and operation at a ASTP parses href parameters step 1302. The process next proceeds to an ASTP passes the parameters step 1304 which passes the parameters to the read database server to retrieve read data. Next, the process moves to a server returns the data step 1306 in which the read database server returns the data via an ASP script. Then the ASTP renders the player according to the URL parameters and returned data at an ASTP rendering step 1308.

Some of the parameters associated with the ASTP include background, player, key, title, skin, and categories. The background parameter indicates to the Flash player how to render its text, graphic elements and shading. This is necessary to match the "skin" selection as described below. The current choices are "Light" and "Dark." As an example, if the background parameter equals "Dark," the player will render the text, graphic elements and shading of the player to accommodate a dark "skinned" background.

The player parameter is the Flash .swf file which performs playback. The site may specify a custom player designed/developed for the user. The key parameter is the talent database ID. This allows the ASTP to render the talent name and locate and playback related read media. The title parameter is the unique name which references a talent. This value provides the same information as the key, but is much easier for a web designer to remember. The skin parameter is the URL to a .jpg graphics file which the ASTP will use to render the background of the player. Using skin, an agent may present different backgrounds on each hyperlink related to a talent. The background may enhance the preview experience by creating differing visuals. The categories parameter comprise a list of terms (separated by commas) used to select which reads will be loaded into the ASTP player (examples of categories are commercial, promo, and narration). The agent may create custom categories when defining reads for their talents. Using categories, the agent may also present different sets of talent reads on each hyperlink related to a talent.

The agent site-talent redirect ("ATR") is another unique feature of the present invention. The ATR is designed to be a process of quickly directing a producer to an individual talent's reads without having to navigate or search the agent site. The current industry practice proves that most major talent agents present their clients (voiceover talent) as a simple list of talent names on pages of their websites. An example of a website that uses list methodology is voicesunlimited(dot)com. Behind the name is a URL, normally linked to the talent's .mp3, demo file, illustrating a "mix" of the talent's voice performance capabilities.

In their discussions with voice talent consumers (producers), agents must direct them to the talent link on their website. Each agent constructs their website in a different layout and directing a producer to the appropriate talent link can be tedious and confusing.

Figure 34:
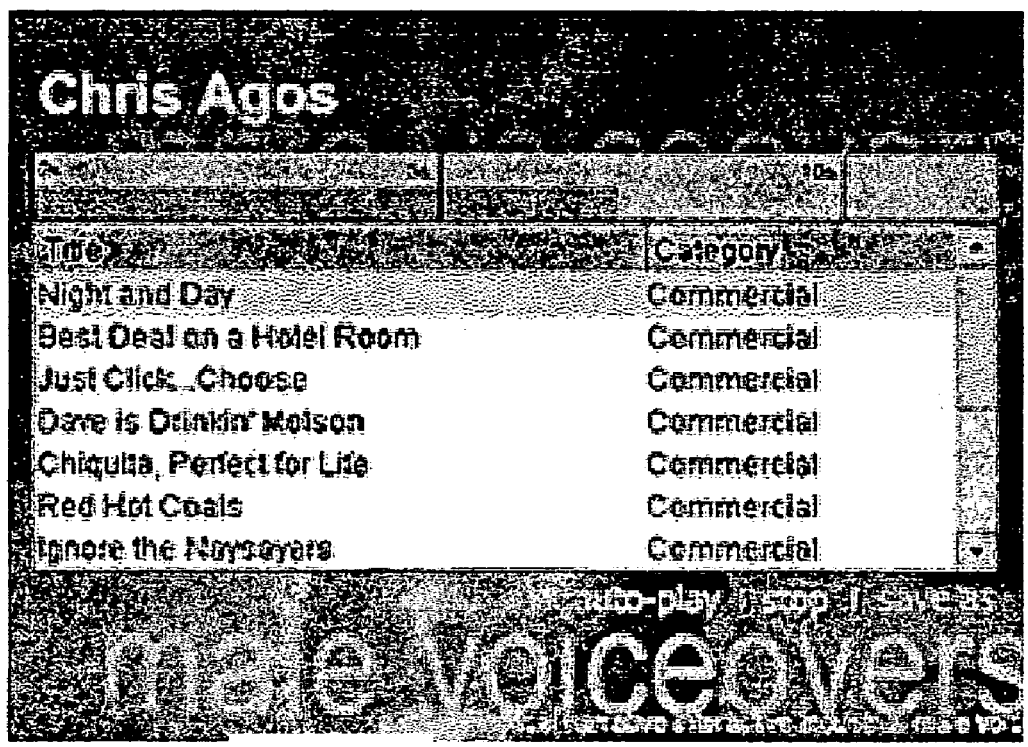
FIG. 34 illustrates the agent-talent redirect feature of the present invention.

Referring to FIG. 34, the ATR is essentially a method by which the agent need only direct the producer to enter the talent name after the agent's main website name (e.g., worldwidewide dot <talentAgent> dot com /<TalentName>) The website's response is to launch the ASTP. The agent may then immediately direct the producer to one of the talent's reads as displayed and reviewable in the ASTP.

Another agent branded technology of the present invention is the agent read playlist. In some instances, a producer will contact an agent and request several variations of sample voices to match a particular producer voice specification. In this instance, the present invention allows the agent to create an agent playlist to be sent to the producer for review.

Figure 35:
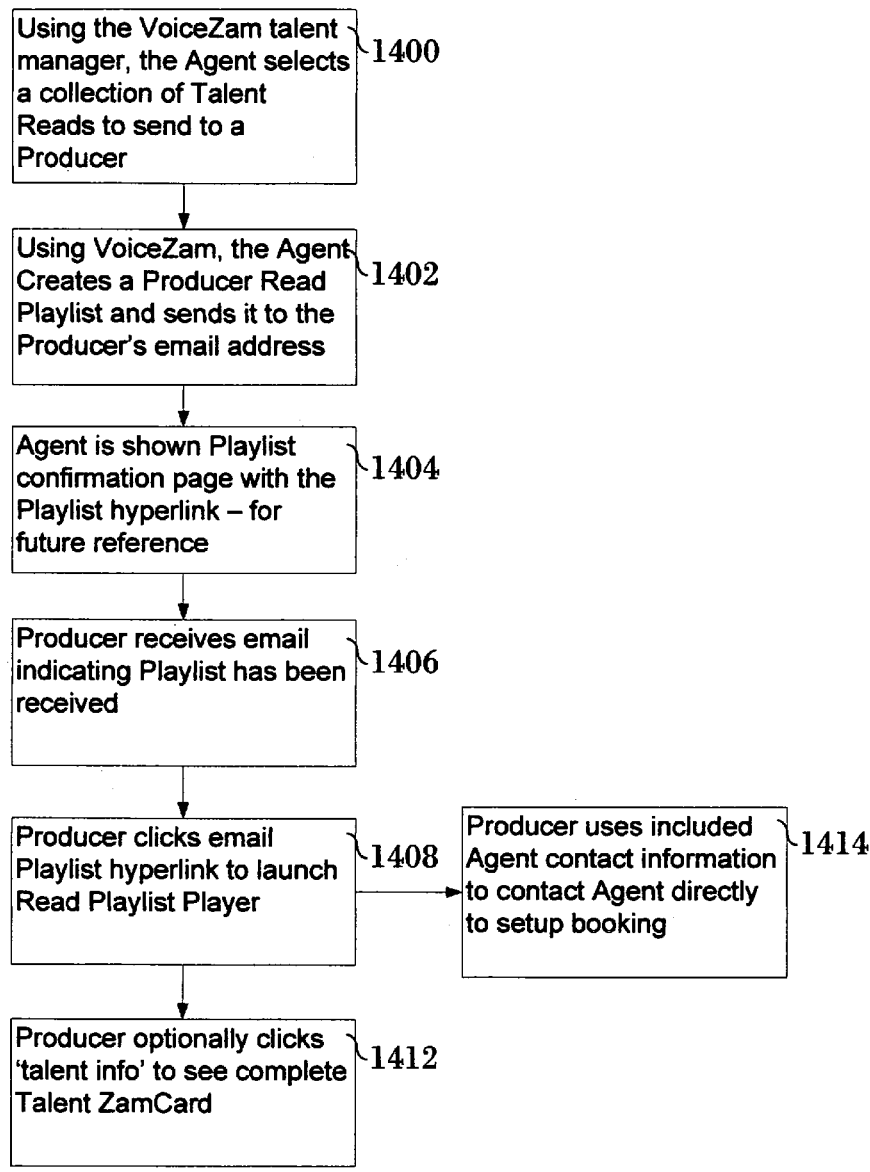
FIG. 35 is a functional flowchart of the process of branding the agent using an agent read playlist feature.

Referring to FIG. 35, the process of agent selection and producer review of the agent read playlist starts at an agent selects a collection of reads step 1400. In step 1400, the agent can select a collection of talents to be sent to a producer using a talent manager feature (as will be discussed below). The process then proceeds to an agent create playlist and send step 1402 where, using voiceZam, the agent creates a producer playlist and sends the playlist to the producer's email address. The agent is then shown a playlist confirmation page which includes the playlist hyperlinks at a playlist confirmation step 1404. The process next proceeds to a producer receive step 1406 where the producer receives the email of the playlist. The producer can click on the emailed playlist hyperlink to launch a read playlist player at a launch read playlist player step 1408. After previewing the playlist, the producer, using Agent included contact information, can contact the agent to directly setup booking of selected talent at a contact agent step 1410. Alternatively, the producer can optionally click on the talent information available through the playlist at a see talent information step 1412.

Figure 36:
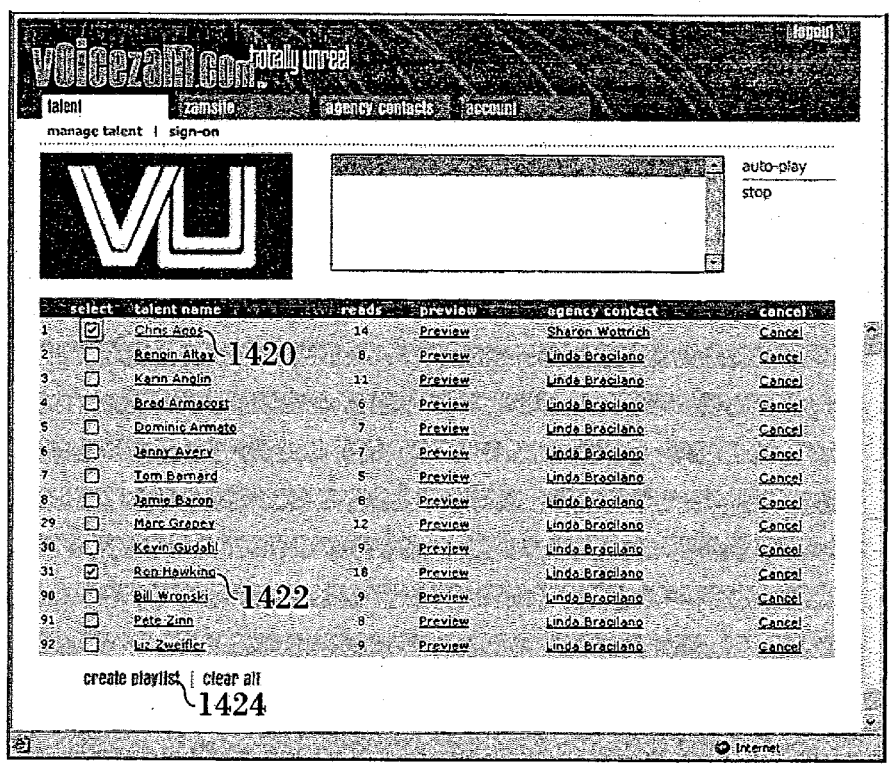
FIG. 36 illustrates a user interface used in creating the playlist for the process of FIG. 35.
Figure 37:
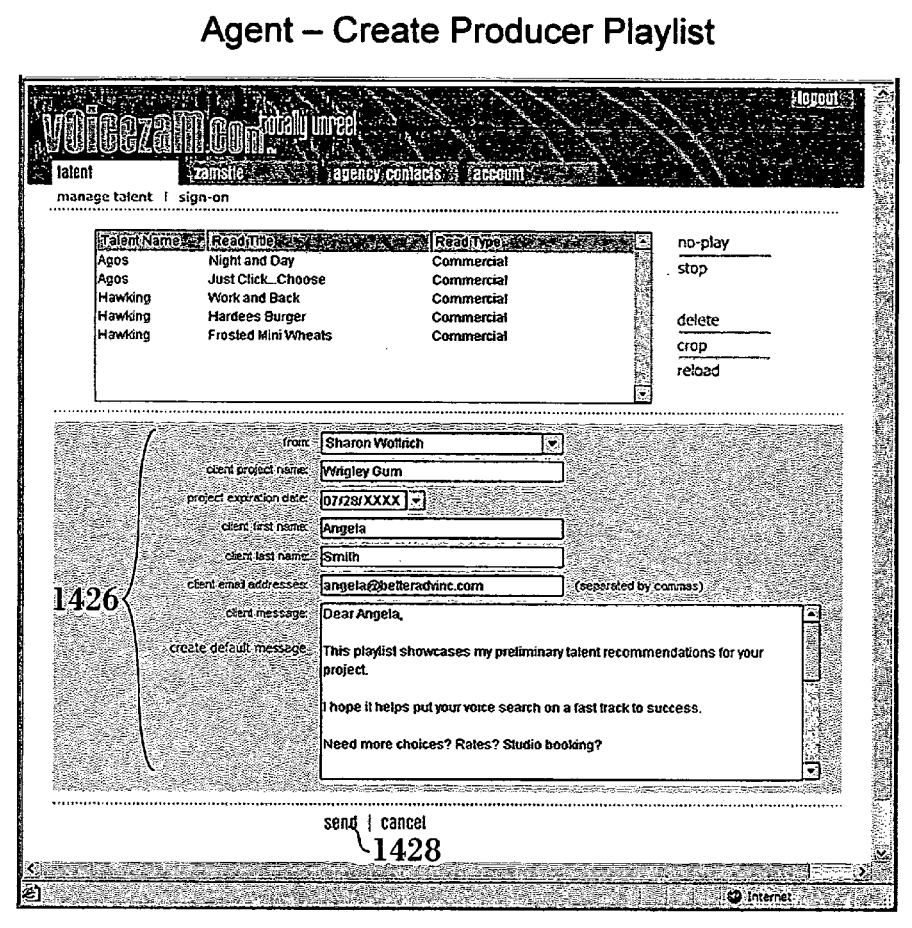

By way of an example, FIGS. 36-40 illustrate user interfaces that can be used in the process outlined in FIG. 35. The user interface of FIG. 36 shows that the agent can "check" the talent with reads matching the producer's specifications, generally designated by numerals 1420 and 1422. The agent can further select individual reads of talents to be sent to the producer (FIG. 37). Once, the talent or individual reads have been chosen or "narrowed" using VOICEPROBE, as described above, the agent can create a playlist for the producer using a create playlist button 1424 (FIG. 36).

Referring to FIG. 37, using the playlist and associated buttons, the agent can select all reads from the talent which match the producer's specification. The agent can then enter information to personalize the playlist for the producer, as shown at the designated area with numerical 1426. Once personalized information have been entered, the agent can send the playlist to the producer using a send button 1428.

Figure 38:
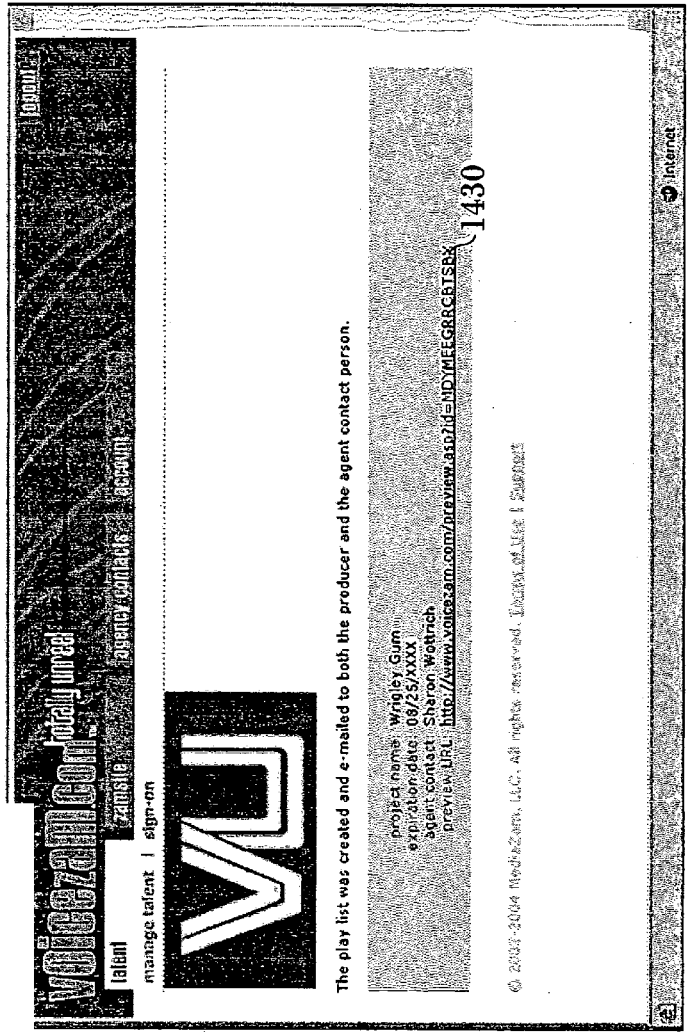
FIG. 38 is a sample layout of the confirmation page used in the process of FIG. 35.

FIG. 38 illustrates a confirmation page that can be shown to the agent after the agent emails the playlist to the producer. The confirmation page of FIG. 52 includes a link 1430 which navigates directly to the producer's playlist. This feature is helpful for future reference and discussion.

Figure 39:
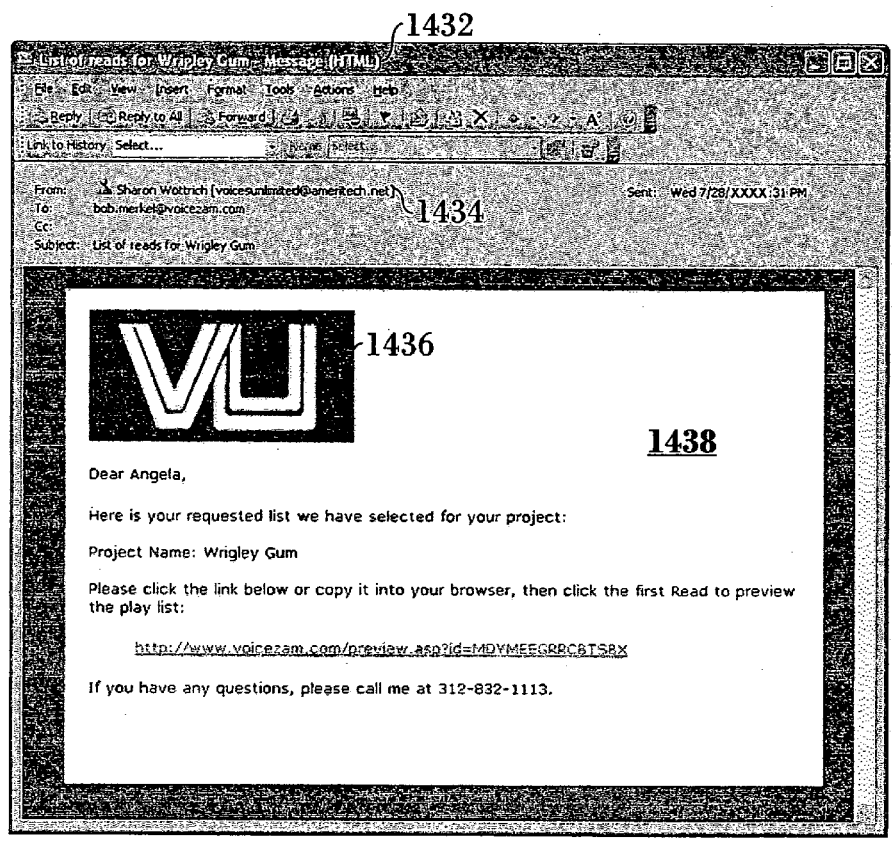
FIG. 39 illustrates a playlist email as might be seen by the producer.

FIG. 39 demonstrates more clearly how the playlist contributes value to the agent branding. For example, numerical 1432 points to the email subject line where it contains the producer's project name. Numerical 1434 points to email line where it shows that the producer receives email directly from and branded in the Agent's name (preferably including both name and domain address). Optionally, the agent can further brand or personalize the communication with an agent logo, shown at 1436. Numerical 1438 points to the text area of the email where the agent's personal message (or default message provided by the present invention) and playlist hyperlink.

Figure 40:
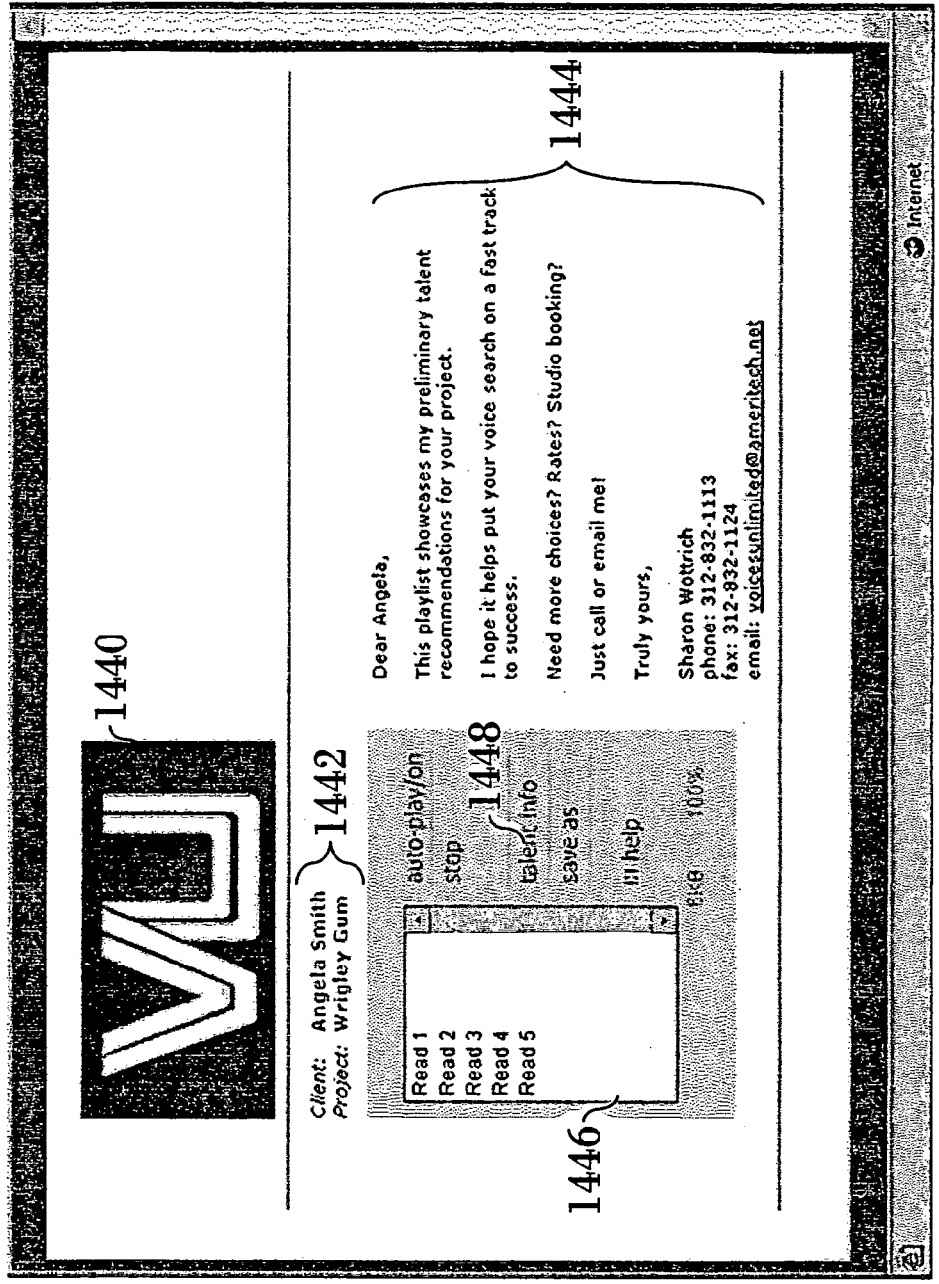
FIG. 40 shows a user interface of the read playlist player.

FIG. 40 illustrates a sample interface of the producer read playlist player. When the producer clicks on the hyperlink produced in the email of FIG. 39, the producer will be redirected to a read playlist player page of FIG. 40. Again, the read playlist player is branded with the agent's logo 1440. The read playlist player page also contains the producer's name and the project name, shown at numerical 1442. Optionally, the read playlist player can display a personalized message (or a default message provided by the present invention), shown at numerical 1444. A playlist 1446 is also embedded on the read playlist player page for allowing the producer to preview the agent's selection and/or search results. Using a talent info button 1448, the producer can request talent information (which can include the ZAMCARD).

Figure 41:
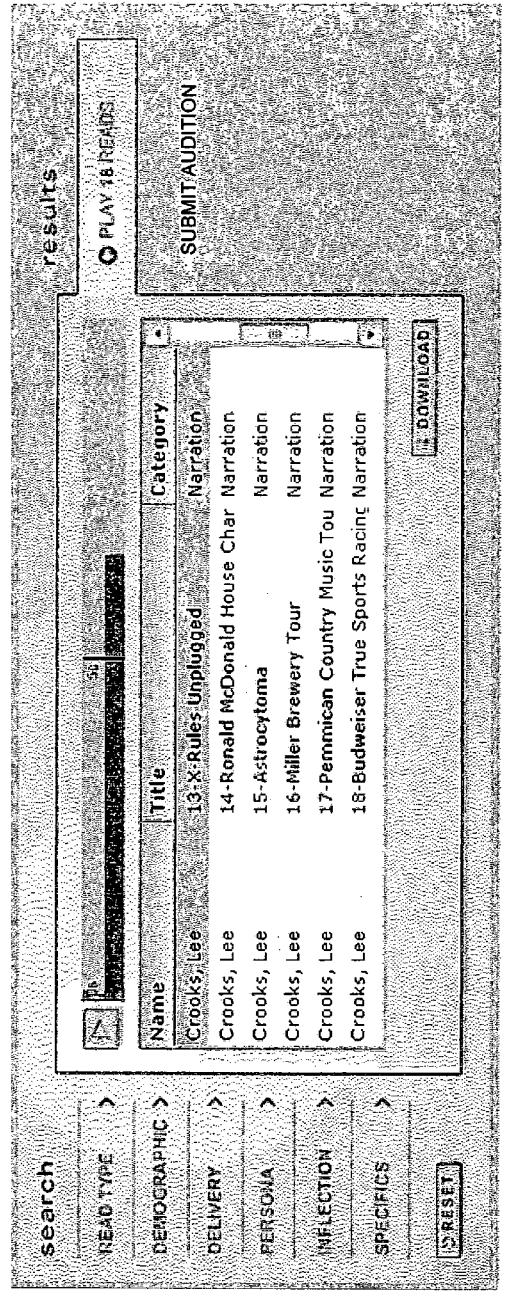
FIG. 41 shows where a submission button can be incorporated to allow the producer to submit a talent audition directly to the agent.

Referring now to FIG. 41, once the desired read(s) have been found, the producer can submit a talent audition directly to the agent via VOICEPROBE as shown in FIG. 41 or via the read playlist player of FIG. 40. By directly enabling the producer or user to submit auditions to the agent, the present invention essentially has "closed" the sale on behalf of the agent using agent branded technologies. This allows the agent to be continually involved in the producer-talent relationship and further foster greater agent goodwill.

Operation of the Search System

Publishing Reads

Figure 42:
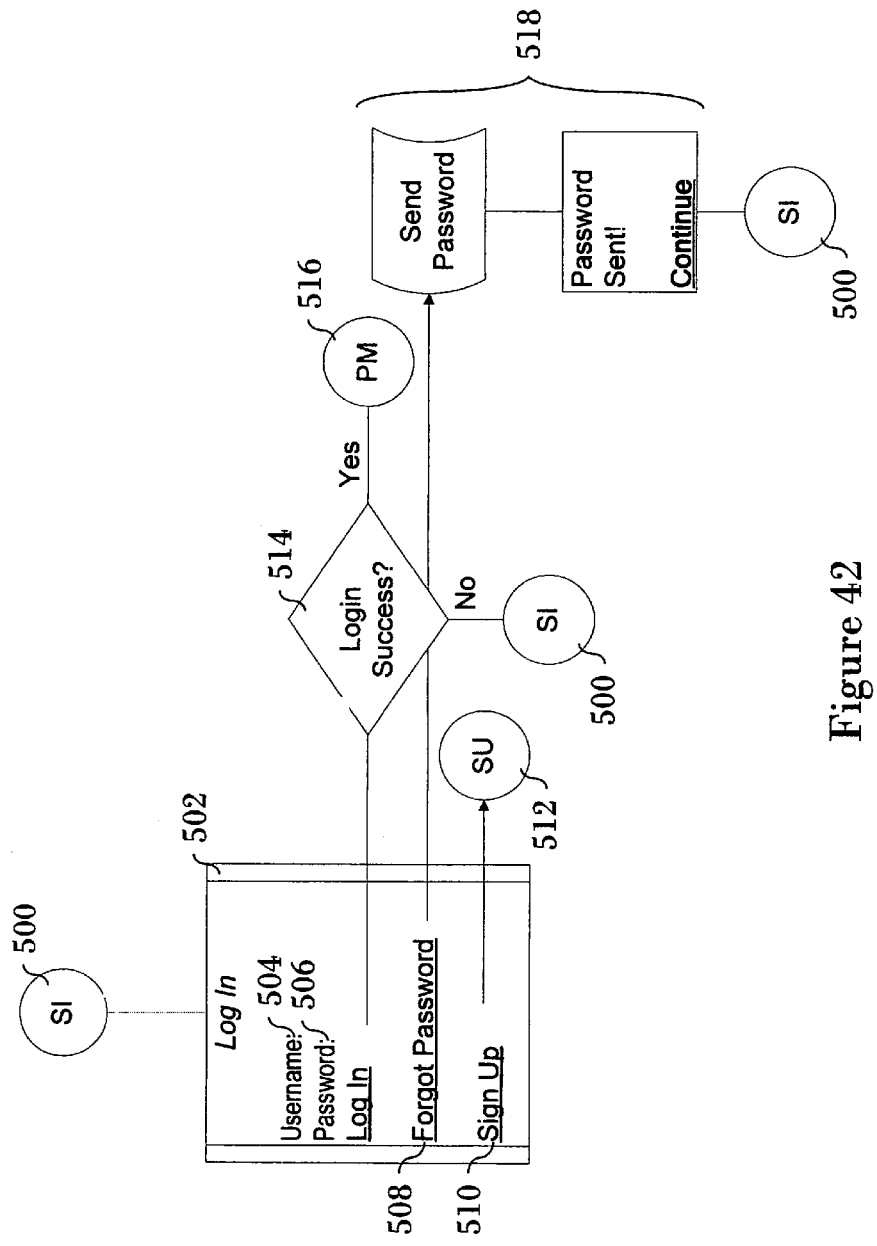
FIG. 42 is a functional flowchart diagram of the sign-in process of the present invention.

Referring to FIG. 42, there is shown a sign-in and sign-up functional flowchart which outlines the process of signing in and signing up using the search system 100 of the present invention. When a user is presented with a login dialog 502, the user is required to enter a username 504 and a password 506. Preferably, the username 504 and the password 506 are at least eight alpha/numeric characters to be valid. Capitalization for the username 504 and the password 506 are ignored.

If the user with a valid account has forgotten his/her password, a forgot password 508 is displayed to allow the user to optionally select to have the user's password sent to the e-mail address associated with the user's registered username at a send password feature 518. If, on the other hand, the user is new to the search system 100, the user can select a "sign-up" link 510.

Figure 43:
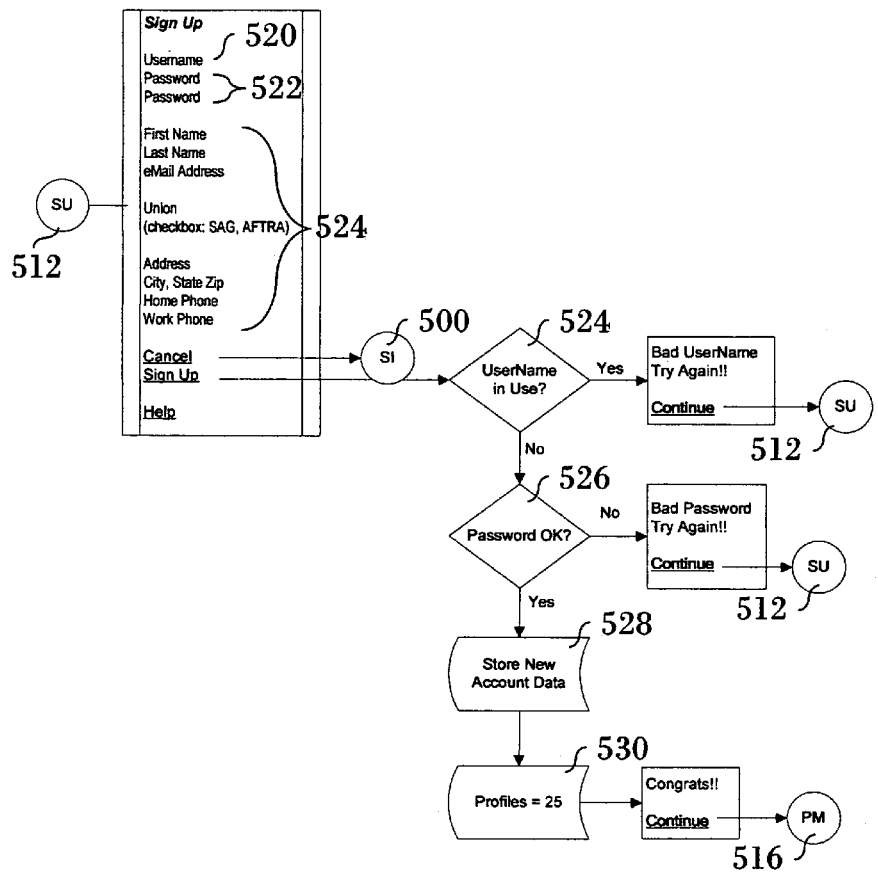
FIG. 43 is a functional flowchart diagram of the sign-up process of the present invention.

If the user selects the sign-up link 510, the new user is presented with a dialog for entering new account information as shown in the functional flowchart of FIG. 43. As known in the art, the desired password must be entered twice and the username and the password must be validated by the search system 100 before a session/account is opened. Briefly, a new username 520 and password 522 is validated at username decision step 524 and password decision step 526. The user is returned to the sign-up page 512 if either the user name 520 or the password 522 is invalid. Once the user name 520 and the password 522 are validated, new user account information 524 is stored at the process step 528 and the user is given five profiles (as will be described). Once the user is validated and/or the login is successful at the decision block 514 of FIG. 42, the user is taken to the profile manager 516.

Figure 44:
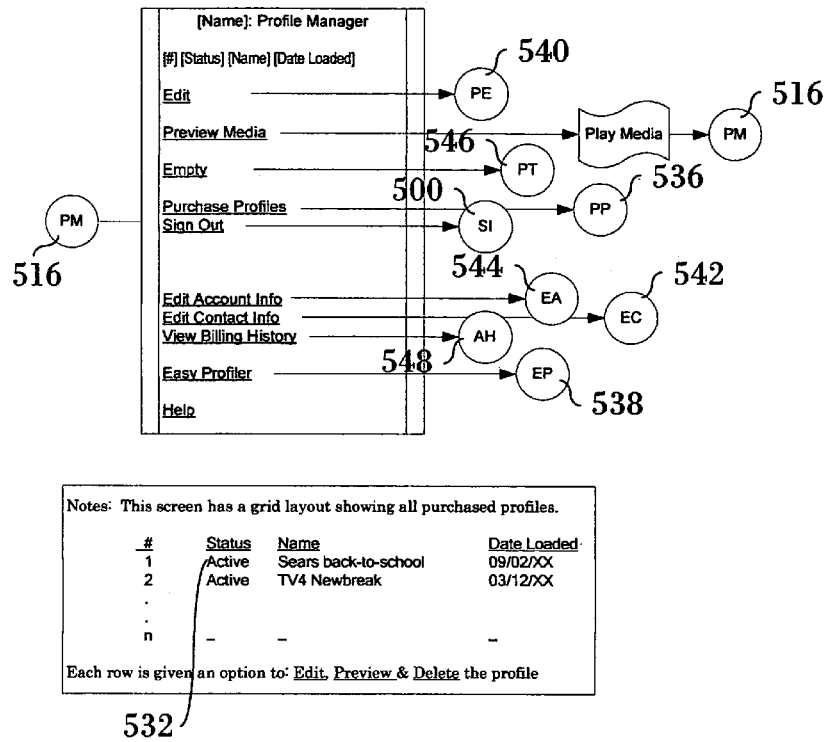
FIG. 44 is a functional flowchart diagram of the profile manager of the present invention.

Referring next to FIG. 44, which shows a functional flowchart of the features of profile manager 516, the profile manager 516 allows users to perform read profile activities. Preferably, the profile manager 516 provides an overall view of what profiles are currently active, their names and the date uploaded. The profiles are numbered from 1 to n, where n equals the current number of purchased profiles for the user account. Each profile is a logical "slot" in which a user's read media and profiling information are held. Using the profile manager 516, the user can also select a link to purchase more or reduce the number of purchased profiles.

A user's profile is a single conceptual entity which encapsulates an audio read (read 172 of FIG. 5) and the properties (read profile data 174 of FIG. 5) which describe it. Profiles are purchased and are what the talent use to publish their talents/reads to the search system 100. Preferably, as previously mentioned, each talent is given five profiles when a new account is opened.

Preferably, when a profile is loaded into the search system 100, it does not become "Active" until the profile and associated read media file have been approved by, preferably, the personnel of the search system 100. This is done by the user submitting the profile, at which time its status is set to "pending" (not shown). The contents are then reviewed by the personnel of search system 100 and if approved the status becomes "Active" (e.g., active 532)—at which time it is available to the search system 100 process, as shown in box 534. If the profile is not acceptable, the status is set to "Inactive". In either case, an e-mail is sent to the user of the outcome of the approval process. Preferably, if a profile is rejected, an e-mail is sent containing the reasons for the rejection.

Using a purchase profiles 536 option, a user can purchase (add to or reduce) profiles on their account. Preferably, profiles may be purchased in increments of 5, and there is a limit of 30 profiles that can be purchased. The number of profiles presented on the profile manager 516 matches the number currently purchased.

When profiles are added, the account is immediately billed the difference for adding the extra profiles. The next month's anniversary date (for billing) is also set to the same day the profiles were added or to the last day of the next month if the day does not occur. For example, a user currently has ten purchased profiles in the user's account. The user added them on Jul. 15, XXXX. The user then added five more profiles on Jul. 21, XXXX. The user is immediately billed for five profiles and is given a new billing cycle on the anniversary of August 21 when the user is billed for fifteen profiles.

When blocks of profiles are deleted, the billing for the profiles and the number of profiles available are both reduced on midnight of the next month's anniversary day. For example, a user currently has 15 purchased profiles in the user's account. The user added them on Aug. 25, XXXX. The user then deleted five profiles on Sep. 12, XXXX. The user's fifteen profiles remain available until September 25, at which time they are reduced to ten, which will be the number of profiles the user is billed for. Preferably, profiles can be deleted in blocks of five.

From the profile manager 516, the user can also choose to use the easy profiler 538 option to alleviate the task of audio editing and uploading of read media. The media can be a single read or composite demo. Preferably, the personnel of the search system 100 can prepare the read(s) and load the reads for a fee. The audio media will be validated, trimmed as necessary, set to correct .mp3 sample rates, normalized and a profile will be created for each individual read as determined by the personnel (or user or both). An option can also be given for the personnel of the search system 100 to profile the read for the user. Optionally, a section can be provided for the user to inform the personnel of special instructions for the reads. Preferably, the user is informed of all costs before loading/uploading of the reads occurs.

As can be seen, the easy profiling 538 options may be performed on the profile manager 516 where a composite read media (talent demo) file is uploaded/sent. Alternatively, the easy profiling 538 options can be performed from a read load page 564 (FIG. 45) in which a single read media file is uploaded/sent.

Another option provided by the profile manager 516 is the profile edit 540 which links the user to a profile edit Webpage. If the user selects the profile edit 540 option, the user is presented with an "easy" page, described via the functional flowchart shown in FIG. 45, for editing a profile's properties and uploading the associated read media file.

Figure 45:
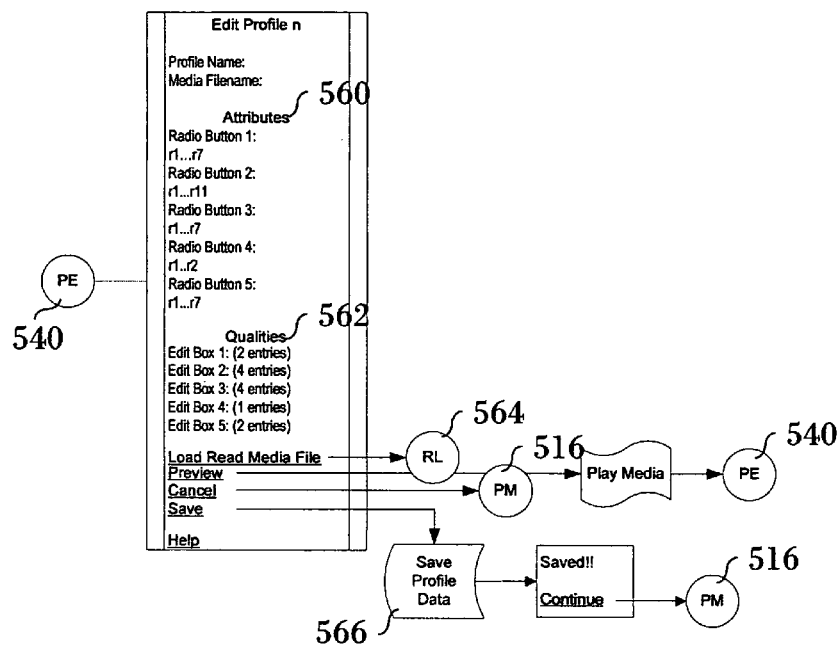
FIG. 45 is a functional flowchart diagram showing the edit profiling feature of the present invention.

As shown in FIG. 45, the edit profile 540 page divides the profiling information into two sections, an attributes 560 and a qualities 562. Once a profile is edited and saved at a save profile process 566, an entry is made in the transaction log of the user.

Figure 46:
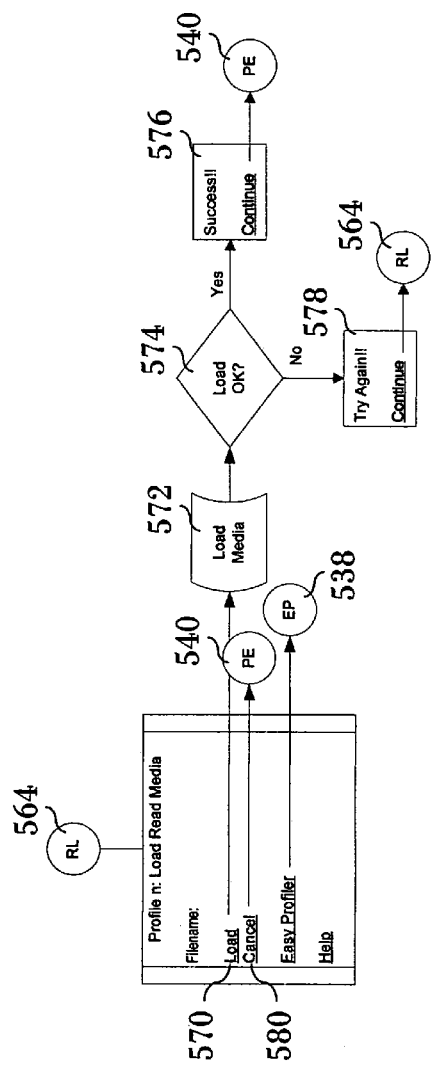
FIG. 46 is a functional flowchart diagram of the load read process of the present invention.

Referring next to FIG. 46, there is shown a functional flowchart of the loading read media 564 feature available through the profile edit 540 process. Preferably, the user is presented with a simple dialog for uploading read media file. When the "Load" link 570 is selected, the user is, preferably, presented with the standard selection dialog for a filename using a default file extension of ".mp3." Alternatively, other file types may be accepted (e.g., .swf file or other audio files).

When a load is initiated at a load media process 572, a progress bar can be displayed providing progress information to the user. A load decision step 574 determines whether load operation was successful. If the load operation was successful, the loading process proceeds to the profile editor page 540. If, on the other hand, the load operation was unsuccessful, the loading process re-initiates the loading operation at a "try again" process 578 and reverts back to the load media 564 page. Cancel 580 terminates loading and no action will be taken on the profile. Preferably, an entry is made in the transaction log of the user for any uploaded, aborted or unsuccessful upload.

Figure 47:
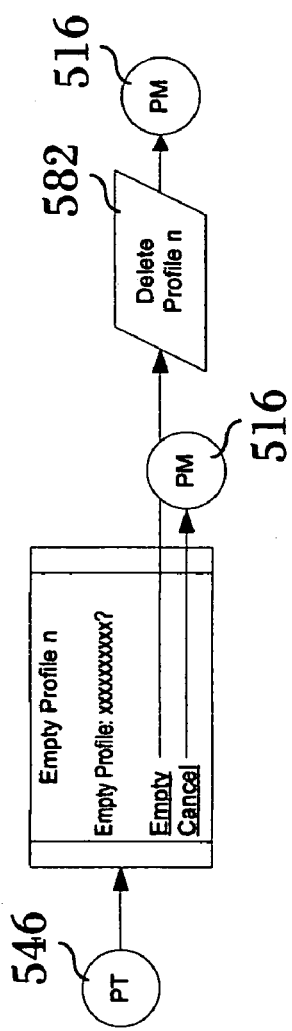
FIG. 47 is a functional flowchart diagram showing how the delete profile feature of the present invention operates.

Referring now to FIG. 47, there is shown a profile deletion 546 functional flowchart diagram. Using the profile deletion 546 option, the user can permanently delete one of the profiles of the user at a delete profile n 582 process. Preferably, the user is presented with a simple dialog to delete the currently selected profile. A standard "Are You Sure?" question may be optionally presented to the user for final approval. Once approved, the profile is permanently removed from the search system 100, an entry is made in the transaction log of the user, and the user is returned to the profile manager 516 page.

Figure 48:
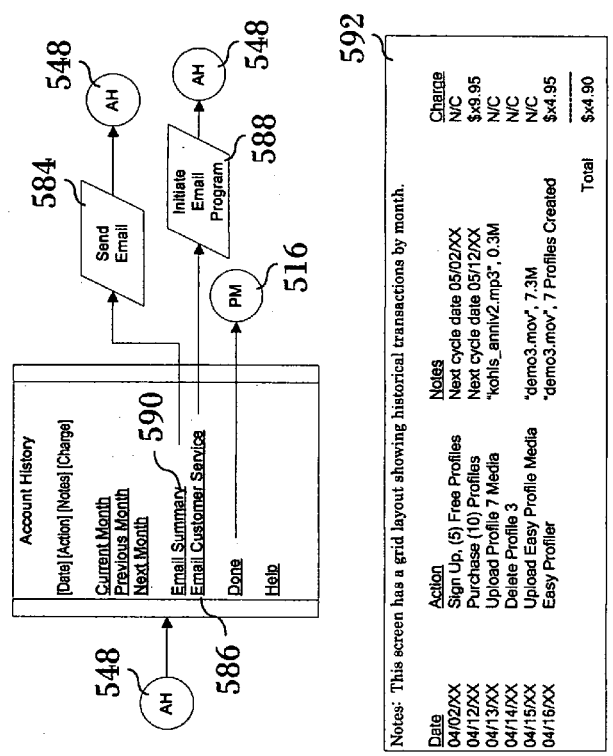
FIG. 48 is a functional flowchart diagram of the account history log feature of the present invention.

Referring next to FIG. 48, there is shown a functional flowchart of the account history 548 options. Using the account history 548 option, the user can view all account activity which has transpired within, preferably, a month—either the current or previous months. An e-mail link 590 is provided to send via e-mail (send e-mail process 584), a summary of activity as presently displayed. An e-mail customer service link 586 is also provided to allow the user to contact Customer Service (via an e-mail program at the initiate e-mail program process 588) to make billing inquiries.

As shown, in part, in the transaction log box 592 of FIG. 48, the account history 548 records transactions which create account history entries, including user sign up, user login, user logout, purchase of profiles, editing of profiles (when saved), uploading of read media, deleting of profiles, editing of account information, password change, easy profiling activity and account history e-mail activity.

Searching on a Read Level

Figure 49:
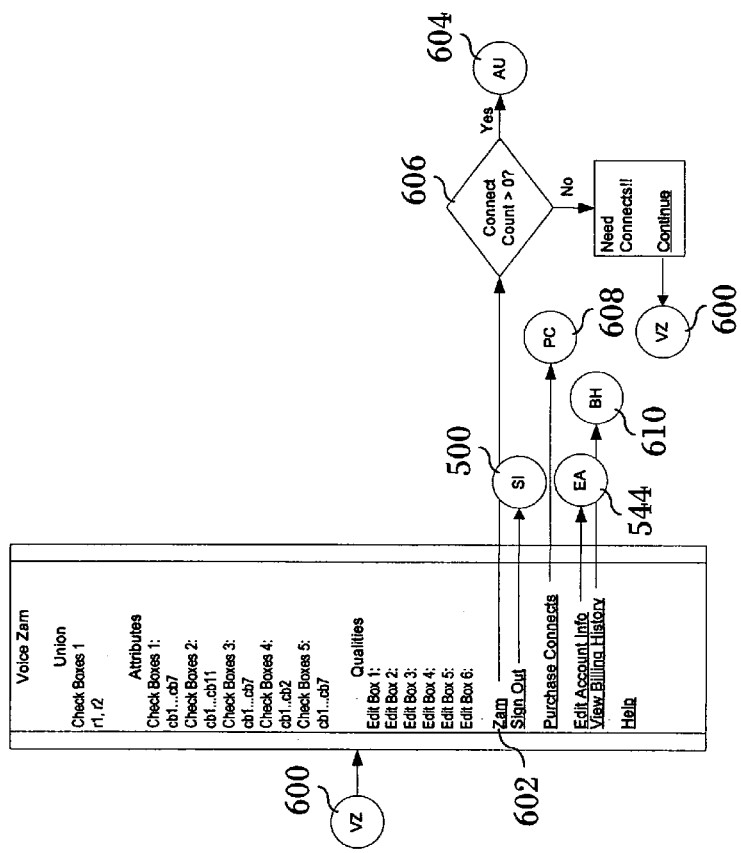
FIG. 49 is a functional flowchart diagram of the profiling process of the present invention.

Referring to FIG. 49, the "voice-ZAM" page 600 is where the user can perform all voice searching functions. In general, a user can first setup the page 600 to identify what type of voice profile the user would like to find. The setup process entails, for example, indicating whether the talent is union or non-union, selecting the various desired attributes and entering the qualities associated with the read type the user is searching for. Once the user has set up the profile search page as desired, the user then selects the search button 602 which begins the voice-over search. If any matching profiles are found, the user is taken to the previewing page 604 where the user can preview all matching voice-over reads.

If no "connects," which will be described below, are available at connect decision step 606, the user must purchase more connects before the user is allowed into the audition page 604. The number of connects available is preferably shown on the voice-ZAM page 600. In addition, if no matches are found, the user is informed so and remains on the voice-ZAM page 600.

The voice-ZAM page 600 contains many search properties used to target a specific voice-over read. These properties are presented in logical groups which are broken down into smaller sub-groups, as shown in FIGS. 6 through 10.

With regard to the concept of connects, connects are a conceptual term for "connecting" the voice-over talent publisher with the voice-over talent consumer. Once a user has narrowed their selection down to one or more voice-over reads that the user feels will aid their project, the user can select the connect button (ZAM link 602) to view the contact information of the talent. In one example of the present invention, connects are what give value to the search application and therefore what the voice-over talent user pays for. Connects are purchased in blocks of five by the user from a purchase connects page 608.

Figure 50:
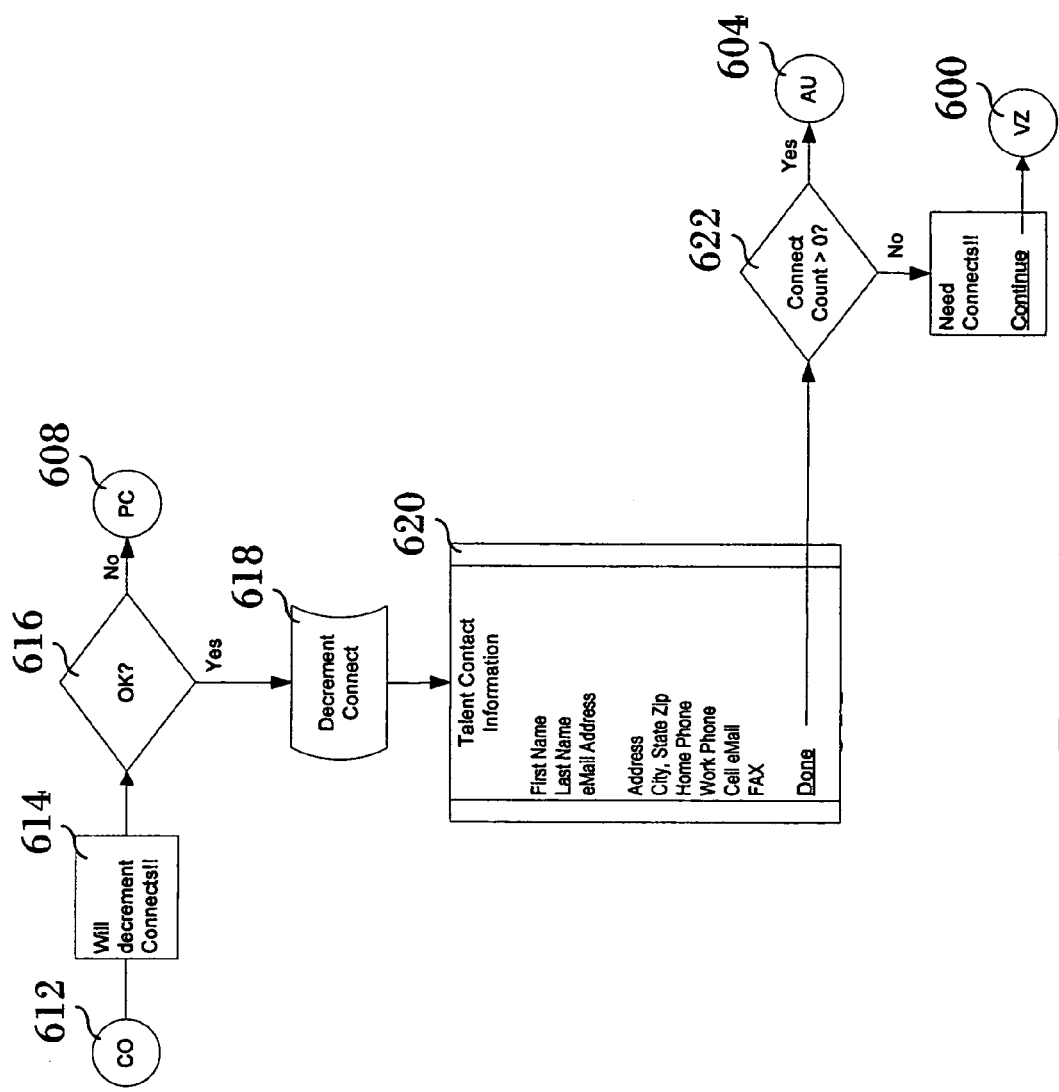
FIG. 50 is a functional flowchart diagram showing how "connects" (talent information presentation) are used by the present invention.

Continuing with the discussion of connects and referring to FIG. 50, before a connect 612 is performed at a decrement connect process 614, the user is, preferably, warned of the pending action and associated charges. If a connect is not available, as determined at a decision step 616, the present invention takes the user to a purchase connects page 608. If, on the other hand, a connect is available, the present invention decrements a connect at a decrement connect process 618 and takes the user to the talent information 620.

As mentioned above, the user is given five free connects when the user signs up with the service provided by the present invention. A connect is made (and decremented) when a user requests contact information about a publisher (e.g., a talent or agent) while on the audition page 604. A user is not given contact information when their Connects is at "0." The number of Connects available is preferably shown on the audition page 604. Once the user has received the talent information 620, the user is returned to the audition page 604 if the user has connects remaining, as determined by a connect decision step 622. If the connect decision step 622 determines that the user does not have any connects remaining, the user is returned to the voice-ZAM search page 600.

Figure 51:
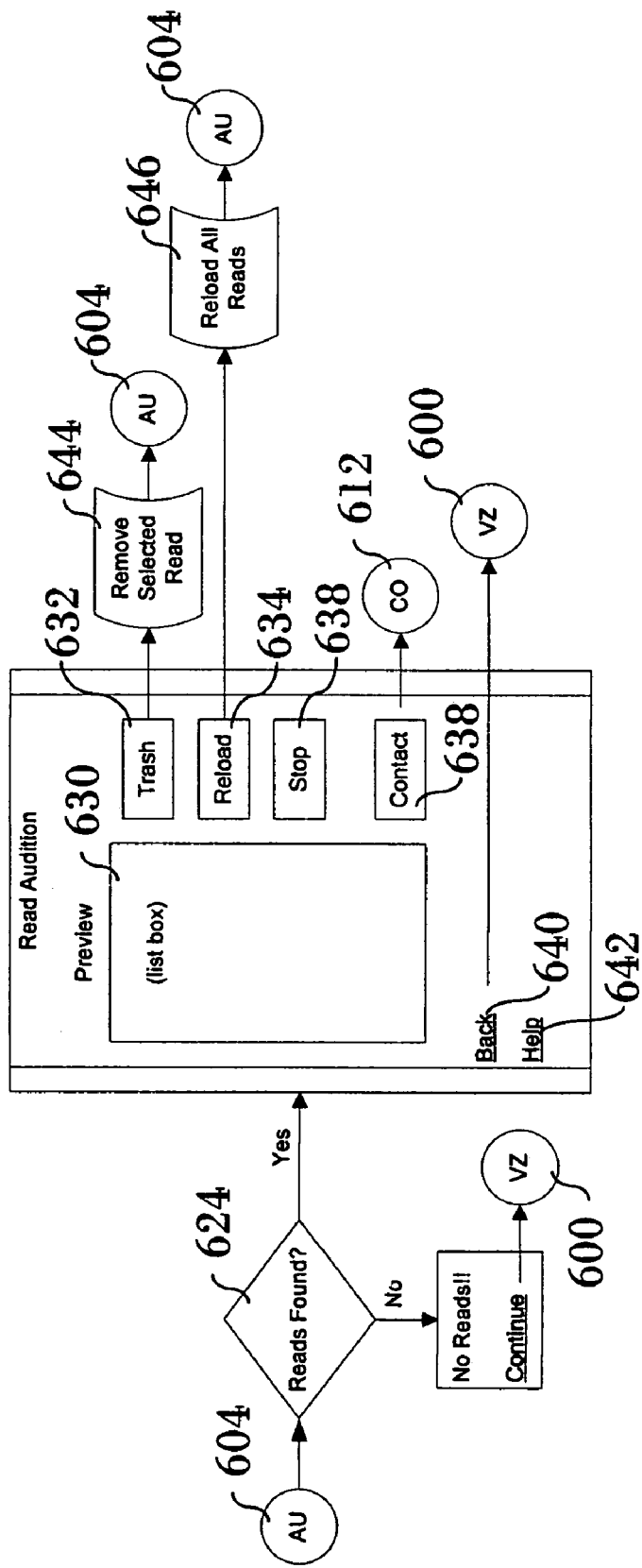
FIG. 51 is a functional flowchart diagram of the read audition process of the present invention.

Referring to FIG. 51, the illustrated functional flowchart shows the features of the previewing page 604 of the present invention. The previewing page 604 is used to preview all reads returned from the search, as determined by a read found step 624. The previewing page 604 allows the user to eliminate reads which do not fit the project for which reads will be used.

After a search is completed and reads are found, as determined by the read found decision step 624, the user is sent to the previewing page 604 and is first presented with a list box 630 of read files. These read files are named Read1, Read2, Readn, where "n" equals the number of reads returned. Alternatively, the reads may be named after the original titles entered when the user uploaded the reads. Preferably, there is an absent of any indication of which reads belong to which talent.

By clicking directly on a read entry in the list box 630, the associated read media (e.g., QuickTime Player marketed by Apple Computers, Inc., RealOne Player marketed by RealNetworks, Inc., Window Media Player marketed by Microsoft Corporation, etc.) is immediately played for the user's review. Preferably, latency between the time a user clicks on a read and the time read begins playing is substantially reduced (by using the seamless playback feature as described above).

A "trash" button 632 accompanies the list box 630 to enable the user to eliminate a selected read(s) from the list box 630. By clicking/selecting the trash button 632, the currently selected read is removed from the list box 630 via a remove selected read process 644. Then, the next read after the removed read is selected and begins to preview in the appropriate audio player.

At anytime, the user can play the next selected read from the list box 630 by clicking on any read in the playlist or by pressing the up/down-arrow key on the keyboard. Preferably, selecting the reload button 634 will stop any preview player and reload the list box 630, via a reload all reads process 646, with the original list of reads as found when the user entered the audition page 604.

At anytime, the user may select a "stop" button 638 which will immediately stop any preview/read that is playing. The user must click on a list box 630 entry to restart previewing.

A "back" link 640 is provided to return the user to the voice-ZAM search page 600 which is, preferably, filled with original search parameters entered by the user. A "help" link 642 is provided to assist the user and operates in a similar manner as other "help" tools/applications known in the art.

Referring still to FIG. 51, a contact button 638 is provided to facilitate the request and retrieval of talent information that is associated with a selected read from the list box 630. When a user selects the contact button 638 from the audition page 604, the contact information (ZAMCARD) for the talent associated with the read that the user has selected is revealed via a connect page 612 (e.g., the talent information as shown in FIGS. 13 and 14). Preferably, before any information is given and any charges are incurred, a warning is given showing which read the user has selected, the charges associated with proceeding and the number of connects the user will have remaining to them after the connect is made.

If the user agrees and proceeds, a connect is made. When a connect is made, all contact information (as provided by the read publisher) is displayed in the talent ZAMCARD. Preferably, an e-mail is sent to the user containing all contact information as displayed. Optionally, reference is not made to the read (in the list box 630) which the contact information is related to. This is to counter any intentions to match previously previewed reads with associated contact information.

An entry is placed in the billing history of the user for the connect to the contact information. The entry contains a reference to the read name (from the list box 630) as selected by the user. Preferably, contact information is excluded. As mentioned above, this is to defeat any intentions to match previously previewed reads with associated contact information.

Project Submission

Figure 52:
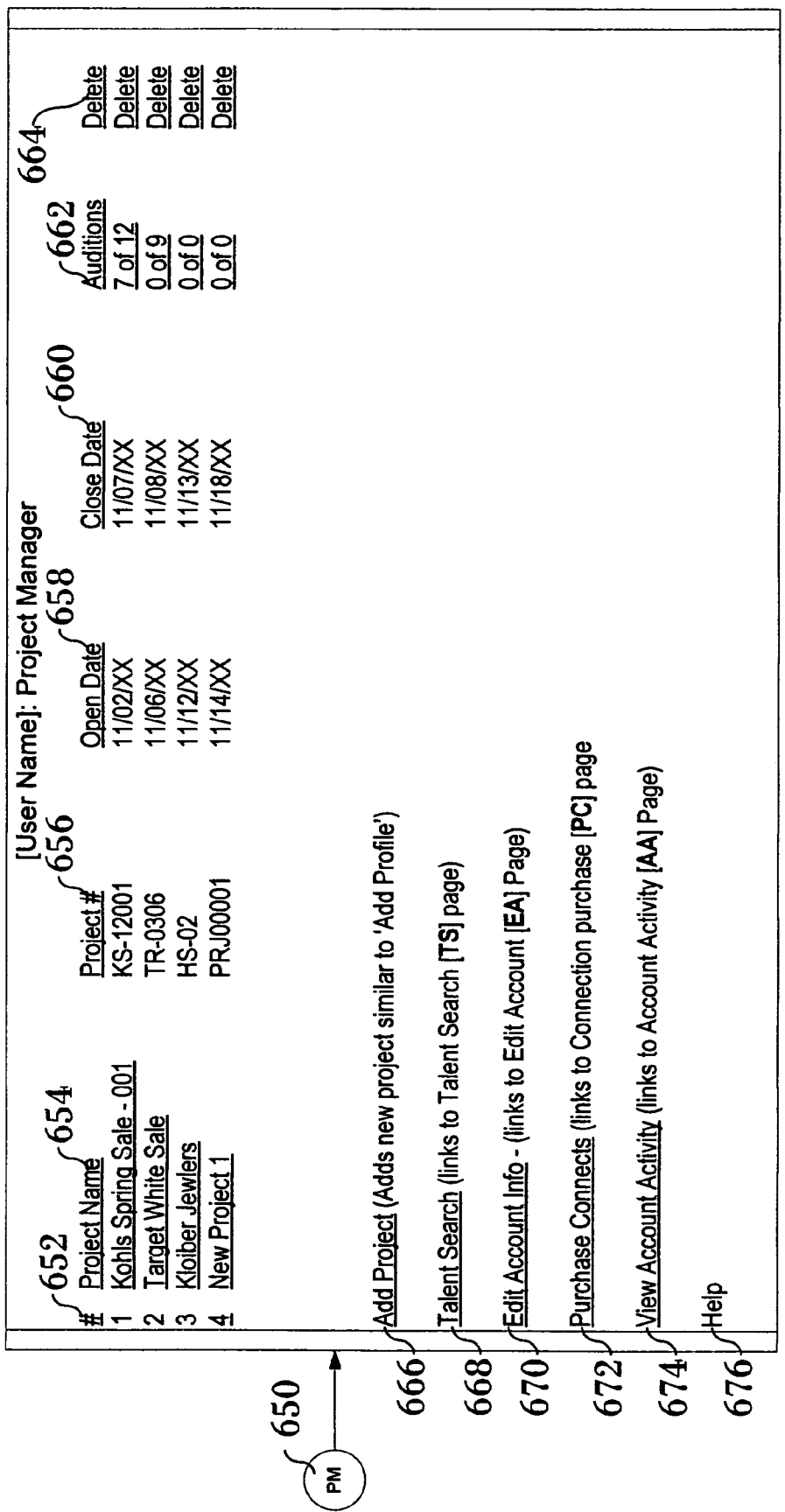
FIG. 52 illustrates a design layout of the project manager for submitting auditions of the present invention.

Referring to FIGS. 52 through 56, there are shown functional flowchart diagrams of the process of creating and submitting a project to agents using the search system 100 of the present invention. More particularly, FIG. 52 illustrates the features of a project manager page 650. Preferably, the project list is sorted by a closing date (close date 660) in ascending order. A line number 652 lists projects by number, similar to the profile manager 516. A project name 654 displays the producer's relevant name for the project. Preferably, the project name 654 is randomly generated as "New Project nnn" when a project is "added." The user (e.g., the producer) may modify the project name 654 when editing the project. Selecting the links under the project name 654 will take the user to the project editor page 690, as described by the functional flowchart diagram of FIG. 53.

Referring still to FIG. 52, a project number column 656 shows the producer's project relevant number. Preferably, the project number 656 is randomly generated as "Project nnn" when the project is "added" and may be modified by the user when editing the project. An open date 658 is the date when the project will open and the search system 100 will send e-mail requests for audition submissions. A close date 660 is the closing date for project audition submissions. The user may also modify the open date 658 and the closing date 660 when editing the project. The closing date 660 may also include color indications to show when a current date is past the closing date 660.

An auditions column 662 is displayed as: x of y where "x" equals number of auditions from respondents and "y" equals number of total talent audition requests made by an agent or by the producer (from post talent search request). Selecting the links under the auditions column 662 will take the user to Audition Manager page 700 (FIG. 54). Preferably, the auditions column 662 displays a blue color when un-previewed auditions are presented and a red color when the auditions are previewed. A delete 664 allows deletion of a project with, preferably, an "Are you sure?" warning.

Additionally, from the project manager page 650, the user can add a new project via an add project link 666 and perform a talent search via a talent search link 668 which links to a talent search page. The user can also perform account management functions via an edit account info link 670 which links to an edit account page, a purchase connect link 672 which links to a connection purchase page and a view account activity link 674 which links to a account activity page. A "help" link 676 is provided to assist the user and operates in a similar manner as other "help" tools/applications known in the art.

Figure 53:
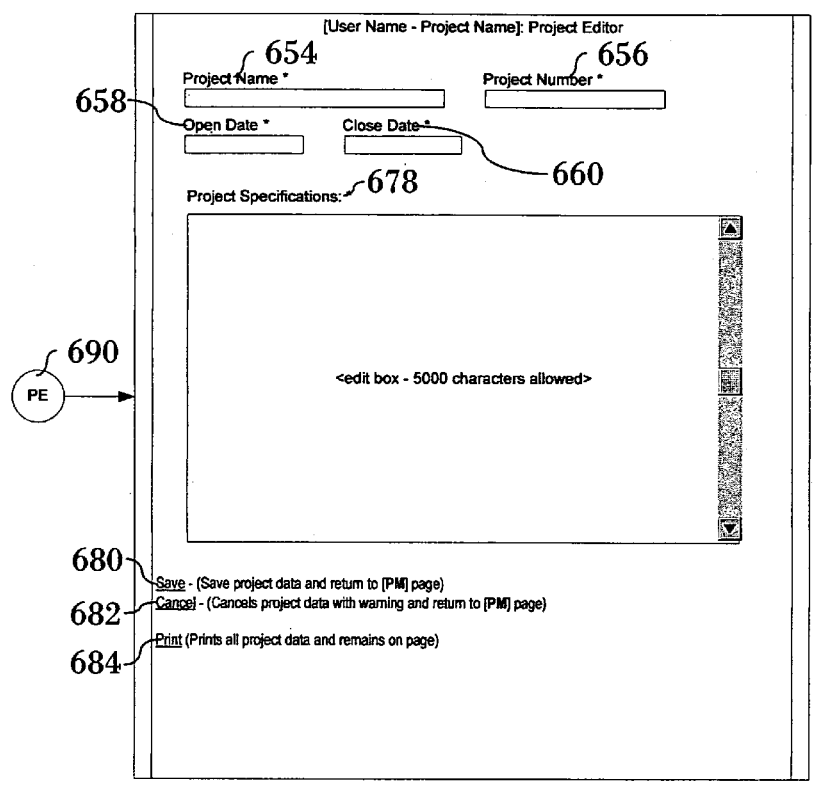
FIG. 53 illustrates a design layout of the project editor of the present invention.

Referring now to FIG. 53, which shows a design layout of the project editor page 690, the user can enter/edit the project name 654, the project number 656, the open date 658 and the close date 660. Furthermore, the user can enter the specifications for the project at a project specification box 678. At anytime, the user can save at a save button 680, cancel at a cancel button 682 or print at print button 684.

Referring next to FIG. 54, there is shown a design layout of the audition manager page 700. Similar to the project manager page 650, the agents are listed preferably in ascending order. A line number 702 lists agents by number similar to the profile manager page 650. An agent column 704 displays the name of agent(s) selected for audition call and provides links to an agent audition call page 750, as shown in the design layout page of FIG. 55. A city column 706 displays where the corresponding agent is located. A requested column 708 displays the number of talent requests for auditions by the agent and a response column 710 displays the number of audition responses by the talents of the agent.

Referring still to FIG. 54, a talent portion 716 is also included with the audition manager page 700. The talent portion 716 is sorted by a submit date 714 in, preferably, ascending with "<pending>" status displayed last. Similarly to previous line numbering, a line number column 712 simply lists auditions by number. An audition column 718 displays link plays/reads that the talent (or agent) submitted and allows the user (e.g., the producer) to preview the read in a preview player. A download column 720 contains links that allow the producer to download the submitted audition of a talent to a local computer. A talent reel column 722 displays the talent identification ("ID") string and provides link plays/reads of the reel/read of talents in a preview player. A connect column 724 provides links to the talent contact page (e.g., the talent information page of FIGS. 12 and 13). A delete column 726 allows permanent deletion of an audition.

Other notable features of the audition manager page 700 include an audition link 728, an agent audition call link 730 and a talent audition call link 732. The audition link 728 allows the user to send the link to a client for preview in the audition player. For example, selecting the audition link 728 brings up sample e-mails filled in with appropriate preformatted messages, allowing the producer to select from and to send recipients (e.g., client) of the producer and brings up an audition player. The agent audition call link 730 provides selection of agents to call for auditions and links to the agent audition call page 730. The talent audition call link 732 provides selection of talent to call for auditions and links to the talent search page. A "help" link 734 is provided to assist the user and operates in a similar manner as other "help" tools/applications known in the art.

Figure 55:
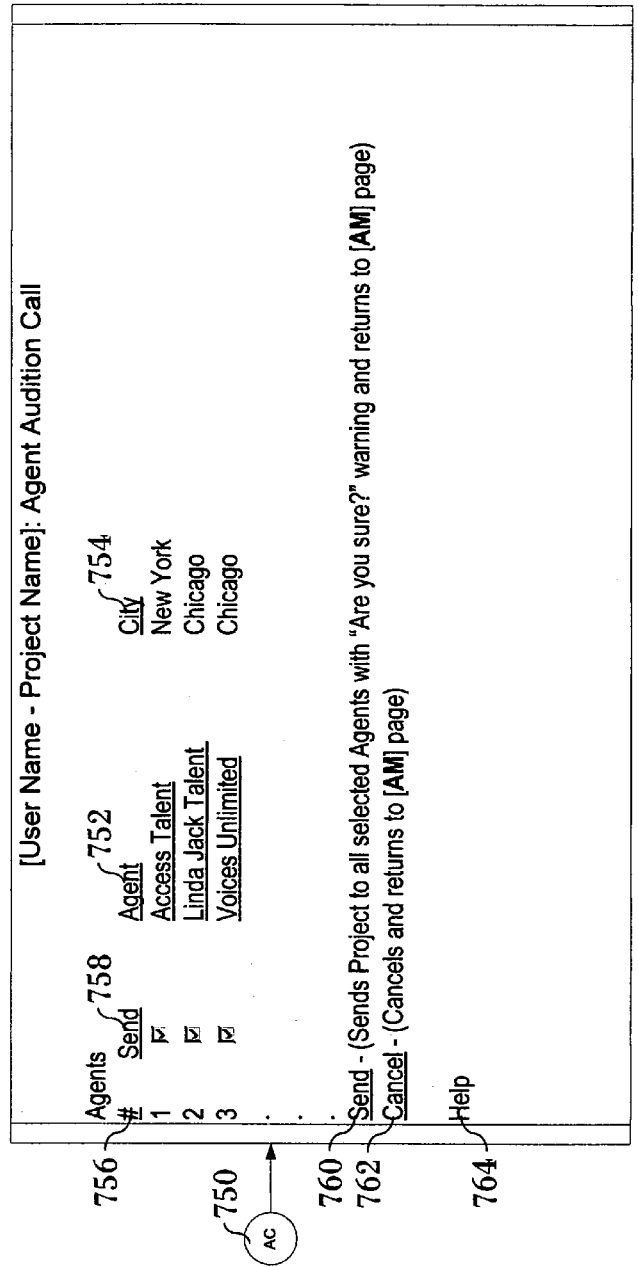
FIG. 55 illustrates a design layout of the agent audition call of the present invention.

Referring next to FIG. 55, there is shown a design layout of the agent audition call page 750. An agent column 752 is provided and lists the name of the agent(s) selected for the audition call. The agent column 752 additionally provides links to the agent contact information. The agent audition call page 750 also contains a city column 754, listing where the agent is located. A line number column 756 simply lists agents by number. Additionally, the agent audition call page 750 allows the user to select/checkbox the agent that the user wished to send audition calls to via the send checkbox column 758. Then, using a send option 760, the user can send the project to all selected agents with, preferably, an "Are you sure?" warning and returns the user to the audition manager page 700. A cancel option 762 allows the user to cancel the agent audition call process and returns the user to the audition manager page 700. A "help" link 764 is provided to assist the user and operates in a similar manner as other "help" tools/applications known in the art.

Figure 56:
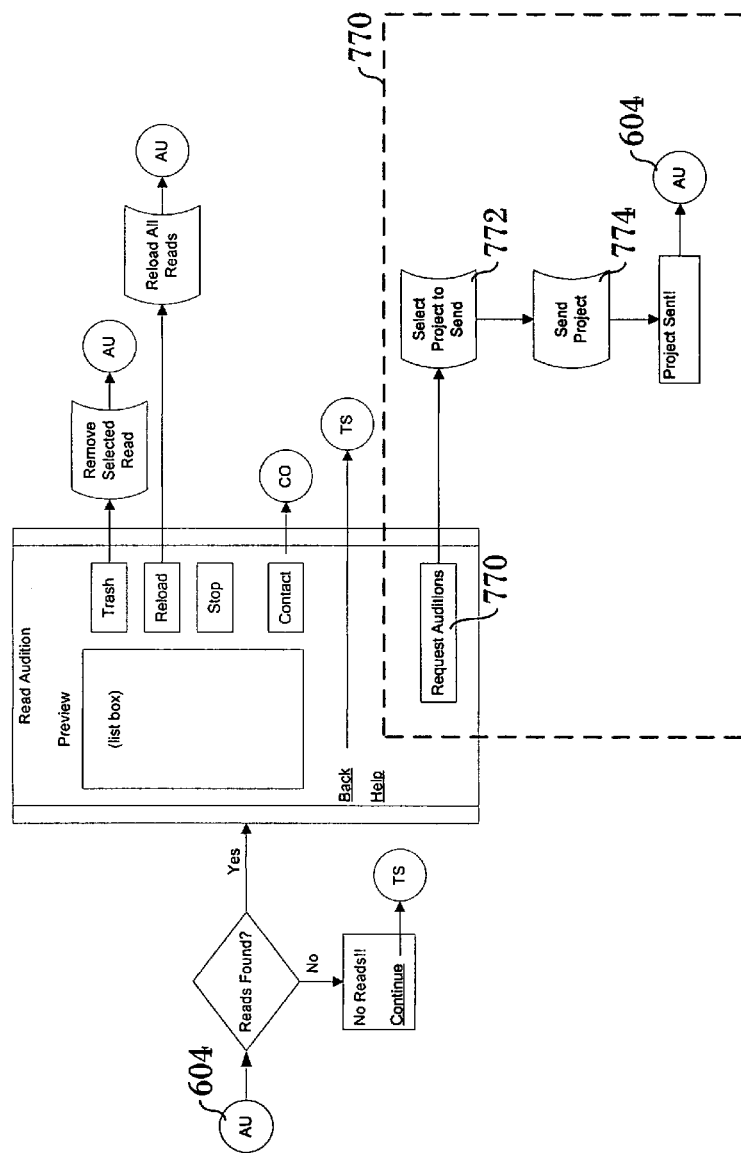
FIG. 56 illustrates a design layout of the read audition of FIG. 51 incorporating the request audition feature.

Referring now to FIG. 56, the illustrated functional flowchart diagram is similar to the read audition flowchart diagram of FIG. 51 and includes a request auditions option 770 (outlined by the dashed lines). When request auditions option 770 is selected from the read audition page 604, all talent associated to reads currently displayed in the audition player (the list box 630) will be sent a request for audition. This process is facilitated by first presenting a select project to send process 772 from which the producer may select a project for the audition requests. Preferably, a final "Continue/Cancel" warning is given to the producer that "n" number of auditions will be sent for the "xyz" project. Then, a send project process 774 sends requests for audition to selected talents.

Figure 57:
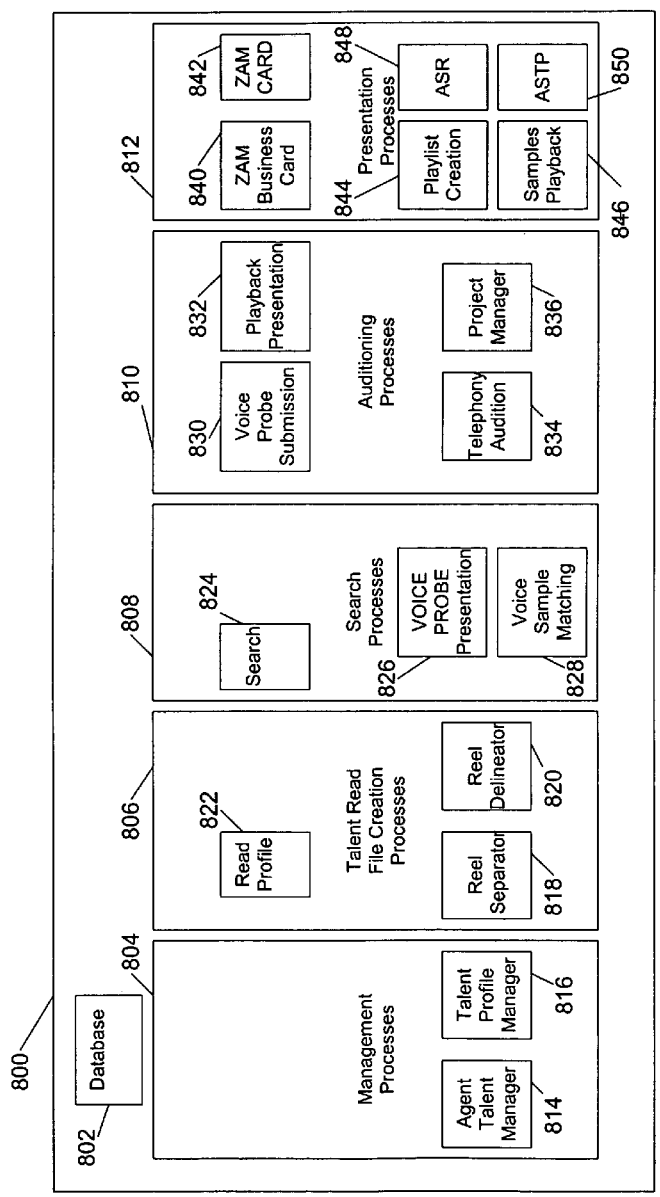
FIG. 57 is a block diagram illustrating voiceover asset management, search and presentation tools in accordance with the present invention.

Referring to FIG. 57, in one preferred embodiment, the high speed, internet-based voiceover asset management, search and presentation system provided by the present invention, is software based and includes internet-based voiceover asset management, search and presentation tools 800 that are designed to assist and enhance the business of voiceover industry professionals. Some of the voiceover asset management, search and presentation tools are shown in the block diagram in FIG. 57. In one embodiment, the voiceover asset management, search presentation tools 800 include a database 802, Management Processes 804, Talent Read File Creation Processes 806, Search Processes 808, Auditioning Processes 810 and Presentation Processes 812. The Management Processes 804 include, for example, agent talent manager 814 and talent profile manager 816. The Talent Creation Processes 806 include, for example, a reel separation process 818, a reel delineation process 820 and a read profile process 822. The Search Processes 808 include, for example, search processes 824, VOICEPROBE presentation processes 826 and voice sample matching processes 828. The Auditioning processes 810 include, VOICEPROBE submission processes 830, Playback presentation processes 832, Telephony Audition processes 834 and Project Manager Processes 836, for example. The Presentation processes 812 include ZAM business card, 840, ZAMCARD, 842, Playlist creation 844, samples playback 846, ASR 848 and ASTP 850. The voiceover asset management, search and presentation tools 800 can include other processes for use in the creation, management, search and presentation of voiceover assets.

It may therefore be appreciated from the above detailed description of the preferred embodiment of the present invention that it teaches a system and method for selecting talents at a read level. The present invention provides for read level searching by defining read profiles. The present invention enables the user to query and locate read(s) which fit the profile the user is seeking. In addition, the present invention enables the user to dynamically update the search criteria/parameters and further narrow the search results. The present invention provides high speed internet-based voiceover asset management, search and presentation tools designed to assist and enhance the business of voiceover industry professionals.

Additionally, the present invention provides a method of promoting voice-over talents that revolutionizes the industry. The method involves distributing voice-over talent business cards to agents and/or producers. The present invention also preserves and strengthens the role of the agent in the voice-over industry.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations and alterations should therefore be seen as being within the scope of the present invention as determined by the appended claims when interpreted in accordance with the breadth to which they are fairly, legally and equitably entitled.

What is claimed is:

1. A method for voice-over talent searching, said method comprising the steps of:
    arranging audio demo reels of talents into individual audio reads, wherein each of the demo reels contains a plurality of audio reads;
    profiling each of the separated audio reads to create a separate read profile for each audio read;
    inputting talent information relating to said audio reads;
    storing said audio reads, said read profiles and said talent information in a database;
    allowing a user to enter search parameters, said search parameters including profile terms relating to said read profiles;
    matching said search parameters with said read profiles;
    displaying matched audio reads having read profiles substantially matching said search parameters;
    enabling the user to preview said matched audio reads; wherein said matched audio reads are previewed in substantially real-time;
    allowing the user to select at least one preferred audio read during said previewing process to allow the user to request talent information associated with said preferred audio read; and
    revealing talent information associated with said preferred audio read to the user.

2. The method as defined in claim 1, wherein the step of arranging said audio demo reels includes separating said demo reels into a plurality of individual audio reads.

3. The method as defined in claim 1, wherein the step of arranging said audio demo reels includes delineating said audio reads of said demo reels to mark individual audio reads.

4. The method as defined in claim 1, further comprising the step of:
    allowing the user to selectively update the search parameters to narrow the search results.

5. The method as defined in claim 1, further comprising the step of:
    allowing an agent to brand the trademark of the agent.

6. The method as defined in claim 1, further comprising the step of:
combining the audio reads with corresponding profile data created in the profiling step to create read profiles, wherein each of said read profiles contains a plurality of sets of data, including a first set of data containing an audio read file and a second set of data containing profiling data associated with said audio read file to classify said audio read file for storage and query retrieval.

7. The method as defined in claim 1, further comprising the step of:
caching matched audio reads to allow for substantially continuous playback of the matched audio reads.

8. The method as defined in claim 7, wherein the matched audio reads are cached in a cache subdirectory under a directory of an Internet browser.

9. The method as defined in claim 1, further comprising the step of:
enabling the user to input a sample voice as a search parameter.

10. The method as defined in claim 9, wherein said sample voice is used as a template for substantially matching audio reads stored in said database to said sample voice using at least one digital signal processing technique.

11. The method as defined in claim 1, further comprising the step of:
enabling the user to search in said database for audio reads stored in said database which resemble a selected audio read.

12. The method as defined in claim 1, further comprising the step of:
enabling the user to search in said database for audio reads stored in said database which resemble a particular voice, wherein said particular voice is a predetermined sample voice.

13. The method as defined in claim 1, further comprising the step of:
allowing talents to audition for audio reads via telephony technology.

14. The method as defined in claim 1, further comprising the step of:
providing a Uniform Resource Locator with a pathname containing an alias suffix on a business card for introducing a talent to business contacts and for directing the business contacts to a Webpage containing biographical information and sample audio reads of the talent.

15. The method as defined in claim 1, further comprising the step of:
determining the number of connects available to the user before revealing talent information to the user, wherein the number of connects defines to the number of talent information that can be revealed to the user.

16. The method as defined in claim 1, wherein the audio reads are profiled using general profiling data, vocal categories and subjective categories to create said read profiles.

17. The method as defined in claim 16, wherein said vocal categories include a vocal persona category for identifying the personality projected by an audio read, a vocal delivery category for identifying the delivery type used in an audio read and a vocal trait category for identifying the distinguishing feature of an audio read.

18. The method as defined in claim 17, wherein said vocal persona category, said vocal delivery category and said vocal trait category are further divided into subcategories in which each subcategory is given a value representing ratings within said subcategories.

19. The method as defined in claim 16, wherein said subjective categories include accent for identifying how words in an audio read are pronounced or stressed, character for identifying the personality exhibited by the audio read, impression for identifying a noted personality and texture for identifying the basic scheme or structure of an audio read.

20. A method for voice-over talent searching, said method comprising the steps of:
profiling audio reads to classify each of said audio reads for storage and query retrieval;
associating the audio reads with their corresponding profile data created in the profiling step to create read profiles;
inputting talent information relating to said audio reads;
storing said read profiles and said talent information in a database;
allowing a user to enter search parameters for retrieving audio reads with read profiles which substantially match the search parameters;
matching said search parameters with said read profiles;
displaying matched audio reads having read profiles substantially matching said search parameters;
enabling the user to preview said matched audio reads, wherein said matched audio reads are previewed in substantially real-time;
allowing the user to select at least one preferred audio read during said previewing process to allow the user to request talent information associated with said preferred audio read; and
revealing talent information associated with said preferred audio read to the user.

21. The method as defined in claim 20, further including the step of:
arranging audio demo reels of talents into a plurality of individual audio reads, wherein each of the demo reels contains a plurality of audio reads.

22. The method as defined in claim 21, wherein the step of arranging said audio demo reels includes separating said demo reels into a plurality of individual audio reads.

23. The method as defined in claim 21, wherein the step of arranging said audio demo reels includes delineating said demo reels to mark individual audio reads.

24. The method as defined in claim 20, further comprising the step of:
allowing the user to selectively update the search parameters to narrow the search results.

25. The method as defined in claim 20, further comprising the step of:
allowing an agent to brand the trademark of the agent.

26. The method as defined in claim 20, further comprising the step of:
caching matched audio reads to allow for substantially continuous playback of said matched audio reads.

27. The method as defined in claim 26, wherein the matched audio reads are cached in a cache subdirectory under a directory of a browser.

28. The method as defined in claim 20, further comprising the step of:
enabling the user to input a sample voice as a search parameter.

29. The method as defined in claim 20, further comprising the step of:
enabling the user to search in said database for audio reads stored in said database which resemble a selected audio read.

30. The method as defined in claim 20, further comprising the step of:
   enabling the user to search in said database for audio reads stored in said database which resemble a pre-determined sample voice.

31. The method as defined in claim 20, further comprising the step of:
   allowing talents to audition for audio reads via telephony technology.

32. The method as defined in claim 20, further comprising the step of:
   providing a Uniform Resource Locator with a pathname containing an alias suffix on a business card for introducing a talent to business contacts.

33. The method for voice-over talent searching, said method comprising the steps of:
   profiling audio reads to classify each of said audio reads for storage and query retrieval;
   storing said audio reads and said classified profiles in a database;
   allowing a user to enter search parameters for retrieving audio reads with read profiles which substantially match the search parameters;
   matching said search parameters with said read profiles;
   displaying matched audio reads having read profiles substantially matching said search parameters; and
   enabling the user to play said matched audio reads.

34. The method for introducing a voice-over talent to business contacts, said method comprising the steps of:
   providing an audio read level search and delivery platform;
   enabling a user to subscribe to said audio read level search and delivery platform;
   allowing the user to upload audio reads to said read level search and delivery platform, wherein said uploaded audio reads are representative of the read performances by a talent;
   allowing the user to enter read profile data for each of said uploaded audio reads; and
   allowing the user to enter biographical and contact information for the talent into said read level search and delivery platform.

35. The method as defined in claim 34, further comprising the steps of:
   enabling the profiling of each of said uploaded audio reads;
   allowing the business contacts to search for audio reads on said read level search and delivery platform;
   allowing the business contacts to preview individual audio reads in real-time on said read level search and delivery platform; and
   delivering talent and agent contact information to a business contact requesting said talent and agent contact information.

36. The system for facilitating voice-over talent searching, said system comprising:
   a visual interface for allowing profiling of each of a plurality of audio reads to classify each of said audio reads for storage and query retrieval;
   a database for storing the audio reads with corresponding profile data;
   a search engine for allowing a user to enter search parameters for retrieving audio reads with read profiles which substantially match the search parameters; and
   a display for displaying a list of matched audio reads on at least one Webpage to enable the user preview said matched audio reads, wherein said matched audio reads are previewed in substantially real-time.

37. The system as defined in claim 36, wherein said search engine enables the user to input a sample voice as a search parameter, wherein said sample voice is used as a template for substantially matching audio reads stored in said database to said sample voice.

38. The system as defined in claim 36, wherein said search engine provides sample voices to allow the user to select from and use a sample voice as a search parameter.

39. The system as defined in claim 36, further comprising:
   an electronic transmission capacity for allowing the talent to audition for audio reads via telephony technology.

40. The system as defined in claim 36, further comprising:
   a reel separator for automatically separating an audio demo reel containing a plurality of audio reads of a talent into individual audio reads.

41. The system as defined in claim 36, further comprising:
   a reel delineator interface for allowing the user to individually define each of the individual audio reads contained in a reel.

42. A read level search and delivery system, said system comprising:
   a collection of Web files for enabling a talent to subscribe to a read level search and delivery platform;
   a transmission capacity for allowing the talent to upload audio reads to said read level search and delivery platform, wherein said uploaded audio reads are representative of the read performances by the talent;
   a profiling mechanism for enabling a user to individually profile each of said uploaded audio reads; and
   at least one input webpage for allowing the talent to enter biographical and contact information for the talent into said read level search and delivery platform.

\* \* \* \* \*